US011353985B2

(12) United States Patent
Krah

(10) Patent No.: US 11,353,985 B2
(45) Date of Patent: Jun. 7, 2022

(54) FLEXIBLE SELF-CAPACITANCE AND MUTUAL CAPACITANCE TOUCH SENSING SYSTEM ARCHITECTURE

(71) Applicant: Apple Inc., Cupertino, CA (US)

(72) Inventor: Christoph H. Krah, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/003,133

(22) Filed: Aug. 26, 2020

(65) Prior Publication Data

US 2020/0387259 A1 Dec. 10, 2020

Related U.S. Application Data

(63) Continuation of application No. 15/009,774, filed on Jan. 28, 2016, now Pat. No. 10,795,488.

(Continued)

(51) Int. Cl.
*G06F 3/041* (2006.01)
*G06F 3/044* (2006.01)
(Continued)

(52) U.S. Cl.
CPC ...... *G06F 3/04164* (2019.05); *G06F 3/03545* (2013.01); *G06F 3/044* (2013.01);
(Continued)

(58) Field of Classification Search
CPC ............. G06F 3/04164; G06F 3/04166; G06F 3/0443; G06F 3/03545; G06F 3/0412; G06F 3/0416; G06F 3/044; G06F 3/047
See application file for complete search history.

(56) References Cited

U.S. PATENT DOCUMENTS 4,087,625 A 5/1978 Dym et al.
4,090,092 A 5/1978 Serrano
(Continued)

FOREIGN PATENT DOCUMENTS

CN 1202254 A 12/1998
CN 1246638 A 3/2000
(Continued)

OTHER PUBLICATIONS

Final Office Action received for U.S. Appl. No. 16/152,326, dated Dec. 4, 2020, 10 pages.

(Continued)

*Primary Examiner* — Amare Mengistu
*Assistant Examiner* — Jennifer L Zubajlo
(74) *Attorney, Agent, or Firm* — Kubota & Basol LLP

(57) ABSTRACT

A switching circuit is disclosed. The switching circuit can comprise a plurality of pixel mux blocks, each of the pixel mux blocks configured to be coupled to a respective touch node electrode on a touch sensor panel, and each of the pixel mux blocks including logic circuitry. The switching circuit can also comprise a plurality of signal lines configured to be coupled to sense circuitry, at least one of the signal lines configured to transmit a touch signal from one of the respective touch node electrodes to the sense circuitry. The logic circuitry in each pixel mux block of the plurality of pixel mux blocks can be configured to control the respective pixel mux block so as to selectively couple the respective pixel mux block to any one of the plurality of signal lines.

21 Claims, 30 Drawing Sheets

Related U.S. Application Data

(60) Provisional application No. 62/111,077, filed on Feb. 2, 2015.

(51) Int. Cl.
*G06F 3/0354* (2013.01)
*G06F 3/047* (2006.01)

(52) U.S. Cl.
CPC ............ *G06F 3/047* (2013.01); *G06F 3/0412* (2013.01); *G06F 3/0416* (2013.01); *G06F 3/0443* (2019.05); *G06F 3/04166* (2019.05)

(56) References Cited

U.S. PATENT DOCUMENTS

| | | | |
|---|---|---|---|
| 4,304,976 A | 12/1981 | Gottbreht et al. |
| 4,475,235 A | 10/1984 | Graham |
| 4,550,221 A | 10/1985 | Mabusth |
| 4,659,874 A | 4/1987 | Landmeier |
| 5,194,862 A | 3/1993 | Edwards |
| 5,317,919 A | 6/1994 | Awtrey |
| 5,459,463 A | 10/1995 | Gruaz et al. |
| 5,483,261 A | 1/1996 | Yasutake |
| 5,488,204 A | 1/1996 | Mead et al. |
| 5,543,590 A | 8/1996 | Gillespie et al. |
| 5,631,670 A | 5/1997 | Tomiyoshi et al. |
| 5,825,352 A | 10/1998 | Bisset et al. |
| 5,835,079 A | 11/1998 | Shieh |
| 5,841,078 A | 11/1998 | Miller et al. |
| 5,841,427 A | 11/1998 | Teterwak |
| 5,844,506 A | 12/1998 | Binstead |
| 5,847,690 A | 12/1998 | Boie et al. |
| 5,880,411 A | 3/1999 | Gillespie et al. |
| 5,889,236 A | 3/1999 | Gillespie et al. |
| 5,914,465 A | 6/1999 | Allen et al. |
| 5,923,997 A | 7/1999 | Miyanaga et al. |
| 6,025,647 A | 2/2000 | Shenoy et al. |
| 6,057,903 A | 5/2000 | Colgan et al. |
| 6,137,427 A | 10/2000 | Binstead |
| 6,163,313 A | 12/2000 | Aroyan et al. |
| 6,188,391 B1 | 2/2001 | Seely et al. |
| 6,204,897 B1 | 3/2001 | Colgan et al. |
| 6,239,788 B1 | 5/2001 | Nohno et al. |
| 6,310,610 B1 | 10/2001 | Beaton et al. |
| 6,323,846 B1 | 11/2001 | Westerman et al. |
| 6,329,044 B1 | 12/2001 | Inoue et al. |
| 6,452,514 B1 | 9/2002 | Philipp |
| 6,456,952 B1 | 9/2002 | Nathan |
| 6,587,358 B1 | 7/2003 | Yasumura |
| 6,690,387 B2 | 2/2004 | Zimmerman et al. |
| 6,730,863 B1 | 5/2004 | Gerpheide et al. |
| 6,844,673 B1 | 1/2005 | Bernkopf |
| 6,847,354 B2 | 1/2005 | Vranish |
| 6,970,160 B2 | 11/2005 | Mulligan et al. |
| 7,015,894 B2 | 3/2006 | Morohoshi |
| 7,030,860 B1 | 4/2006 | Hsu et al. |
| 7,129,935 B2 | 10/2006 | Mackey |
| 7,138,686 B1 | 11/2006 | Banerjee et al. |
| 7,180,508 B2 | 2/2007 | Kent et al. |
| 7,184,026 B2 | 2/2007 | Gordon et al. |
| 7,184,064 B2 | 2/2007 | Zimmerman et al. |
| 7,337,085 B2 | 2/2008 | Soss |
| 7,395,717 B2 | 7/2008 | Deangelis et al. |
| 7,412,586 B1 | 8/2008 | Rajopadhye et al. |
| 7,504,833 B1 | 3/2009 | Seguine |
| 7,538,760 B2 | 5/2009 | Hotelling et al. |
| 7,548,073 B2 | 6/2009 | Mackey et al. |
| 7,639,234 B2 | 12/2009 | Orsley |
| 7,663,607 B2 | 2/2010 | Hotelling et al. |
| 7,701,539 B2 | 4/2010 | Shih et al. |
| 7,719,523 B2 | 5/2010 | Hillis |
| 7,898,122 B2 | 3/2011 | Andrieux et al. |
| 7,907,126 B2 | 3/2011 | Yoon et al. |
| 7,932,898 B2 | 4/2011 | Philipp et al. |
| 8,026,904 B2 | 9/2011 | Westerman |
| 8,040,142 B1 | 10/2011 | Bokma et al. |
| 8,040,321 B2 | 10/2011 | Peng et al. |
| 8,040,326 B2 | 10/2011 | Hotelling et al. |
| 8,045,783 B2 | 10/2011 | Lee et al. |
| 8,058,884 B2 | 11/2011 | Betancourt |
| 8,059,103 B2 | 11/2011 | Geaghan |
| 8,068,097 B2 | 11/2011 | Guanghai |
| 8,120,371 B2 | 2/2012 | Day et al. |
| 8,125,312 B2 | 2/2012 | Orr |
| 8,149,002 B2 | 4/2012 | Ossar et al. |
| 8,169,421 B2 | 5/2012 | Wright et al. |
| 8,223,133 B2 | 7/2012 | Hristov |
| 8,258,986 B2 | 9/2012 | Makovetskyy |
| 8,259,078 B2 | 9/2012 | Hotelling et al. |
| 8,264,428 B2 | 9/2012 | Nam |
| 8,283,935 B2 | 10/2012 | Liu et al. |
| 8,300,021 B2 | 10/2012 | Ayres et al. |
| 8,319,747 B2 | 11/2012 | Hotelling et al. |
| 8,339,286 B2 | 12/2012 | Cordeiro |
| 8,355,887 B1 | 1/2013 | Harding et al. |
| 8,441,464 B1 | 5/2013 | Lin et al. |
| 8,479,122 B2 | 7/2013 | Hotelling et al. |
| 8,484,838 B2 | 7/2013 | Badaye et al. |
| 8,487,898 B2 | 7/2013 | Hotelling |
| 8,507,811 B2 | 8/2013 | Hotelling et al. |
| 8,508,495 B2 | 8/2013 | Hotelling et al. |
| 8,525,756 B2 * | 9/2013 | Kwon .................. G09G 3/3233 345/76 |
| 8,537,126 B2 | 9/2013 | Yousefpor et al. |
| 8,542,208 B2 | 9/2013 | Krah et al. |
| 8,552,994 B2 | 10/2013 | Simmons |
| 8,593,410 B2 | 11/2013 | Hong et al. |
| 8,593,425 B2 | 11/2013 | Hong et al. |
| 8,614,688 B2 | 12/2013 | Chang |
| 8,665,237 B2 | 3/2014 | Koshiyama et al. |
| 8,680,877 B2 | 3/2014 | Lee et al. |
| 8,760,412 B2 * | 6/2014 | Hotelling .............. G09G 3/3648 345/173 |
| 8,766,950 B1 | 7/2014 | Morein et al. |
| 8,773,146 B1 | 7/2014 | Hills et al. |
| 8,773,351 B2 | 7/2014 | Rekimoto |
| 8,810,543 B1 | 8/2014 | Kurikawa |
| 8,884,917 B2 | 11/2014 | Seo |
| 8,902,172 B2 | 12/2014 | Peng et al. |
| 8,917,256 B2 | 12/2014 | Roziere |
| 8,922,521 B2 * | 12/2014 | Hotelling ............ G06F 3/04164 345/174 |
| 8,957,874 B2 | 2/2015 | Elias |
| 8,976,133 B2 | 3/2015 | Yao et al. |
| 8,982,096 B2 | 3/2015 | Hong et al. |
| 8,982,097 B1 | 3/2015 | Kuzo et al. |
| 9,000,782 B2 | 4/2015 | Roziere |
| 9,001,082 B1 | 4/2015 | Rosenberg et al. |
| 9,024,913 B1 | 5/2015 | Jung et al. |
| 9,035,895 B2 | 5/2015 | Bussat et al. |
| 9,075,463 B2 | 7/2015 | Pyo et al. |
| 9,086,774 B2 | 7/2015 | Hotelling et al. |
| 9,151,791 B2 | 10/2015 | Roziere |
| 9,189,119 B2 | 11/2015 | Liao et al. |
| 9,250,757 B2 | 2/2016 | Roziere |
| 9,261,997 B2 | 2/2016 | Chang et al. |
| 9,268,427 B2 | 2/2016 | Yousefpor et al. |
| 9,292,137 B2 | 3/2016 | Kogo |
| 9,329,674 B2 | 5/2016 | Lee et al. |
| 9,329,723 B2 | 5/2016 | Benbasat et al. |
| 9,372,576 B2 | 6/2016 | Westerman |
| 9,423,897 B2 | 8/2016 | Bae |
| 9,442,330 B2 | 9/2016 | Huo |
| 9,448,675 B2 | 9/2016 | Morein et al. |
| 9,535,547 B2 | 1/2017 | Roziere |
| 9,582,131 B2 | 2/2017 | Elias |
| 9,640,991 B2 | 5/2017 | Blondin et al. |
| 9,690,397 B2 | 6/2017 | Shepelev et al. |
| 9,785,295 B2 | 10/2017 | Yang et al. |
| 9,804,717 B2 | 10/2017 | Schropp, Jr. |
| 9,857,925 B2 | 1/2018 | Morein et al. |
| 9,874,975 B2 | 1/2018 | Benbasat et al. |
| 9,880,655 B2 | 1/2018 | O'connor |
| 9,886,141 B2 | 2/2018 | Yousefpor |

(56) References Cited

U.S. PATENT DOCUMENTS

| | | |
|---|---|---|
| 9,904,427 B1 | 2/2018 | Co et al. |
| 9,996,175 B2 * | 6/2018 | Hotelling ............... G06F 3/0412 |
| 10,001,888 B2 | 6/2018 | Hong et al. |
| 10,061,433 B2 | 8/2018 | Imai et al. |
| 10,120,520 B2 | 11/2018 | Krah et al. |
| 10,175,832 B2 | 1/2019 | Roziere |
| 10,254,896 B2 | 4/2019 | Mori et al. |
| 10,289,251 B2 | 5/2019 | Shih et al. |
| 10,365,764 B2 | 7/2019 | Korapati et al. |
| 10,386,962 B1 | 8/2019 | Jin et al. |
| 10,459,587 B2 | 10/2019 | Krah et al. |
| 10,705,658 B2 | 7/2020 | Li et al. |
| 10,725,591 B1 | 7/2020 | Maharyta et al. |
| 11,157,109 B1 | 10/2021 | Shorten et al. |
| 2002/0015024 A1 | 2/2002 | Westerman et al. |
| 2002/0152048 A1 | 10/2002 | Hayes |
| 2003/0075427 A1 | 4/2003 | Caldwell |
| 2003/0076325 A1 | 4/2003 | Thrasher |
| 2003/0164820 A1 | 9/2003 | Kent |
| 2003/0210235 A1 | 11/2003 | Roberts |
| 2004/0017362 A1 | 1/2004 | Mulligan et al. |
| 2004/0061687 A1 | 4/2004 | Kent et al. |
| 2004/0090429 A1 | 5/2004 | Geaghan et al. |
| 2004/0140993 A1 | 7/2004 | Geaghan et al. |
| 2004/0188151 A1 | 9/2004 | Gerpheide et al. |
| 2004/0189617 A1 | 9/2004 | Gerpheide et al. |
| 2004/0239650 A1 | 12/2004 | Mackey |
| 2004/0241920 A1 | 12/2004 | Hsiao et al. |
| 2004/0243747 A1 | 12/2004 | Rekimoto |
| 2005/0007353 A1 | 1/2005 | Smith et al. |
| 2005/0012724 A1 | 1/2005 | Kent |
| 2005/0069718 A1 | 3/2005 | Voss-Kehl et al. |
| 2005/0073507 A1 | 4/2005 | Richter et al. |
| 2005/0083307 A1 | 4/2005 | Aufderheide et al. |
| 2005/0104867 A1 | 5/2005 | Westerman et al. |
| 2005/0126831 A1 | 6/2005 | Richter et al. |
| 2005/0146509 A1 | 7/2005 | Geaghan et al. |
| 2005/0219228 A1 | 10/2005 | Alameh et al. |
| 2005/0239532 A1 | 10/2005 | Inamura |
| 2005/0270039 A1 | 12/2005 | Mackey |
| 2005/0270273 A1 | 12/2005 | Marten |
| 2005/0280639 A1 | 12/2005 | Taylor et al. |
| 2006/0001640 A1 | 1/2006 | Lee |
| 2006/0017710 A1 | 1/2006 | Lee et al. |
| 2006/0038791 A1 | 2/2006 | Mackey |
| 2006/0097991 A1 | 5/2006 | Hotelling et al. |
| 2006/0097992 A1 | 5/2006 | Gitzinger et al. |
| 2006/0132463 A1 | 6/2006 | Lee et al. |
| 2006/0146484 A1 | 7/2006 | Kim et al. |
| 2006/0161871 A1 | 7/2006 | Hotelling et al. |
| 2006/0197753 A1 | 9/2006 | Hotelling |
| 2006/0202969 A1 | 9/2006 | Hauck |
| 2006/0203403 A1 | 9/2006 | Schediwy et al. |
| 2006/0227115 A1 | 10/2006 | Fry |
| 2006/0238522 A1 | 10/2006 | Westerman et al. |
| 2006/0248208 A1 | 11/2006 | Walbeck et al. |
| 2006/0267953 A1 | 11/2006 | Peterson et al. |
| 2006/0278444 A1 | 12/2006 | Binstead |
| 2006/0279548 A1 | 12/2006 | Geaghan |
| 2006/0284639 A1 | 12/2006 | Reynolds |
| 2006/0293864 A1 | 12/2006 | Soss |
| 2007/0008299 A1 | 1/2007 | Hristov |
| 2007/0012665 A1 | 1/2007 | Nelson et al. |
| 2007/0023523 A1 | 2/2007 | Onishi |
| 2007/0074914 A1 | 4/2007 | Geaghan et al. |
| 2007/0075982 A1 | 4/2007 | Morrison et al. |
| 2007/0216637 A1 | 9/2007 | Ito |
| 2007/0216657 A1 | 9/2007 | Konicek |
| 2007/0229468 A1 | 10/2007 | Peng et al. |
| 2007/0229470 A1 | 10/2007 | Snyder et al. |
| 2007/0247443 A1 | 10/2007 | Philipp |
| 2007/0262963 A1 | 11/2007 | Xiao-Ping et al. |
| 2007/0262969 A1 | 11/2007 | Pak |
| 2007/0268273 A1 | 11/2007 | Westerman et al. |
| 2007/0268275 A1 | 11/2007 | Westerman et al. |
| 2007/0279395 A1 | 12/2007 | Philipp et al. |
| 2007/0279619 A1 | 12/2007 | Chang |
| 2007/0283832 A1 | 12/2007 | Hotelling |
| 2007/0285365 A1 | 12/2007 | Lee |
| 2007/0296709 A1 | 12/2007 | Guanghai |
| 2008/0006454 A1 | 1/2008 | Hotelling |
| 2008/0007533 A1 | 1/2008 | Hotelling |
| 2008/0012835 A1 | 1/2008 | Rimon et al. |
| 2008/0018581 A1 | 1/2008 | Park et al. |
| 2008/0024456 A1 | 1/2008 | Peng et al. |
| 2008/0036742 A1 | 2/2008 | Garmon |
| 2008/0042985 A1 | 2/2008 | Katsuhito et al. |
| 2008/0042986 A1 | 2/2008 | Westerman et al. |
| 2008/0042987 A1 | 2/2008 | Westerman et al. |
| 2008/0042992 A1 | 2/2008 | Kim |
| 2008/0047764 A1 | 2/2008 | Lee et al. |
| 2008/0061800 A1 | 3/2008 | Reynolds et al. |
| 2008/0062140 A1 | 3/2008 | Hotelling et al. |
| 2008/0062147 A1 | 3/2008 | Hotelling et al. |
| 2008/0062148 A1 | 3/2008 | Hotelling et al. |
| 2008/0062151 A1 | 3/2008 | Kent |
| 2008/0074398 A1 | 3/2008 | Wright |
| 2008/0100572 A1 | 5/2008 | Boillot |
| 2008/0136787 A1 | 6/2008 | Yeh et al. |
| 2008/0136792 A1 | 6/2008 | Peng et al. |
| 2008/0142281 A1 | 6/2008 | Geaghan |
| 2008/0158145 A1 | 7/2008 | Westerman |
| 2008/0158146 A1 | 7/2008 | Westerman |
| 2008/0158167 A1 | 7/2008 | Hotelling et al. |
| 2008/0158172 A1 | 7/2008 | Hotelling et al. |
| 2008/0158174 A1 | 7/2008 | Land et al. |
| 2008/0158181 A1 | 7/2008 | Hamblin et al. |
| 2008/0158182 A1 | 7/2008 | Westerman |
| 2008/0158185 A1 | 7/2008 | Westerman |
| 2008/0162996 A1 | 7/2008 | Krah et al. |
| 2008/0174321 A1 | 7/2008 | Kang et al. |
| 2008/0180365 A1 | 7/2008 | Ozaki |
| 2008/0188267 A1 | 8/2008 | Sagong |
| 2008/0224962 A1 * | 9/2008 | Kasai ................. G09G 3/3233 345/76 |
| 2008/0231292 A1 | 9/2008 | Ossart et al. |
| 2008/0238871 A1 | 10/2008 | Tam |
| 2008/0246496 A1 | 10/2008 | Hristov et al. |
| 2008/0264699 A1 | 10/2008 | Chang et al. |
| 2008/0277259 A1 | 11/2008 | Chang |
| 2008/0283175 A1 | 11/2008 | Hagood et al. |
| 2008/0303022 A1 | 12/2008 | Tai et al. |
| 2008/0303964 A1 | 12/2008 | Lee et al. |
| 2008/0309626 A1 | 12/2008 | Westerman et al. |
| 2008/0309627 A1 | 12/2008 | Hotelling et al. |
| 2008/0309629 A1 | 12/2008 | Westerman et al. |
| 2008/0309632 A1 | 12/2008 | Westerman et al. |
| 2008/0309633 A1 | 12/2008 | Hotelling et al. |
| 2008/0309635 A1 | 12/2008 | Matsuo |
| 2009/0002337 A1 | 1/2009 | Chang |
| 2009/0009485 A1 | 1/2009 | Bytheway |
| 2009/0019344 A1 | 1/2009 | Yoon et al. |
| 2009/0020343 A1 | 1/2009 | Rothkopf et al. |
| 2009/0070681 A1 | 3/2009 | Dawes et al. |
| 2009/0073138 A1 | 3/2009 | Lee et al. |
| 2009/0085894 A1 | 4/2009 | Gandhi et al. |
| 2009/0091546 A1 | 4/2009 | Joo et al. |
| 2009/0091551 A1 | 4/2009 | Hotelling et al. |
| 2009/0109192 A1 | 4/2009 | Liu et al. |
| 2009/0114456 A1 | 5/2009 | Wisniewski |
| 2009/0128516 A1 | 5/2009 | Rimon et al. |
| 2009/0135157 A1 | 5/2009 | Harley |
| 2009/0141046 A1 | 6/2009 | Rathnam et al. |
| 2009/0146970 A1 | 6/2009 | Lowles et al. |
| 2009/0160787 A1 | 6/2009 | Westerman et al. |
| 2009/0174676 A1 | 7/2009 | Westerman |
| 2009/0174688 A1 | 7/2009 | Westerman |
| 2009/0179868 A1 | 7/2009 | Ayres et al. |
| 2009/0182189 A1 | 7/2009 | Lira |
| 2009/0184937 A1 | 7/2009 | Grivna |
| 2009/0194344 A1 | 8/2009 | Harley et al. |
| 2009/0205879 A1 | 8/2009 | Halsey et al. |
| 2009/0212642 A1 | 8/2009 | Krah |
| 2009/0213090 A1 | 8/2009 | Mamba et al. |

(56) References Cited

U.S. PATENT DOCUMENTS

| | | |
|---|---|---|
| 2009/0236151 A1 | 9/2009 | Yeh et al. |
| 2009/0238012 A1 | 9/2009 | Tatapudi et al. |
| 2009/0242283 A1 | 10/2009 | Chiu |
| 2009/0251427 A1 | 10/2009 | Hung et al. |
| 2009/0267902 A1 | 10/2009 | Nambu et al. |
| 2009/0267903 A1 | 10/2009 | Cady et al. |
| 2009/0273577 A1 | 11/2009 | Chen et al. |
| 2009/0303189 A1 | 12/2009 | Grunthaner et al. |
| 2009/0309850 A1 | 12/2009 | Yang |
| 2009/0309851 A1 | 12/2009 | Bernstein |
| 2009/0315854 A1 | 12/2009 | Matsuo |
| 2009/0322702 A1 | 12/2009 | Chien et al. |
| 2010/0001973 A1 | 1/2010 | Hotelling et al. |
| 2010/0004029 A1 | 1/2010 | Kim |
| 2010/0006350 A1 | 1/2010 | Elias |
| 2010/0007616 A1 | 1/2010 | Jang |
| 2010/0013745 A1 | 1/2010 | Kim et al. |
| 2010/0013791 A1 | 1/2010 | Haga et al. |
| 2010/0019779 A1 | 1/2010 | Kato et al. |
| 2010/0031174 A1 | 2/2010 | Kim |
| 2010/0039396 A1 | 2/2010 | Ho et al. |
| 2010/0059294 A1 | 3/2010 | Elias et al. |
| 2010/0060608 A1 | 3/2010 | Yousefpor |
| 2010/0079384 A1 | 4/2010 | Grivna |
| 2010/0079401 A1 | 4/2010 | Staton |
| 2010/0090964 A1 | 4/2010 | Soo et al. |
| 2010/0097346 A1 | 4/2010 | Sleeman |
| 2010/0102027 A1 | 4/2010 | Liu et al. |
| 2010/0110035 A1 | 5/2010 | Selker |
| 2010/0117985 A1 | 5/2010 | Wadia |
| 2010/0123667 A1 | 5/2010 | Kim et al. |
| 2010/0139991 A1 | 6/2010 | Philipp et al. |
| 2010/0143848 A1 | 6/2010 | Jain et al. |
| 2010/0149127 A1 | 6/2010 | Fisher et al. |
| 2010/0156810 A1 | 6/2010 | Barbier et al. |
| 2010/0156846 A1 | 6/2010 | Long et al. |
| 2010/0182018 A1 | 7/2010 | Hazelden |
| 2010/0182278 A1 | 7/2010 | Li et al. |
| 2010/0194695 A1 | 8/2010 | Hotelling et al. |
| 2010/0194696 A1 | 8/2010 | Chang et al. |
| 2010/0194697 A1 | 8/2010 | Hotelling et al. |
| 2010/0194698 A1 | 8/2010 | Hotelling et al. |
| 2010/0194707 A1 | 8/2010 | Hotelling et al. |
| 2010/0201635 A1 | 8/2010 | Klinghult et al. |
| 2010/0245286 A1 | 9/2010 | Parker |
| 2010/0253638 A1 | 10/2010 | Yousefpor et al. |
| 2010/0259503 A1 | 10/2010 | Yanase et al. |
| 2010/0265187 A1 | 10/2010 | Chang et al. |
| 2010/0265188 A1 | 10/2010 | Chang et al. |
| 2010/0277418 A1 | 11/2010 | Huang et al. |
| 2010/0321305 A1 | 12/2010 | Chang et al. |
| 2010/0328228 A1 | 12/2010 | Elias |
| 2010/0328248 A1 | 12/2010 | Mozdzyn |
| 2010/0328262 A1 | 12/2010 | Huang et al. |
| 2010/0328263 A1 | 12/2010 | Lin |
| 2011/0001491 A1 | 1/2011 | Huang et al. |
| 2011/0006832 A1 | 1/2011 | Land et al. |
| 2011/0006999 A1 | 1/2011 | Chang et al. |
| 2011/0007020 A1 | 1/2011 | Hong et al. |
| 2011/0007021 A1 | 1/2011 | Bernstein et al. |
| 2011/0007030 A1 | 1/2011 | Mo et al. |
| 2011/0025623 A1 | 2/2011 | Lin |
| 2011/0025629 A1 | 2/2011 | Grivna et al. |
| 2011/0025635 A1 | 2/2011 | Lee |
| 2011/0061949 A1 | 3/2011 | Krah et al. |
| 2011/0074705 A1 | 3/2011 | Yousefpor et al. |
| 2011/0080391 A1 | 4/2011 | Brown et al. |
| 2011/0096016 A1 | 4/2011 | Yilmaz |
| 2011/0134050 A1 | 6/2011 | Harley |
| 2011/0157068 A1 | 6/2011 | Parker et al. |
| 2011/0157093 A1 | 6/2011 | Bita et al. |
| 2011/0169783 A1* | 7/2011 | Wang et al. |
| 2011/0193776 A1* | 8/2011 | Oda .................. G06F 3/0383 345/157 |
| 2011/0199105 A1 | 8/2011 | Otagaki et al. |
| 2011/0210941 A1 | 9/2011 | Reynolds et al. |
| 2011/0227874 A1 | 9/2011 | Fahraeus et al. |
| 2011/0231139 A1 | 9/2011 | Yokota et al. |
| 2011/0234523 A1 | 9/2011 | Chang et al. |
| 2011/0241907 A1 | 10/2011 | Cordeiro |
| 2011/0248949 A1 | 10/2011 | Chang et al. |
| 2011/0254795 A1 | 10/2011 | Chen et al. |
| 2011/0261005 A1 | 10/2011 | Joharapurkar et al. |
| 2011/0261007 A1 | 10/2011 | Joharapurkar et al. |
| 2011/0282606 A1 | 11/2011 | Ahed et al. |
| 2011/0298727 A1 | 12/2011 | Yousefpor et al. |
| 2011/0310033 A1 | 12/2011 | Liu et al. |
| 2011/0310064 A1 | 12/2011 | Keski-Jaskari et al. |
| 2012/0026099 A1 | 2/2012 | Harley |
| 2012/0044199 A1 | 2/2012 | Karpin et al. |
| 2012/0050206 A1 | 3/2012 | Welland |
| 2012/0050214 A1 | 3/2012 | Kremin et al. |
| 2012/0050216 A1 | 3/2012 | Kremin et al. |
| 2012/0050217 A1 | 3/2012 | Noguchi et al. |
| 2012/0054379 A1 | 3/2012 | Leung et al. |
| 2012/0056662 A1 | 3/2012 | Wilson et al. |
| 2012/0056851 A1 | 3/2012 | Chen et al. |
| 2012/0075239 A1 | 3/2012 | Azumi et al. |
| 2012/0092288 A1 | 4/2012 | Wadia |
| 2012/0098776 A1 | 4/2012 | Chen et al. |
| 2012/0113047 A1 | 5/2012 | Hanauer et al. |
| 2012/0132006 A1 | 5/2012 | Roziere |
| 2012/0146726 A1 | 6/2012 | Huang et al. |
| 2012/0146920 A1 | 6/2012 | Lin et al. |
| 2012/0146942 A1 | 6/2012 | Kamoshida et al. |
| 2012/0154324 A1 | 6/2012 | Wright et al. |
| 2012/0162121 A1 | 6/2012 | Chang et al. |
| 2012/0162133 A1 | 6/2012 | Chen et al. |
| 2012/0162134 A1 | 6/2012 | Chen et al. |
| 2012/0169652 A1 | 7/2012 | Chang |
| 2012/0169653 A1 | 7/2012 | Chang |
| 2012/0169655 A1 | 7/2012 | Chang |
| 2012/0169656 A1 | 7/2012 | Chang |
| 2012/0169664 A1 | 7/2012 | Milne |
| 2012/0182251 A1 | 7/2012 | Krah |
| 2012/0187965 A1 | 7/2012 | Roziere |
| 2012/0188200 A1 | 7/2012 | Roziere |
| 2012/0188201 A1 | 7/2012 | Binstead |
| 2012/0211264 A1 | 8/2012 | Milne |
| 2012/0242597 A1 | 9/2012 | Hwang et al. |
| 2012/0249401 A1 | 10/2012 | Omoto |
| 2012/0262395 A1 | 10/2012 | Chan |
| 2012/0262410 A1 | 10/2012 | Lim |
| 2012/0274603 A1 | 11/2012 | Kim et al. |
| 2012/0287068 A1 | 11/2012 | Colgate et al. |
| 2012/0313881 A1 | 12/2012 | Ge et al. |
| 2012/0320385 A1 | 12/2012 | Mu et al. |
| 2013/0015868 A1 | 1/2013 | Peng |
| 2013/0016612 A1 | 1/2013 | Vasseur et al. |
| 2013/0021291 A1 | 1/2013 | Kremin et al. |
| 2013/0027118 A1 | 1/2013 | Ho et al. |
| 2013/0027346 A1 | 1/2013 | Yarosh et al. |
| 2013/0038573 A1 | 2/2013 | Chang et al. |
| 2013/0057511 A1 | 3/2013 | Shepelev et al. |
| 2013/0069911 A1 | 3/2013 | You |
| 2013/0076647 A1 | 3/2013 | Yousefpor et al. |
| 2013/0076648 A1 | 3/2013 | Krah et al. |
| 2013/0078945 A1 | 3/2013 | Lavi et al. |
| 2013/0093712 A1 | 4/2013 | Liu et al. |
| 2013/0100071 A1 | 4/2013 | Wright et al. |
| 2013/0120303 A1 | 5/2013 | Hong et al. |
| 2013/0127739 A1 | 5/2013 | Guard et al. |
| 2013/0141343 A1 | 6/2013 | Yu et al. |
| 2013/0141383 A1 | 6/2013 | Woolley |
| 2013/0154996 A1 | 6/2013 | Trend et al. |
| 2013/0170116 A1 | 7/2013 | In et al. |
| 2013/0173211 A1 | 7/2013 | Hoch et al. |
| 2013/0176271 A1 | 7/2013 | Sobel et al. |
| 2013/0176273 A1 | 7/2013 | Li et al. |
| 2013/0176276 A1 | 7/2013 | Shepelev |
| 2013/0181943 A1 | 7/2013 | Bulea et al. |
| 2013/0194229 A1 | 8/2013 | Sabo et al. |
| 2013/0215049 A1 | 8/2013 | Lee |
| 2013/0215075 A1 | 8/2013 | Lee et al. |

(56) References Cited

U.S. PATENT DOCUMENTS

| | | |
|---|---|---|
| 2013/0234964 A1 | 9/2013 | Kim et al. |
| 2013/0257785 A1 | 10/2013 | Brown et al. |
| 2013/0257797 A1 | 10/2013 | Wu et al. |
| 2013/0265276 A1 | 10/2013 | Obeidat et al. |
| 2013/0271427 A1 | 10/2013 | Benbasat et al. |
| 2013/0278447 A1 | 10/2013 | Kremin |
| 2013/0278498 A1 | 10/2013 | Jung et al. |
| 2013/0278525 A1 | 10/2013 | Lim et al. |
| 2013/0278543 A1 | 10/2013 | Hsu et al. |
| 2013/0285971 A1 | 10/2013 | Elias et al. |
| 2013/0293499 A1 | 11/2013 | Chang et al. |
| 2013/0307821 A1 | 11/2013 | Kogo |
| 2013/0308031 A1* | 11/2013 | Theuwissen ......... H04N 5/3454 348/308 |
| 2013/0314342 A1 | 11/2013 | Kim et al. |
| 2013/0320994 A1 | 12/2013 | Brittain et al. |
| 2013/0321289 A1 | 12/2013 | Dubery et al. |
| 2013/0328759 A1 | 12/2013 | Al-Dahle et al. |
| 2013/0335342 A1 | 12/2013 | Kim et al. |
| 2013/0342479 A1 | 12/2013 | Pyo et al. |
| 2014/0002406 A1 | 1/2014 | Cormier, Jr. et al. |
| 2014/0009438 A1 | 1/2014 | Liu et al. |
| 2014/0022201 A1 | 1/2014 | Boychuk et al. |
| 2014/0043546 A1 | 2/2014 | Yamazaki et al. |
| 2014/0049507 A1 | 2/2014 | Shepelev et al. |
| 2014/0070823 A1 | 3/2014 | Roziere |
| 2014/0071084 A1 | 3/2014 | Sugiura |
| 2014/0078096 A1 | 3/2014 | Tan et al. |
| 2014/0078097 A1 | 3/2014 | Shepelev et al. |
| 2014/0098051 A1 | 4/2014 | Hong et al. |
| 2014/0103712 A1 | 4/2014 | Blondin et al. |
| 2014/0104194 A1 | 4/2014 | Davidson et al. |
| 2014/0104223 A1 | 4/2014 | Hanssen et al. |
| 2014/0104225 A1 | 4/2014 | Davidson et al. |
| 2014/0104228 A1 | 4/2014 | Chen et al. |
| 2014/0111496 A1 | 4/2014 | Gomez et al. |
| 2014/0118270 A1 | 5/2014 | Moses et al. |
| 2014/0125357 A1 | 5/2014 | Blondin et al. |
| 2014/0125628 A1 | 5/2014 | Yoshida et al. |
| 2014/0132560 A1 | 5/2014 | Huang et al. |
| 2014/0145997 A1 | 5/2014 | Tiruvuru |
| 2014/0152615 A1 | 6/2014 | Chang et al. |
| 2014/0160058 A1 | 6/2014 | Chen et al. |
| 2014/0168540 A1 | 6/2014 | Wang et al. |
| 2014/0204058 A1 | 7/2014 | Huang et al. |
| 2014/0210779 A1 | 7/2014 | Katsuta et al. |
| 2014/0225838 A1 | 8/2014 | Gupta et al. |
| 2014/0232681 A1 | 8/2014 | Yeh |
| 2014/0232955 A1 | 8/2014 | Roudbari et al. |
| 2014/0240291 A1 | 8/2014 | Nam |
| 2014/0247245 A1 | 9/2014 | Lee |
| 2014/0253470 A1 | 9/2014 | Havilio |
| 2014/0267070 A1 | 9/2014 | Shahparnia et al. |
| 2014/0267146 A1 | 9/2014 | Chang et al. |
| 2014/0267165 A1 | 9/2014 | Roziere |
| 2014/0285469 A1 | 9/2014 | Wright et al. |
| 2014/0306924 A1 | 10/2014 | Lin et al. |
| 2014/0333582 A1 | 11/2014 | Huo |
| 2014/0347321 A1 | 11/2014 | Roziere |
| 2014/0347574 A1 | 11/2014 | Tung et al. |
| 2014/0362029 A1 | 12/2014 | Mo et al. |
| 2014/0362030 A1 | 12/2014 | Mo et al. |
| 2014/0362034 A1 | 12/2014 | Mo et al. |
| 2014/0362036 A1 | 12/2014 | Mo et al. |
| 2014/0368436 A1 | 12/2014 | Abzarian et al. |
| 2014/0368460 A1 | 12/2014 | Mo et al. |
| 2014/0375598 A1 | 12/2014 | Shen et al. |
| 2014/0375603 A1 | 12/2014 | Hotelling et al. |
| 2014/0375903 A1 | 12/2014 | Westhues et al. |
| 2015/0002176 A1 | 1/2015 | Kwon et al. |
| 2015/0002448 A1 | 1/2015 | Brunet et al. |
| 2015/0002464 A1 | 1/2015 | Nishioka et al. |
| 2015/0002752 A1 | 1/2015 | Shepelev et al. |
| 2015/0009421 A1* | 1/2015 | Choi ...................... G06F 3/0443 349/12 |
| 2015/0015528 A1 | 1/2015 | Vandermeijden |
| 2015/0026398 A1 | 1/2015 | Kim |
| 2015/0035768 A1 | 2/2015 | Shahparnia et al. |
| 2015/0035787 A1 | 2/2015 | Shahparnia et al. |
| 2015/0035797 A1 | 2/2015 | Shahparnia |
| 2015/0042600 A1* | 2/2015 | Lukanc ................. G06F 3/0443 345/174 |
| 2015/0042607 A1 | 2/2015 | Takanohashi |
| 2015/0049043 A1 | 2/2015 | Yousefpor |
| 2015/0049044 A1 | 2/2015 | Yousefpor et al. |
| 2015/0062063 A1 | 3/2015 | Cheng et al. |
| 2015/0077375 A1 | 3/2015 | Hotelling et al. |
| 2015/0077394 A1 | 3/2015 | Dai et al. |
| 2015/0084911 A1 | 3/2015 | Stronks et al. |
| 2015/0091587 A1 | 4/2015 | Shepelev et al. |
| 2015/0091843 A1 | 4/2015 | Ludden |
| 2015/0091849 A1 | 4/2015 | Ludden |
| 2015/0103047 A1 | 4/2015 | Hanauer et al. |
| 2015/0116263 A1 | 4/2015 | Kim |
| 2015/0123939 A1 | 5/2015 | Kim et al. |
| 2015/0194470 A1 | 7/2015 | Hwang |
| 2015/0227240 A1 | 8/2015 | Hong et al. |
| 2015/0242028 A1 | 8/2015 | Roberts et al. |
| 2015/0248177 A1 | 9/2015 | Maharyta |
| 2015/0253907 A1 | 9/2015 | Elias |
| 2015/0268789 A1 | 9/2015 | Liao et al. |
| 2015/0268795 A1 | 9/2015 | Kurasawa et al. |
| 2015/0277648 A1 | 10/2015 | Small |
| 2015/0309610 A1 | 10/2015 | Rabii et al. |
| 2015/0324035 A1 | 11/2015 | Yuan et al. |
| 2015/0338937 A1 | 11/2015 | Shepelev et al. |
| 2015/0370387 A1 | 12/2015 | Yamaguchi et al. |
| 2015/0378465 A1 | 12/2015 | Shih et al. |
| 2016/0018348 A1 | 1/2016 | Yau et al. |
| 2016/0018867 A1 | 1/2016 | Nys et al. |
| 2016/0034102 A1 | 2/2016 | Roziere et al. |
| 2016/0041629 A1 | 2/2016 | Rao et al. |
| 2016/0048234 A1* | 2/2016 | Chandran ............. G06F 3/0383 345/174 |
| 2016/0062533 A1 | 3/2016 | O'connor |
| 2016/0077667 A1 | 3/2016 | Chiang et al. |
| 2016/0098114 A1 | 4/2016 | Pylvas |
| 2016/0117017 A1 | 4/2016 | Kremin et al. |
| 2016/0117032 A1 | 4/2016 | Lin et al. |
| 2016/0139728 A1 | 5/2016 | Jeon et al. |
| 2016/0154505 A1 | 6/2016 | Chang et al. |
| 2016/0154529 A1 | 6/2016 | Westerman |
| 2016/0170533 A1 | 6/2016 | Roziere |
| 2016/0188040 A1 | 6/2016 | Shin et al. |
| 2016/0211808 A1 | 7/2016 | Lee et al. |
| 2016/0224177 A1 | 8/2016 | Krah |
| 2016/0224189 A1 | 8/2016 | Yousefpor et al. |
| 2016/0246403 A1 | 8/2016 | Zhao et al. |
| 2016/0246423 A1 | 8/2016 | Fu |
| 2016/0253034 A1 | 9/2016 | Gupta et al. |
| 2016/0253041 A1 | 9/2016 | Park et al. |
| 2016/0259448 A1 | 9/2016 | Guarneri |
| 2016/0266676 A1 | 9/2016 | Wang et al. |
| 2016/0266679 A1 | 9/2016 | Shahparnia et al. |
| 2016/0282980 A1 | 9/2016 | Chintalapoodi et al. |
| 2016/0283023 A1 | 9/2016 | Shin et al. |
| 2016/0299603 A1 | 10/2016 | Tsujioka et al. |
| 2016/0320898 A1 | 11/2016 | Tang et al. |
| 2016/0357344 A1 | 12/2016 | Benbasat et al. |
| 2017/0090599 A1 | 3/2017 | Kuboyama et al. |
| 2017/0090619 A1 | 3/2017 | Yousefpor et al. |
| 2017/0090644 A1 | 3/2017 | Yao et al. |
| 2017/0097703 A1 | 4/2017 | Lee |
| 2017/0108968 A1 | 4/2017 | Roziere |
| 2017/0139539 A1 | 5/2017 | Yao et al. |
| 2017/0168619 A1 | 6/2017 | Yang et al. |
| 2017/0168626 A1 | 6/2017 | Konicek |
| 2017/0220156 A1 | 8/2017 | Blondin et al. |
| 2017/0229502 A1* | 8/2017 | Liu ...................... H01L 27/14609 |
| 2017/0262121 A1 | 9/2017 | Kurasawa et al. |
| 2017/0269729 A1 | 9/2017 | Chintalapoodi |
| 2017/0285804 A1 | 10/2017 | Li et al. |
| 2017/0315646 A1 | 11/2017 | Roziere |
| 2017/0351378 A1 | 12/2017 | Wang et al. |

(56) References Cited

U.S. PATENT DOCUMENTS

| | | | |
|---|---|---|---|
| 2017/0357371 | A1 | 12/2017 | Kim et al. |
| 2018/0032176 | A1 | 2/2018 | Krah et al. |
| 2018/0067584 | A1 | 3/2018 | Zhu et al. |
| 2018/0074633 | A1 | 3/2018 | Kida et al. |
| 2018/0107309 | A1 | 4/2018 | Endo et al. |
| 2018/0224962 | A1 | 8/2018 | Mori |
| 2018/0275824 | A1 | 9/2018 | Li et al. |
| 2018/0307374 | A1 | 10/2018 | Shah et al. |
| 2018/0307375 | A1 | 10/2018 | Shah et al. |
| 2018/0314385 | A1 | 11/2018 | Gupta et al. |
| 2018/0367139 | A1 | 12/2018 | Pribisic et al. |
| 2019/0034032 | A1 | 1/2019 | Westerman |
| 2019/0073061 | A1 | 3/2019 | Krah et al. |
| 2019/0087051 | A1 | 3/2019 | Yao et al. |
| 2019/0138152 | A1 | 5/2019 | Yousefpor et al. |
| 2019/0220115 | A1 | 7/2019 | Mori et al. |
| 2020/0019265 | A1 | 1/2020 | Krah et al. |
| 2020/0333902 | A1 | 10/2020 | Li et al. |
| 2020/0341585 | A1 | 10/2020 | Li et al. |

FOREIGN PATENT DOCUMENTS

| | | | |
|---|---|---|---|
| CN | 1527274 | A | 9/2004 |
| CN | 1577385 | A | 2/2005 |
| CN | 1672119 | A | 9/2005 |
| CN | 1689677 | A | 11/2005 |
| CN | 1711520 | A | 12/2005 |
| CN | 1739083 | A | 2/2006 |
| CN | 1782837 | A | 6/2006 |
| CN | 1818842 | A | 8/2006 |
| CN | 1864124 | A | 11/2006 |
| CN | 1945516 | A | 4/2007 |
| CN | 101046720 | A | 10/2007 |
| CN | 101071354 | A | 11/2007 |
| CN | 101122838 | A | 2/2008 |
| CN | 101236320 | A | 8/2008 |
| CN | 101349957 | A | 1/2009 |
| CN | 101354620 | A | 1/2009 |
| CN | 101419516 | A | 4/2009 |
| CN | 201218943 | Y | 4/2009 |
| CN | 101840293 | A | 9/2010 |
| CN | 101859215 | A | 10/2010 |
| CN | 102023768 | A | 4/2011 |
| CN | 102411460 | A | 4/2012 |
| CN | 102483659 | A | 5/2012 |
| CN | 102483673 | A | 5/2012 |
| CN | 102654664 | A | 9/2012 |
| CN | 102760405 | A | 10/2012 |
| CN | 102804114 | A | 11/2012 |
| CN | 103019485 | A | 4/2013 |
| CN | 103049148 | A | 4/2013 |
| CN | 103052930 | A | 4/2013 |
| CN | 103135815 | A | 6/2013 |
| CN | 202976038 | U | 6/2013 |
| CN | 103221910 | A | 7/2013 |
| CN | 103258492 | A | 8/2013 |
| CN | 103294321 | A | 9/2013 |
| CN | 103365506 | A | 10/2013 |
| CN | 103577008 | A | 2/2014 |
| CN | 103809810 | A | 5/2014 |
| CN | 103885627 | A | 6/2014 |
| CN | 103955322 | A | 7/2014 |
| CN | 203720826 | U | 7/2014 |
| CN | 104020880 | A | 9/2014 |
| CN | 104020908 | A | 9/2014 |
| CN | 104142757 | A | 11/2014 |
| CN | 104252266 | A | 12/2014 |
| CN | 105045446 | A | 11/2015 |
| CN | 105278739 | A | 1/2016 |
| CN | 105302395 | A | 2/2016 |
| CN | 105320383 | A | 2/2016 |
| CN | 105474154 | A | 4/2016 |
| CN | 205334405 | U | 6/2016 |
| CN | 105824461 | A | 8/2016 |
| CN | 107533393 | A | 1/2018 |
| DE | 112008001245 | T5 | 3/2010 |
| DE | 112012004912 | T5 | 8/2014 |
| EP | 0853230 | A1 | 7/1998 |
| EP | 1192585 | A1 | 4/2002 |
| EP | 1278390 | A1 | 1/2003 |
| EP | 1391807 | A1 | 2/2004 |
| EP | 1455264 | A2 | 9/2004 |
| EP | 1496425 | A1 | 1/2005 |
| EP | 1573706 | A2 | 9/2005 |
| EP | 1573706 | A3 | 9/2005 |
| EP | 1192585 | B1 | 12/2005 |
| EP | 1644918 | A2 | 4/2006 |
| EP | 1717677 | A2 | 11/2006 |
| EP | 1455264 | A3 | 3/2007 |
| EP | 1717677 | A3 | 1/2008 |
| EP | 1986084 | A1 | 10/2008 |
| EP | 2077489 | A1 | 7/2009 |
| EP | 2148264 | A2 | 1/2010 |
| EP | 2224277 | A1 | 9/2010 |
| EP | 2256606 | A2 | 12/2010 |
| FR | 2756048 | A1 | 5/1998 |
| FR | 2896595 | A1 | 7/2007 |
| FR | 2949008 | A1 | 2/2011 |
| FR | 3004551 | A1 | 10/2014 |
| GB | 1546317 | A | 5/1979 |
| GB | 2144146 | A | 2/1985 |
| GB | 2428306 | A | 1/2007 |
| GB | 2437827 | A | 11/2007 |
| GB | 2450207 | A | 12/2008 |
| JP | 10-505183 | A | 5/1998 |
| JP | 2000-163031 | A | 6/2000 |
| JP | 2002-342033 | A | 11/2002 |
| JP | 2004-503835 | A | 2/2004 |
| JP | 2004-526265 | A | 8/2004 |
| JP | 2005-84128 | A | 3/2005 |
| JP | 2005-301373 | A | 10/2005 |
| JP | 2006-251927 | A | 9/2006 |
| JP | 2007-18515 | A | 1/2007 |
| JP | 2008-510251 | A | 4/2008 |
| JP | 2008-117371 | A | 5/2008 |
| JP | 2008-225415 | A | 9/2008 |
| JP | 2009-86240 | A | 4/2009 |
| JP | 2009-157373 | A | 7/2009 |
| KR | 10-2004-0002983 | A | 1/2004 |
| KR | 10-2004-0091728 | A | 10/2004 |
| KR | 10-2007-0002327 | A | 1/2007 |
| KR | 10-2008-0019125 | A | 3/2008 |
| KR | 10-2010-0054899 | A | 5/2010 |
| KR | 10-2012-0085737 | A | 8/2012 |
| KR | 10-2013-0054463 | A | 5/2013 |
| KR | 10-2013-0094495 | A | 8/2013 |
| KR | 10-2013-0117499 | A | 10/2013 |
| KR | 10-2014-0043395 | A | 4/2014 |
| KR | 10-2014-0074454 | A | 6/2014 |
| KR | 10-1609992 | B1 | 4/2016 |
| TW | 200715015 | A | 4/2007 |
| TW | 200826032 | A | 6/2008 |
| TW | 200835294 | A | 8/2008 |
| TW | M341273 | U | 9/2008 |
| TW | M344522 | U | 11/2008 |
| TW | M344544 | U | 11/2008 |
| TW | 201115442 | A1 | 5/2011 |
| TW | 201401129 | A | 1/2014 |
| TW | 201419071 | A | 5/2014 |
| WO | 97/18508 | A1 | 5/1997 |
| WO | 99/35633 | A2 | 7/1999 |
| WO | 99/35633 | A3 | 9/1999 |
| WO | 00/73984 | A1 | 12/2000 |
| WO | 01/97204 | A1 | 12/2001 |
| WO | 2004/013833 | A2 | 2/2004 |
| WO | 2004/114265 | A2 | 12/2004 |
| WO | 2005/114369 | A2 | 12/2005 |
| WO | 2005/114369 | A3 | 1/2006 |
| WO | 2006/020305 | A2 | 2/2006 |
| WO | 2006/023147 | A2 | 3/2006 |
| WO | 2006/023147 | A3 | 5/2006 |
| WO | 2006/104745 | A2 | 10/2006 |
| WO | 2006/126703 | A2 | 11/2006 |
| WO | 2006/130584 | A2 | 12/2006 |

(56) References Cited

FOREIGN PATENT DOCUMENTS

| | | |
|---|---|---|
| WO | 2007/012899 A1 | 2/2007 |
| WO | 2007/034591 A1 | 3/2007 |
| WO | 2006/020305 A3 | 5/2007 |
| WO | 2006/104745 A3 | 5/2007 |
| WO | 2006/130584 A3 | 5/2007 |
| WO | 2007/058727 A1 | 5/2007 |
| WO | 2007/066488 A1 | 6/2007 |
| WO | 2007/089766 A2 | 8/2007 |
| WO | 2007/115032 A2 | 10/2007 |
| WO | 2007/146780 A2 | 12/2007 |
| WO | 2007/146785 A2 | 12/2007 |
| WO | 2008/000964 A1 | 1/2008 |
| WO | 2008/007118 A2 | 1/2008 |
| WO | 2008/030780 A1 | 3/2008 |
| WO | 2008/047990 A1 | 4/2008 |
| WO | 2007/146785 A3 | 5/2008 |
| WO | 2008/076237 A2 | 6/2008 |
| WO | 2008/007118 A3 | 8/2008 |
| WO | 2007/089766 A3 | 9/2008 |
| WO | 2007/146780 A3 | 9/2008 |
| WO | 2008/108514 A1 | 9/2008 |
| WO | 2008/135713 A1 | 11/2008 |
| WO | 2009/046363 A1 | 4/2009 |
| WO | 2009/103946 A1 | 8/2009 |
| WO | 2009/132146 A1 | 10/2009 |
| WO | 2009/132150 A1 | 10/2009 |
| WO | 2010/088659 A1 | 8/2010 |
| WO | 2010/117882 A2 | 10/2010 |
| WO | 2011/015795 A2 | 2/2011 |
| WO | 2011/028451 A1 | 3/2011 |
| WO | 2011/071784 A1 | 6/2011 |
| WO | 2011/015795 A3 | 7/2011 |
| WO | 2011/137200 A1 | 11/2011 |
| WO | 2013/093327 A1 | 6/2013 |
| WO | 2013/158570 A1 | 10/2013 |
| WO | 2014/127716 A1 | 8/2014 |
| WO | 2015/017196 A1 | 2/2015 |
| WO | 2015/023410 A1 | 2/2015 |
| WO | 2015/072722 A1 | 5/2015 |
| WO | 2015/107969 A1 | 7/2015 |
| WO | 2015/178920 A1 | 11/2015 |
| WO | 2016/048269 A1 | 3/2016 |
| WO | 2016/069642 A1 | 5/2016 |
| WO | 2016/144437 A1 | 9/2016 |
| WO | 2017/058415 A2 | 4/2017 |

OTHER PUBLICATIONS

Final Office Action received for U.S. Appl. No. 16/192,664, dated Nov. 19, 2020, 11 pages.
Notice of Allowance received for U.S. Appl. No. 15/313,549, dated Oct. 21, 2020, 10 pages.
Extended European Search report received for European Patent Application No. 08022505.5, dated Apr. 25, 2012, 12 pages.
Extended European Search Report received for European Patent Application No. 10151969.2, dated Jul. 21, 2010, 6 pages.
Extended European Search Report received for European Patent Application No. 12162177.5, dated Dec. 3, 2012, 7 pages.
Extended European Search Report received for European Patent Application No. 12192450.0, dated Feb. 13, 2013, 6 pages.
Extended European Search Report received for European Patent Application No. 15166813.4, dated Aug. 31, 2015, 8 pages.
Extended European Search Report received for European Patent Application No. 18197785.1, dated Apr. 5, 2019, 8 pages.
Final Office Action received for U.S. Appl. No. 11/818,498, dated Jan. 3, 2013, 17 pages.
Final Office Action received for U.S. Appl. No. 12/206,680, dated Jan. 5, 2012, 16 pages.
Final Office Action received for U.S. Appl. No. 12/206,680, dated Jan. 27, 2014, 20 pages.
Final Office Action received for U.S. Appl. No. 12/206,680, dated May 22, 2013, 16 pages.
Final Office Action received for U.S. Appl. No. 12/238,333, dated Apr. 22, 2015, 23 pages.
Final Office Action received for U.S. Appl. No. 12/238,333, dated Aug. 12, 2013, 19 pages.
Final Office Action received for U.S. Appl. No. 12/238,342, dated Aug. 13, 2013, 14 pages.
Final Office Action received for U.S. Appl. No. 12/238,342, dated Oct. 22, 2014, 16 pages.
Final Office Action received for U.S. Appl. No. 12/494,173, dated Apr. 30, 2013, 7 pages.
Final Office Action received for U.S. Appl. No. 12/500,911, dated Feb. 5, 2013, 16 pages.
Final Office Action received for U.S. Appl. No. 12/545,604, dated Jul. 16, 2014, 18 pages.
Final Office Action received for U.S. Appl. No. 12/545,604, dated Jul. 19, 2013, 18 pages.
Final Office Action received for U.S. Appl. No. 12/545,754, dated Jun. 21, 2013, 6 pages.
Final Office Action received for U.S. Appl. No. 12/642,466, dated Feb. 1, 2013, 10 pages.
Final Office Action received for U.S. Appl. No. 12/642,466, dated Jan. 29, 2016, 10 pages.
Final Office Action received for U.S. Appl. No. 12/642,466, dated May 9, 2014, 13 pages.
Final Office Action received for U.S. Appl. No. 12/847,987, dated Apr. 23, 2014, 16 pages.
Final Office Action received for U.S. Appl. No. 13/448,182, dated Jun. 11, 2015, 13 pages.
Final Office Action received for U.S. Appl. No. 13/448,182, dated Oct. 22, 2014, 12 pages.
Final Office Action received for U.S. Appl. No. 13/899,391, dated Apr. 8, 2016, 10 pages.
Final Office Action received for U.S. Appl. No. 14/082,003, dated Jan. 4, 2016, 26 pages.
Final Office Action received for U.S. Appl. No. 14/082,003, dated Nov. 4, 2016, 19 pages.
Final Office Action received for U.S. Appl. No. 14/082,074, dated Nov. 12, 2015, 23 pages.
Final Office Action received for U.S. Appl. No. 14/318,157, dated Jul. 26, 2017, 10 pages.
Final Office Action received for U.S. Appl. No. 14/318,157, dated May 9, 2016, 10 pages.
Final Office Action received for U.S. Appl. No. 14/550,686, dated Aug. 21, 2017, 12 pages.
Final Office Action received for U.S. Appl. No. 14/550,686, dated Jun. 14, 2016, 11 pages.
Final Office Action received for U.S. Appl. No. 14/558,529, dated Sep. 29, 2016, 23 pages.
Final Office Action received for U.S. Appl. No. 14/645,120, dated Aug. 10, 2017, 13 pages.
Final Office Action received for U.S. Appl. No. 14/645,120, dated May 27, 2016, 13 pages.
Final Office Action received for U.S. Appl. No. 14/993,017, dated Aug. 16, 2018, 35 pages.
Final Office Action received for U.S. Appl. No. 15/006,987, dated Dec. 5, 2017, 19 pages.
Final Office Action received for U.S. Appl. No. 15/006,987, dated May 14, 2018, 11 pages.
Final Office Action received for U.S. Appl. No. 15/009,774, dated Feb. 6, 2019, 16 pages.
Final Office Action received for U.S. Appl. No. 15/017,463, dated May 17, 2018, 22 pages.
Final Office Action received for U.S. Appl. No. 15/097,179, dated Jul. 27, 2018, 12 pages.
Final Office Action received for U.S. Appl. No. 15/226,628, dated Mar. 28, 2018, 17 pages.
Final Office Action received for U.S. Appl. No. 15/313,549, dated Dec. 18, 2019, 24 pages.
Final Office Action received for U.S. Appl. No. 15/507,722, dated Sep. 13, 2019, 18 pages.
Final Office Action received for U.S. Appl. No. 16/192,664, dated Apr. 16, 2020, 10 pages.

(56) References Cited

OTHER PUBLICATIONS

International Search Report received for PCT Patent Application No. PCT/US2010/022868, dated Mar. 10, 2010, 3 pages.
International Search Report received for PCT Patent Application No. PCT/US2010/029698, dated Jan. 14, 2011, 5 pages.
International Search Report received for PCT Patent Application No. PCT/US2010/058988, dated May 2, 2011, 4 pages.
International Search Report received for PCT Patent Application No. PCT/US2013/036662, dated Aug. 6, 2013, 3 pages.
International Search Report received for PCT Patent Application No. PCT/US2014/039245, dated Sep. 24, 2014, 3 pages.
International Search Report received for PCT Patent Application No. PCT/US2014/047888, dated Jan. 29, 2015, 6 pages.
International Search Report received for PCT Patent Application No. PCT/US2014/056795, dated Dec. 12, 2014, 3 pages.
International Search Report received for PCT Patent Application No. PCT/US2015/057644, dated Jan. 8, 2016, 3 pages.
International Search Report received for PCT Patent Application No. PCT/US2016/015479, dated May 9, 2016, 3 pages.
International Search Report received for PCT Patent Application No. PCT/US2016/016011, dated May 11, 2016, 6 pages.
Non-Final Office Action received for U.S. Appl. No. 11/818,498, dated May 25, 2012, 17 pages.
Non-Final Office Action received for U.S. Appl. No. 12/206,680, dated Jun. 9, 2011, 14 pages.
Non-Final Office Action received for U.S. Appl. No. 12/206,680, dated Sep. 26, 2012, 14 pages.
Non-Final Office Action received for U.S. Appl. No. 12/206,680, dated Sep. 30, 2013, 19 pages.
Non-Final Office Action received for U.S. Appl. No. 12/238,333, dated Jan. 7, 2013, 21 pages.
Non-Final Office Action received for U.S. Appl. No. 12/238,333, dated May 3, 2012, 24 pages.
Non-Final Office Action received for U.S. Appl. No. 12/238,333, dated Sep. 18, 2014, 22 pages.
Non-Final Office Action received for U.S. Appl. No. 12/238,342, dated Feb. 15, 2013, 18 pages.
Non-Final Office Action received for U.S. Appl. No. 12/238,342, dated Mar. 9, 2012, 27 pages.
Non-Final Office Action received for U.S. Appl. No. 12/238,342, dated Mar. 12, 2014, 17 pages.
Non-Final Office Action received for U.S. Appl. No. 12/494,173, dated Nov. 28, 2012, 7 pages.
Non-Final Office Action received for U.S. Appl. No. 12/500,911, dated Jun. 7, 2012, 17 pages.
Non-Final Office Action received for U.S. Appl. No. 12/545,557, dated Jan. 3, 2014, 10 pages.
Non-Final Office Action received for U.S. Appl. No. 12/545,557, dated Nov. 23, 2012, 11 pages.
Non-Final Office Action received for U.S. Appl. No. 12/545,604, dated Dec. 19, 2013, 17 pages.
Non-Final Office Action received for U.S. Appl. No. 12/545,604, dated Jan. 7, 2013, 13 pages.
Non-Final Office Action received for U.S. Appl. No. 12/545,754, dated Jan. 2, 2014, 12 pages.
Non-Final Office Action received for U.S. Appl. No. 12/545,754, dated Oct. 5, 2012, 10 pages.
Non-Final Office Action received for U.S. Appl. No. 12/545,754, dated Sep. 10, 2013, 6 pages.
Non-Final Office Action received for U.S. Appl. No. 12/642,466, dated Aug. 28, 2012, 10 pages.
Non-Final Office Action received for U.S. Appl. No. 12/642,466, dated May 4, 2015, 10 pages.
Non-Final Office Action received for U.S. Appl. No. 12/642,466, dated Nov. 8, 2013, 13 pages.
Non-Final Office Action received for U.S. Appl. No. 12/847,987, dated Sep. 6, 2013, 16 pages.
Non-Final Office Action received for U.S. Appl. No. 13/448,182, dated Jan. 31, 2014, 18 pages.
Non-Final Office Action received for U.S. Appl. No. 13/737,779, dated Mar. 29, 2013, 10 pages.
Non-Final Office Action received for U.S. Appl. No. 13/766,376, dated Jul. 31, 2015, 29 pages.
Non-Final Office Action received for U.S. Appl. No. 13/899,391, dated Oct. 5, 2015, 11 pages.
Non-Final Office Action received for U.S. Appl. No. 14/055,717, dated Apr. 10, 2014, 11 pages.
Non-Final Office Action received for U.S. Appl. No. 14/082,003, dated Mar. 13, 2017, 21 pages.
Non-Final Office Action received for U.S. Appl. No. 14/082,003, dated May 8, 2015, 26 pages.
Non-Final Office Action received for U.S. Appl. No. 14/082,003, dated May 25, 2016, 23 pages.
Non-Final Office Action received for U.S. Appl. No. 14/082,074, dated Apr. 10, 2015, 24 pages.
Non-Final Office Action received for U.S. Appl. No. 14/318,157, dated Apr. 3, 2018, 12 pages.
Non-Final Office Action received for U.S. Appl. No. 14/318,157, dated Dec. 19, 2016, 11 pages.
Non-Final Office Action received for U.S. Appl. No. 14/318,157, dated Oct. 6, 2015, 8 pages.
Non-Final Office Action received for U.S. Appl. No. 14/550,686, dated Aug. 20, 2015, 11 pages.
Non-Final Office Action received for U.S. Appl. No. 14/550,686, dated Dec. 14, 2016, 8 pages.
Non-Final Office Action received for U.S. Appl. No. 14/558,529, dated Apr. 14, 2016, 21 pages.
Non-Final Office Action received for U.S. Appl. No. 14/558,529, dated Jun. 26, 2017, 6 pages.
Non-Final Office Action received for U.S. Appl. No. 14/615,186, dated Jun. 1, 2016, 9 pages.
Non-Final Office Action received for U.S. Appl. No. 14/645,120, dated Dec. 16, 2016, 11 pages.
Non-Final Office Action received for U.S. Appl. No. 14/645,120, dated Oct. 27, 2015, 9 pages.
Non-Final Office Action received for U.S. Appl. No. 14/993,017, dated Dec. 22, 2017, 24 pages.
Non-Final Office Action received for U.S. Appl. No. 14/993,017, dated Jan. 18, 2019, 35 pages.
Non-Final Office Action received for U.S. Appl. No. 15/006,987, dated Jun. 14, 2017, 14 pages.
Non-Final Office Action received for U.S. Appl. No. 15/009,774, dated Jun. 20, 2018, 19 pages.
Non-Final Office Action received for U.S. Appl. No. 15/009,774, dated Sep. 4, 2019, 18 pages.
Non-Final Office Action received for U.S. Appl. No. 15/017,463, dated May 15, 2019, 20 pages.
Non-Final Office Action received for U.S. Appl. No. 15/017,463, dated Sep. 14, 2017, 22 pages.
Non-Final Office Action received for U.S. Appl. No. 15/039,400, dated Nov. 24, 2017, 17 pages.
Non-Final Office Action received for U.S. Appl. No. 15/087,956, dated Jan. 18, 2019, 13 pages.
Non-Final Office Action received for U.S. Appl. No. 15/089,432, dated Jan. 24, 2018, 28 pages.
Non-Final Office Action received for U.S. Appl. No. 15/097,179, dated Jan. 22, 2018, 12 pages.
Non-Final Office Action received for U.S. Appl. No. 15/144,706, dated Apr. 7, 2017, 8 pages.
Non-Final Office Action received for U.S. Appl. No. 15/148,798, dated Oct. 30, 2017, 11 pages.
Non-Final Office Action received for U.S. Appl. No. 15/226,628, dated Aug. 11, 2017, 11 pages.
Non-Final Office Action received for U.S. Appl. No. 15/226,628, dated Aug. 27, 2018, 17 pages.
Non-Final Office Action received for U.S. Appl. No. 15/311,836, dated Dec. 15, 2017, 15 pages.
Non-Final Office Action received for U.S. Appl. No. 15/313,549, dated Apr. 23, 2020, 33 pages.
Non-Final Office Action received for U.S. Appl. No. 15/313,549, dated Dec. 21, 2018, 14 pages.

(56) References Cited

OTHER PUBLICATIONS

Non-Final Office Action received for U.S. Appl. No. 15/313,549, dated Jul. 10, 2019, 25 pages.
Non-Final Office Action received for U.S. Appl. No. 15/507,722, dated Feb. 11, 2019, 16 pages.
Non-Final Office Action received for U.S. Appl. No. 15/522,737, dated Jan. 2, 2019, 14 pages.
Non-Final Office Action received for U.S. Appl. No. 15/687,354, dated May 23, 2019, 18 pages.
Non-Final Office Action received for U.S. Appl. No. 16/030,654, dated Feb. 21, 2020, 15 pages.
Non-Final Office Action received for U.S. Appl. No. 16/179,565, dated Dec. 13, 2018, 9 pages.
Non-Final Office Action received for U.S. Appl. No. 16/192,664, dated Nov. 26, 2019, 9 pages.
Non-Final Office Action received for U.S. Appl. No. 16/201,730, dated May 10, 2019, 9 pages.
Non-Final Office Action received for U.S. Appl. No. 16/581,721, dated Oct. 30, 2019, 10 pages.
Notice of Allowance received for U.S. Appl. No. 12/238,333, dated Dec. 1, 2015, 10 pages.
Notice of Allowance received for U.S. Appl. No. 12/494,173, dated Oct. 15, 2014, 8 pages.
Notice of Allowance received for U.S. Appl. No. 12/500,911, dated Aug. 19, 2013, 7 pages.
Notice of Allowance received for U.S. Appl. No. 12/545,557, dated Apr. 11, 2014, 9 pages.
Notice of Allowance received for U.S. Appl. No. 12/545,557, dated Jun. 10, 2013, 9 pages.
Notice of Allowance received for U.S. Appl. No. 12/545,754, dated Aug. 21, 2014, 10 pages.
Notice of Allowance received for U.S. Appl. No. 13/448,182, dated Jan. 8, 2016, 9 pages.
Notice of Allowance received for U.S. Appl. No. 13/737,779, dated Sep. 3, 2013, 11 pages.
Notice of Allowance received for U.S. Appl. No. 13/766,376, dated Jan. 11, 2016, 10 pages.
Notice of Allowance received for U.S. Appl. No. 14/055,717, dated Nov. 7, 2014, 7 pages.
Notice of Allowance received for U.S. Appl. No. 14/082,003, dated Oct. 3, 2017, 10 pages.
Notice of Allowance received for U.S. Appl. No. 14/082,003, dated Sep. 20, 2017, 9 pages.
Notice of Allowance received for U.S. Appl. No. 14/312,489, dated Mar. 16, 2015, 8 pages.
Notice of Allowance received for U.S. Appl. No. 14/318,157, dated Dec. 31, 2018, 8 pages.
Notice of Allowance received for U.S. Appl. No. 14/550,686, dated Feb. 9, 2018, 11 pages.
Notice of Allowance received for U.S. Appl. No. 14/558,529, dated Oct. 13, 2017, 8 pages.
Notice of Allowance received for U.S. Appl. No. 14/615,186, dated Dec. 2, 2016, 7 pages.
Notice of Allowance received for U.S. Appl. No. 14/645,120, dated Mar. 1, 2018, 6 pages.
Notice of Allowance received for U.S. Appl. No. 14/993,017, dated Jul. 12, 2019, 10 pages.
Notice of Allowance received for U.S. Appl. No. 15/009,774, dated Jul. 1, 2020, 6 pages.
Notice of Allowance received for U.S. Appl. No. 15/009,774, dated Mar. 20, 2020, 16 pages.
Notice of Allowance received for U.S. Appl. No. 15/039,400, dated Nov. 14, 2018, 2 pages.
Notice of Allowance received for U.S. Appl. No. 15/039,400, dated Oct. 12, 2018, 9 pages.
Notice of Allowance received for U.S. Appl. No. 15/087,956, dated Mar. 11, 2019, 11 pages.
Notice of Allowance received for U.S. Appl. No. 15/089,432, dated Jul. 30, 2018, 10 pages.
Notice of Allowance received for U.S. Appl. No. 15/144,706, dated Sep. 20, 2017, 9 pages.
Notice of Allowance received for U.S. Appl. No. 15/148,798, dated Mar. 14, 2018, 10 pages.
Notice of Allowance received for U.S. Appl. No. 15/226,628, dated Apr. 3, 2019, 6 pages.
Notice of Allowance received for U.S. Appl. No. 15/311,836, dated Jul. 5, 2018, 9 pages.
Notice of Allowance received for U.S. Appl. No. 15/507,722, dated Feb. 27, 2020, 9 pages.
Notice of Allowance received for U.S. Appl. No. 15/663,271, dated Jul. 5, 2018, 10 pages.
Notice of Allowance received for U.S. Appl. No. 15/687,078, dated Apr. 3, 2019, 9 pages.
Notice of Allowance received for U.S. Appl. No. 15/687,354, dated Sep. 6, 2019, 12 pages.
Notice of Allowance received for U.S. Appl. No. 15/691,283, dated Jun. 5, 2019, 10 pages.
Notice of Allowance received for U.S. Appl. No. 16/179,565, dated Jun. 6, 2019, 7 pages.
Notice of Allowance received for U.S. Appl. No. 16/581,721, dated Apr. 22, 2020, 5 pages.
Notice of Allowance received for U.S. Appl. No. 16/030,654, dated Jun. 16, 2020, 8 pages.
Pre-Interview First Office Action received for U.S. Appl. No. 15/686,969, dated Apr. 4, 2019, 4 pages.
Restriction Requirement received for U.S. Appl. No. 13/766,376, dated Mar. 16, 2015, 6 pages.
Restriction Requirement received for U.S. Appl. No. 15/087,956, dated Feb. 13, 2018, 8 pages.
Restriction Requirement received for U.S. Appl. No. 15/089,432, dated Jul. 17, 2017, 5 pages.
Search Report received for Chinese Patent Application No. 201310042816.6, completed on May 18, 2015, 4 pages (2 pages of English Translation and 2 pages of Official copy).
Search Report received for Chinese Patent Application No. 201680008313.9, dated Jul. 5, 2019, 4 pages (2 pages English Translation and 2 pages of Official copy).
Search Report received for Chinese Patent Application No. ZL201020108330.X, completed on Dec. 14, 2011, 12 pages (English Translation only).
Search Report received for European Patent Application No. 17183937.6, dated Jan. 31, 2018, 4 pages.
Search Report received for Netherlands Patent Application No. 2001672, dated Apr. 29, 2009, 8 pages.
Search Report received for Taiwanese Patent Application No. 103105965, dated Nov. 12, 2015, 2 pages (1 page of English Translation and 1 page of Official copy).
Search Report received for Taiwanese Patent Application No. 103116003, dated Oct. 14, 2015, 2 pages (1 page of English Translation and 1 page of Official copy).
Search Report received for Taiwanese Patent Application No. 104115152, dated May 3, 2016, 2 pages (1 page of English Translation and 1 page of Official copy).
Supplementary European Search Report received for European Patent Application No. 14902458.0, dated Jul. 27, 2017, 4 pages.
Cassidy Robin, "The Tissot T-Touch Watch—A Groundbreaking Timepiece", Ezine Articles, Available online at: <http://ezinearticles.com/?The-Tissot-T-Touch-Watch---A-Groundbreaking-Timepiece&id=...>, Feb. 23, 2007, 2 pages.
Gibilisco Stan, "The Illustrated Dictionary of Electronics", Eighth Edition, 2001, p. 173.
Lee et al., "A Multi-Touch Three Dimensional Touch-Sensitive Tablet", CHI'85 Proceedings, Apr. 1985, pp. 21-25.
Lowe Doug, "Electronics Components: How to Use an Op Amp as a Voltage Comparator", Dummies, Available online at: <https://www.dummies.com/programming/electronics/components/electronics-components-how-to-use-an-op-amp-as-a-voltage-comparator/>, 2012, 9 pages.
Malik et al., "Visual Touchpad: A Two-Handed Gestural Input Device", Proceedings of the 6th International Conference on Multimodal Interfaces, State College, PA, ICMI '04, ACM, Oct. 13-15, 2004, pp. 289-296.

(56) References Cited

OTHER PUBLICATIONS

O'Connor Todd, "mTouch Projected Capacitive Touch Screen Sensing Theory of Operation", Microchip TB3064, Microchip Technology Inc., 2010, pp. 1-16.
Rekimoto J., "SmartSkin: An Infrastructure for Freehand Manipulation on Interactive Surfaces", CHI 2002 Conference Proceedings, Conference on Human Factors in Computing Systems, Minneapolis, vol. 4, No. 1, Apr. 20-25, 2002, pp. 113-120.
Rubine Dean, "Combining Gestures and Direct Manipulation", CHI'92, May 3-7, 1992, pp. 659-660.
Rubine Dean H., "The Automatic Recognition of Gestures", CMU-CS-91-202, Submitted in Partial Fulfillment of the Requirements for the Degree of Doctor of Philosophy in Computer Science at Carnegie Mellon University, Dec. 1991, 285 pages.
Westerman Wayne, "Hand Tracking, Finger Identification, and Chordic Manipulation on a Multi-Touch Surface", A Dissertation Submitted to the Faculty of the University of Delaware in Partial Fulfillment of the Requirements for the Degree of Doctor of Philosophy in Electrical Engineering, 1999, 363 pages.
Wilson Andrew D., "Robust Computer Vision-Based Detection of Pinching for One and Two-Handed Gesture Input", ACM, USIT '06, Montreux, Oct. 15-18, 2006, 4 pages.
Yang et al., "A Noise-Immune High-Speed Readout Circuit for In-Cell Touch Screen Panels", IEEE Transactions on Circuits and Systems-I: Regular Papers vol. 60, No. 7, Jul. 2013, pp. 1800-1809.
Advisory Action received for U.S. Appl. No. 11/818,498, dated May 17, 2013, 5 pages.
Advisory Action received for U.S. Appl. No. 11/818,498, dated Oct. 14, 2011, 5 pages.
Advisory Action received for U.S. Appl. No. 12/206,680, dated Apr. 16, 2012, 3 pages.
Advisory Action received for U.S. Appl. No. 12/238,333, dated Dec. 17, 2013, 3 pages.
Advisory Action received for U.S. Appl. No. 12/238,333, dated Oct. 21, 2015, 4 pages.
Advisory Action received for U.S. Appl. No. 12/500,911, dated May 17, 2013, 3 pages.
Advisory Action received for U.S. Appl. No. 12/642,466, dated May 23, 2013, 2 pages.
Advisory Action received for U.S. Appl. No. 14/082,003, dated Mar. 10, 2016, 3 pages.
Advisory Action received for U.S. Appl. No. 14/645,120, dated Nov. 25, 2016, 3 pages.
Advisory Action received for U.S. Appl. No. 15/017,463, dated Aug. 8, 2018, 3 pages.
Examiner's Answer to Appeal Brief received for U.S. Appl. No. 11/818,498, dated Dec. 20, 2013, 17 pages.
Final Office Action received for U.S. Appl. No. 11/818,498, dated Jun. 10, 2011, 16 pages.
Final Office Action received for U.S. Appl. No. 15/017,463, dated Feb. 13, 2020, 22 pages.
Final Office Action received for U.S. Appl. No. 15/522,737, dated Sep. 12, 2019, 15 pages.
Final Office Action received for U.S. Appl. No. 16/152,326, dated Jan. 27, 2020, 10 pages.
Final Office Action received for U.S. Appl. No. 16/201,730, dated Nov. 1, 2019, 11 pages.
First Action Interview Office Action received for U.S. Appl. No. 15/686,969, dated Aug. 19, 2019, 7 pages.
Non-Final Office Action received for U.S. Appl. No. 11/818,498, dated Dec. 13, 2010, 16 pages.
Non-Final Office Action received for U.S. Appl. No. 16/152,326, dated Aug. 14, 2019, 12 pages.
Non-Final Office Action received for U.S. Appl. No. 16/152,326, dated Jun. 29, 2020, 10 pages.
Non-Final Office Action received for U.S. Appl. No. 16/192,664, dated Jul. 30, 2020, 10 pages.
Notice of Allowance received for U.S. Appl. No. 12/545,604, dated Oct. 5, 2015, 9 pages.
Notice of Allowance received for U.S. Appl. No. 15/522,737, dated Mar. 6, 2020, 8 pages.
Notice of Allowance received for U.S. Appl. No. 15/686,969, dated Jan. 2, 2020, 8 pages.
Notice of Allowance received for U.S. Appl. No. 16/581,721, dated Aug. 4, 2020, 5 pages.
Patent Board Decision received for U.S. Appl. No. 11/818,498, dated Nov. 2, 2016, 8 pages.
Restriction Requirement received for U.S. Appl. No. 12/238,333, dated Mar. 8, 2012, 6 pages.
Restriction Requirement received for U.S. Appl. No. 12/494,173, dated Aug. 8, 2012, 5 pages.
Restriction Requirement received for U.S. Appl. No. 13/899,391, dated Apr. 8, 2015, 6 pages.
Restriction Requirement received for U.S. Appl. No. 15/097,179, dated Sep. 28, 2017, 6 pages.
Restriction Requirement received for U.S. Appl. No. 15/691,283, dated Mar. 5, 2019, 6 pages.
Supplemental Notice of Allowance received for U.S. Appl. No. 15/686,969, dated Feb. 21, 2020, 2 pages.
Corrected Notice of Allowance received for U.S. Appl. No. 16/192,664, dated May 4, 2021, 3 pages.
Extended European Search Report received for European Patent Application No. 20206655.1, dated Feb. 19, 2021, 7 pages.
Extended European Search Report received for European Patent Application No. 20206655.1, dated Jul. 30, 2021, 8 pages.
Non-Final Office Action received for U.S. Appl. No. 16/152,326, dated Apr. 26, 2021, 12 pages.
Non-Final Office Action received for U.S. Appl. No. 16/786,921, dated Dec. 10, 2020, 22 pages.
Non-Final Office Action received for U.S. Appl. No. 16/921,817, dated Sep. 22, 2021, 24 pages.
Non-Final Office Action received for U.S. Appl. No. 16/924,047, dated Sep. 24, 2021, 17 pages.
Notice of Allowability received for U.S. Appl. No. 16/152,326, dated Dec. 10, 2021, 3 pages.
Notice of Allowability received for U.S. Appl. No. 16/786,921, dated Jul. 16, 2021, 2 pages.
Notice of Allowance received for U.S. Appl. No. 16/152,326, dated Nov. 26, 2021, 9 pages.
Notice of Allowance received for U.S. Appl. No. 16/192,664, dated Apr. 2, 2021, 10 pages.
Notice of Allowance received for U.S. Appl. No. 16/786,921, dated Jul. 1, 2021, 8 pages.
Search Report received for Chinese Patent Application No. 201780046939.3, dated Jun. 30, 2021, 6 pages (3 page of English Translation and 3 page of Official Copy).
Jinpu et al., "Probe into the Function of Touch Panel", vol. 2008, No. 14, Jul. 15, 2008, 3 pages. (English Abstract Submitted).
Mainardi, Elena, "Design of a Portable Touchscreen Interface for Powerline Domotic Systems", IEEE International Conference on Automation Science and Engineering, Aug. 23-26, 2008, 5 pages.

* cited by examiner

| 1 | 13 | 25 | 37 | 49 | 61 | 73 | 85 | 97 | 109 | 121 | 133 |
|---|----|----|----|----|----|----|----|----|-----|-----|-----|
| 2 | 14 | 26 | 38 | 50 | 62 | 74 | 86 | 98 | 110 | 122 | 134 |
| 3 | 15 | 27 | 39 | 51 | 63 | 75 | 87 | 99 | 111 | 123 | 135 |
| 4 | 16 | 28 | 40 | 52 | 64 | 76 | 88 | 100 | 112 | 124 | 136 |
| • | • | • | • | • | • | • | • | • | • | • | • |
| • | • | • | • | • | • | • | • | • | • | • | • |
| • | • | • | • | • | • | • | • | • | • | • | • |
| | | | | | | | | | | | |
| | | | | | | | | | | | |
| | | | | | | | | | | | |
| | | | | | | | | | | | |
| 12 | 24 | 36 | 48 | 60 | 72 | 84 | 96 | 108 | 120 | 132 | 144 |

*FIG. 9B*

| DESCRIPTION | VCOM ENABLE | VBIAS ENABLE | BANK ID | MODE | BANK-LATCH | PER | PEC | PED | DS | D | VB | VC |
|---|---|---|---|---|---|---|---|---|---|---|---|---|
| VCOM | H | X | X | X | L | L | L | L | L | L | L | H |
| VBIAS | L | H | X | X | L | L | L | L | L | L | H | L |
| SC/MC MODE | L | L | X | 2'B 00 | L | L | L | L | H/L | H/L | H/L | L |
| PEN DETECT | L | L | X | 2'B 01 | L | L | L | H | L | L | L | L |
| PEN ROW SCAN | L | L | BANK_ID | 2'B 10 | H | H | L | L | L | L | L | L |
| PEN ROW SCAN | L | L | ~BANK_ID | 2'B 10 | L | L | L | L | L | L | H | L |
| PEN COLUMN SCAN | L | L | BANK_ID | 2'B 11 | H | L | H | L | L | L | L | L |
| PEN COLUMN SCAN | L | L | ~BANK_ID | 2'B 11 | L | L | L | L | L | L | H | L |

*FIG. 11C*

FLEXIBLE SELF-CAPACITANCE AND MUTUAL CAPACITANCE TOUCH SENSING SYSTEM ARCHITECTURE

CROSS-REFERENCE TO RELATED APPLICATIONS

This application is a continuation of U.S. application Ser. No. 15/009,774, filed Jan. 28, 2016 and published on Aug. 4, 2016 as U.S. Publication No. 2016-0224177, which claims benefit of U.S. Provisional Application No. 62/111,077, filed Feb. 2, 2015, the contents of which are hereby incorporated by reference in their entirety for all purposes.

FIELD OF THE DISCLOSURE

This relates generally to touch sensor panels that are integrated with displays, and more particularly, to a flexible touch and/or pen sensing system architecture for self-capacitance and mutual capacitance integrated touch screens.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, are becoming increasingly popular because of their ease and versatility of operation as well as their declining price. Touch screens can include a touch sensor panel, which can be a clear panel with a touch-sensitive surface, and a display device such as a liquid crystal display (LCD) that can be positioned partially or fully behind the panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch, and thereafter can perform one or more actions based on the touch. In the case of some touch sensing systems, a physical touch on the display is not needed to detect a touch. For example, in some capacitive-type touch sensing systems, fringing electrical fields used to detect touch can extend beyond the surface of the display, and objects approaching near the surface may be detected near the surface without actually touching the surface.

Capacitive touch sensor panels can be formed by a matrix of substantially transparent or non-transparent conductive plates made of materials such as Indium Tin Oxide (ITO). It is due in part to their substantial transparency that capacitive touch sensor panels can be overlaid on a display to form a touch screen, as described above. Some touch screens can be formed by at least partially integrating touch sensing circuitry into a display pixel stackup (i.e., the stacked material layers forming the display pixels).

SUMMARY OF THE DISCLOSURE

Some capacitive touch sensor panels can be formed by a matrix of substantially transparent or non-transparent conductive plates made of materials such as Indium Tin Oxide (ITO), and some touch screens can be formed by at least partially integrating touch sensing circuitry into a display pixel stackup (i.e., the stacked material layers forming the display pixels). The conductive plates can be electrically connected to sense circuitry for sensing touch events on the touch screen. In some examples, many different types of scans can be implemented on a touch screen, and thus it can be beneficial for the architecture of the touch screen to have sufficient flexibility to allow for implementation of these different types of scans on the touch screen. Further, in some examples, a touch screen can include a relatively large number of conductive plates on which touch events can be sensed. The examples of the disclosure provide various touch sensing architectures that are space-efficient and flexible.

BRIEF DESCRIPTION OF THE DRAWINGS

FIG. 9B illustrates an exemplary numbering of touch node electrodes according to examples of the disclosure.

FIG. 11C illustrates exemplary states of switches in PMBs in correspondence to various control signals received by a switching circuit from sense circuitry according to examples of the disclosure.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Some capacitive touch sensor panels can be formed by a matrix of substantially transparent or non-transparent conductive plates made of materials such as Indium Tin Oxide (ITO), and some touch screens can be formed by at least partially integrating touch sensing circuitry into a display pixel stackup (i.e., the stacked material layers forming the display pixels). The conductive plates can be electrically connected to sense circuitry for sensing touch events on the touch screen. In some examples, many different types of scans can be implemented on a touch screen, and thus it can be beneficial for the architecture of the touch screen to have sufficient flexibility to allow for implementation of these different types of scans on the touch screen. Further, in some examples, a touch screen can include a relatively large number of conductive plates on which touch events can be sensed. The examples of the disclosure provide various touch sensing architectures that are space-efficient and flexible.

Figure 1A:
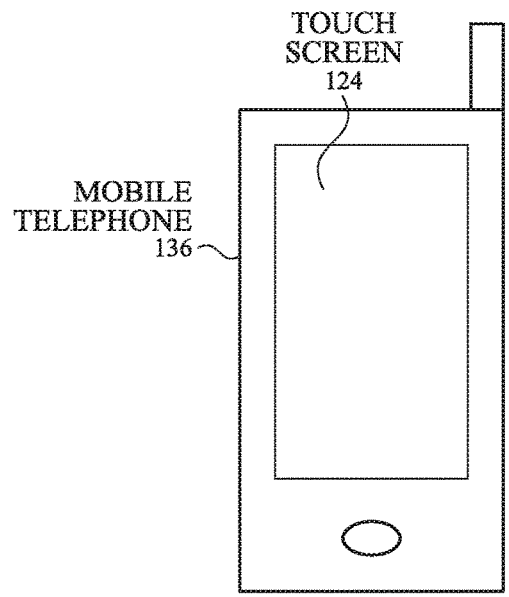
FIGS. 1A-1C illustrate an example mobile telephone, an example media player, and an example portable computing device that each include an exemplary touch screen according to examples of the disclosure.
Figure 1B:
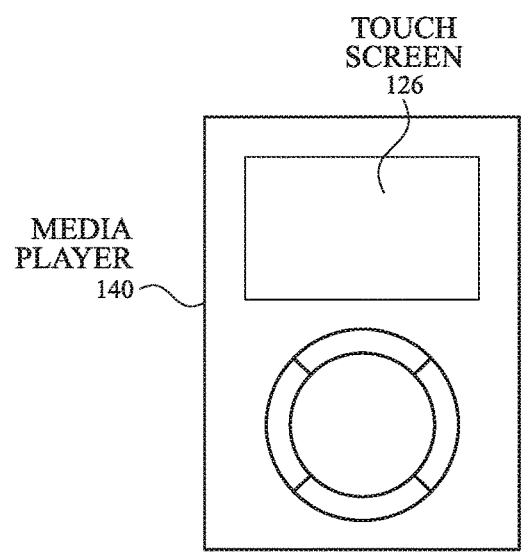
Figure 1C:
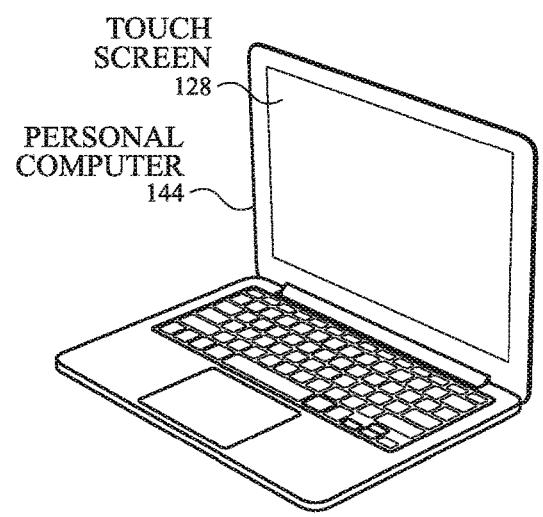

FIGS. 1A-1C show example systems in which a touch screen according to examples of the disclosure may be implemented. FIG. 1A illustrates an example mobile telephone 136 that includes a touch screen 124. FIG. 1B illustrates an example digital media player 140 that includes a touch screen 126. FIG. 1C illustrates an example portable computing device 144 that includes a touch screen 128. Touch screens 124, 126, and 128 can be based on self-capacitance. A self-capacitance based touch system can include a matrix of small, individual plates of conductive material that can be referred to as touch node electrodes (as described below with reference to touch screen 220 in FIG. 2). For example, a touch screen can include a plurality of individual touch node electrodes, each touch node electrode identifying or representing a unique location on the touch screen at which touch or proximity (i.e., a touch or proximity event) is to be sensed, and each touch node electrode being electrically isolated from the other touch node electrodes in the touch screen/panel. Such a touch screen can be referred to as a pixelated touch screen on which the touch node electrodes can be used to perform various types of scans, such as self-capacitance scans, mutual capacitance scans, etc. For example, during a self-capacitance scan, a touch node electrode can be stimulated with an AC waveform, and the self-capacitance to ground of the touch node electrode can be measured. As an object approaches the touch node electrode, the self-capacitance to ground of the touch node electrode can change. This change in the self-capacitance of the touch node electrode can be detected and measured by the touch sensing system to determine the positions of multiple objects when they touch, or come in proximity to, the touch screen. In some examples, the electrodes of a self-capacitance based touch system can be formed from rows and columns of conductive material, and changes in the self-capacitance to ground of the rows and columns can be detected, similar to above. In some examples, a touch screen can be multi-touch, single touch, projection scan, full-imaging multi-touch, capacitive touch, etc.

Figure 2:
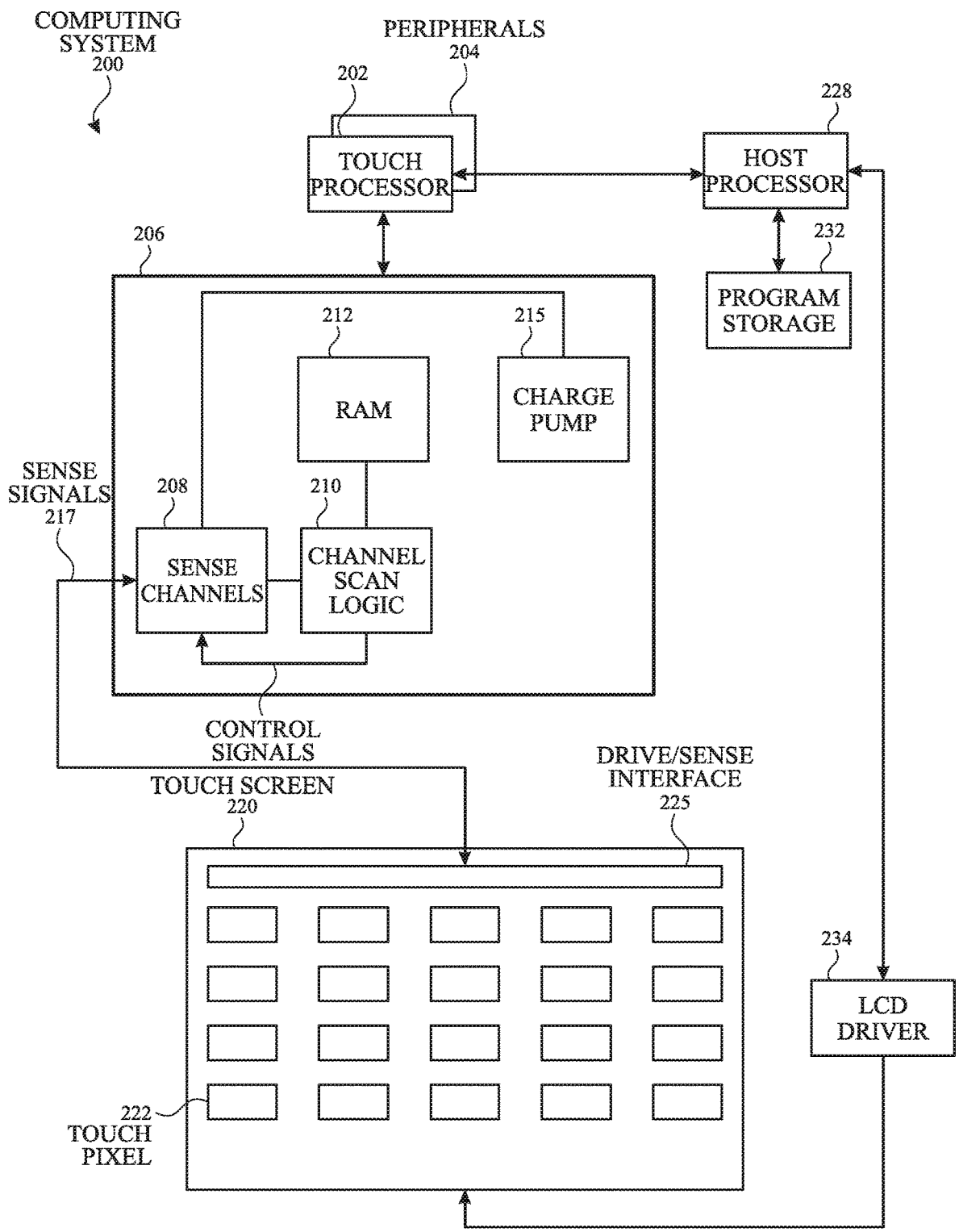
FIG. 2 is a block diagram of an exemplary computing system that illustrates one implementation of an example touch screen according to examples of the disclosure.

FIG. 2 is a block diagram of an example computing system 200 that illustrates one implementation of an example touch screen 220 according to examples of the disclosure. Computing system 200 can be included in, for example, mobile telephone 136, digital media player 140, portable computing device 144, or any mobile or non-mobile computing device that includes a touch screen, including a wearable device. Computing system 200 can include a touch sensing system including one or more touch processors 202, peripherals 204, a touch controller 206, and touch sensing circuitry (described in more detail below). Peripherals 204 can include, but are not limited to, random access memory (RAM) or other types of memory or storage, watchdog timers and the like. Touch controller 206 can include, but is not limited to, one or more sense channels 208 and channel scan logic 210. Channel scan logic 210 can access RAM 212, autonomously read data from sense channels 208 and provide control for the sense channels. In addition, channel scan logic 210 can control sense channels 208 to generate stimulation signals at various frequencies and phases that can be selectively applied to the touch nodes of touch screen 220, as described in more detail below. In some examples, touch controller 206, touch processor 202 and peripherals 204 can be integrated into a single application specific integrated circuit (ASIC), and in some examples can be integrated with touch screen 220 itself.

Touch screen 220 can include touch sensing circuitry that can include a capacitive sensing medium having a plurality of electrically isolated touch node electrodes 222 (e.g., a pixelated touch screen). Touch node electrodes 222 can be coupled to sense channels 208 in touch controller 206, can be driven by stimulation signals from the sense channels through drive/sense interface 225, and can be sensed by the sense channels through the drive/sense interface as well, as described above. Labeling the conductive plates used to detect touch (i.e., touch node electrodes 222) as "touch node" electrodes can be particularly useful when touch screen 220 is viewed as capturing an "image" of touch (a "touch image"). In other words, after touch controller 206 has determined an amount of touch detected at each touch node electrode 222 in touch screen 220, the pattern of touch node electrodes in the touch screen at which a touch occurred can be thought of as a touch image (e.g., a pattern of fingers touching the touch screen).

Computing system 200 can also include a host processor 228 for receiving outputs from touch processor 202 and performing actions based on the outputs. For example, host processor 228 can be connected to program storage 232 and a display controller, such as an LCD driver 234. The LCD driver 234 can provide voltages on select (gate) lines to each pixel transistor and can provide data signals along data lines to these same transistors to control the pixel display image as described in more detail below. Host processor 228 can use LCD driver 234 to generate a display image on touch screen 220, such as a display image of a user interface (UI), and can use touch processor 202 and touch controller 206 to detect a touch on or near touch screen 220. The touch input can be used by computer programs stored in program storage 232 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 228 can also perform additional functions that may not be related to touch processing.

Note that one or more of the functions described herein, including the configuration of switches, can be performed by firmware stored in memory (e.g., one of the peripherals 204 in FIG. 2) and executed by touch processor 202, or stored in program storage 232 and executed by host processor 228. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding signals) that can contain or store the program for use by or in connection with the instruction execution system, apparatus, or device. The computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

Figure 3A:
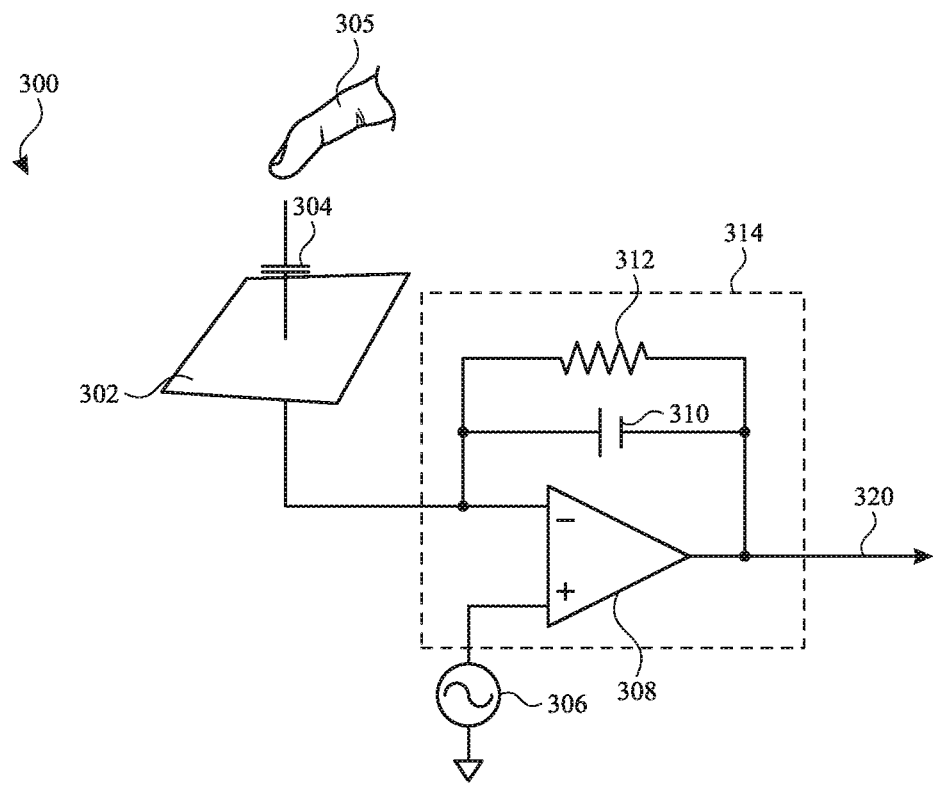
FIGS. 3A-3C illustrate exemplary sensor circuits according to examples of the disclosure.

FIG. 3A illustrates an exemplary touch sensor circuit 300 corresponding to a self-capacitance touch node electrode 302 and sensing circuit 314 according to examples of the disclosure. Touch node electrode 302 can correspond to touch node electrode 222. Touch node electrode 302 can have an inherent self-capacitance to ground associated with it, and also an additional self-capacitance to ground that is formed when an object, such as finger 305, is in proximity to or touching the electrode. The total self-capacitance to ground of touch node electrode 302 can be illustrated as capacitance 304. Touch node electrode 302 can be coupled to sensing circuit 314. Sensing circuit 314 can include an operational amplifier 308, feedback resistor 312, feedback capacitor 310 and an input voltage source 306, although other configurations can be employed. For example, feedback resistor 312 can be replaced by a switched capacitor resistor to reduce a parasitic capacitance effect that can be caused by a variable feedback resistor. Touch node electrode 302 can be coupled to the inverting input of operational amplifier 308. An AC voltage source 306 (Vac) can be coupled to the non-inverting input of operational amplifier 308. Touch sensor circuit 300 can be configured to sense changes in the total self-capacitance 304 of the touch node electrode 302 induced by a finger or object either touching or in proximity to the touch sensor panel. The amplitude of the signal at output 320 can change as a function of a change in capacitance 304 due to the presence of a proximity or touch event. Therefore the signal from output 320 can be used by a processor or dedicated logic to determine the presence of a proximity or touch event, in some examples, after analog-to-digital conversion and/or digital signal processing, which may include, but is not limited to, demodulation and filtering. Additional exemplary details of self-capacitance touch sensing, as described above, are described in U.S. patent application Ser. No. 14/067,870, published as U.S. Publication No. 2015/0035787, entitled "Self capacitance touch sensing," the contents of which is hereby incorporated by reference for all purposes.

Figure 3B:
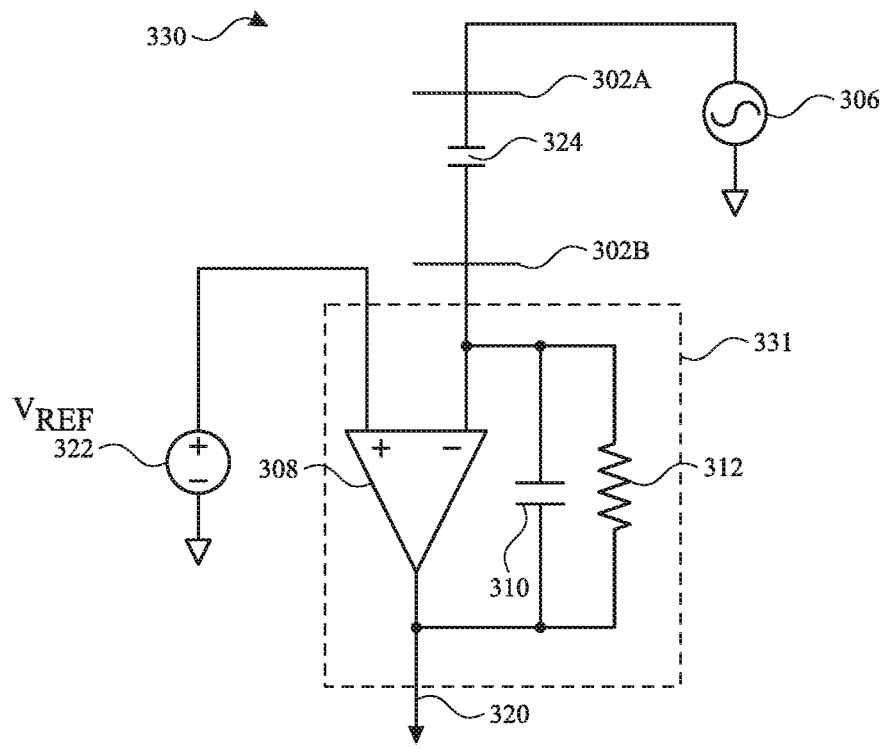

FIG. 3B illustrates an exemplary touch sensor circuit 330 corresponding to a mutual capacitance sensing circuit 331 according to examples of the disclosure. Touch sensor circuit 330 can be utilized to sense the mutual capacitance(s) between touch node electrodes (e.g., touch node electrodes 222) on the touch screen of the disclosure. The structure of touch sensor circuit 330 can be substantially that of touch sensor circuit 300 in FIG. 3A, except that the non-inverting input of operational amplifier 308 can be coupled to reference voltage 322 (e.g., a direct current (DC) reference voltage). Mutual capacitance sensing circuit 331 can sense changes in mutual capacitance 324 between a touch node electrode 302A that is driven (e.g., driven by AC voltage source 306) and a touch node electrode 302B that is coupled to the inverting input of operational amplifier 308 and sensed by touch sensor circuit 330. The remaining details of touch sensor circuit 330 can be the same as those of touch sensor circuit 300 in FIG. 3A, and will not be repeated here for brevity.

Figure 3C:
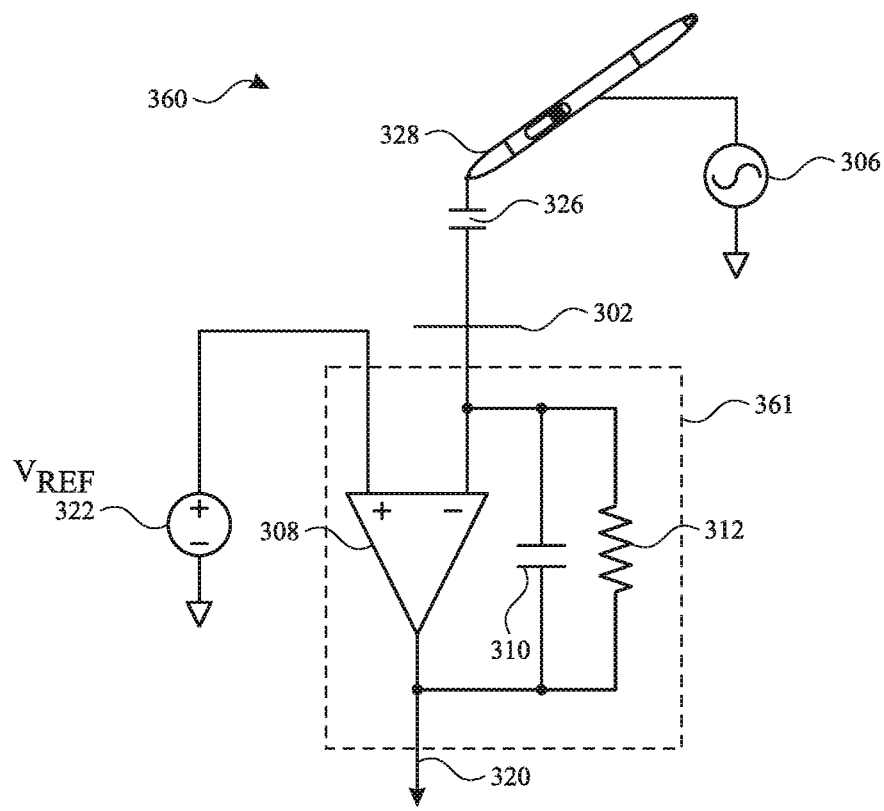

FIG. 3C illustrates an exemplary sensor circuit 360 corresponding to a pen detection sensing circuit 361 according to examples of the disclosure. Sensor circuit 360 can be utilized to sense the mutual capacitance(s) between a pen or stylus 328 and a touch node electrode 302 (e.g., touch node electrode 222) on the touch screen of the disclosure. The structure of sensor circuit 360 can be substantially that of touch sensor circuit 330 in FIG. 3B, the details of which will not be repeated here for brevity. In some examples, pen or stylus 328 can be an active pen or stylus that actively modulates capacitance 326 between an electrode in the pen or stylus 328 (e.g., by driving the electrode in the pen with an AC voltage source 306) and a touch node electrode 302 on the touch screen, which pen detection circuit 361 can sense.

Figure 4:
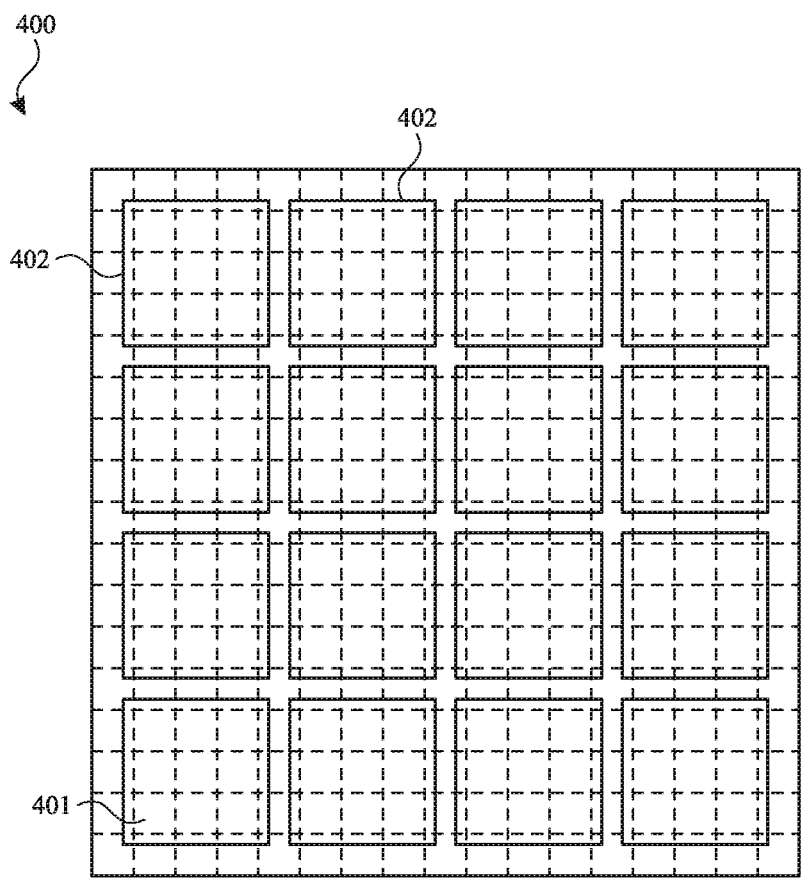
FIG. 4 illustrates an example configuration in which common electrodes can form portions of the touch sensing circuitry of a touch sensing system.

Referring back to FIG. 2, in some examples, touch screen 220 can be an integrated touch screen in which touch sensing circuit elements of the touch sensing system can be integrated into the display pixel stackups of a display. The circuit elements in touch screen 220 can include, for example, elements that can exist in LCD or other displays, such as one or more pixel transistors (e.g., thin film transistors (TFTs)), gate lines, data lines, pixel electrodes and common electrodes. In a given display pixel, a voltage between a pixel electrode and a common electrode can control a luminance of the display pixel. The voltage on the pixel electrode can be supplied by a data line through a pixel transistor, which can be controlled by a gate line. It is noted that circuit elements are not limited to whole circuit components, such as a whole capacitor, a whole transistor, etc., but can include portions of circuitry, such as only one of the two plates of a parallel plate capacitor. FIG. 4 illustrates an example configuration in which common electrodes 402 can form portions of the touch sensing circuitry of a touch sensing system—in some examples of this disclosure, the common electrodes can form touch node electrodes used to detect a touch image on touch screen 400, as described above. Each common electrode 402 (which can define a "touch region" of the touch screen) can include a plurality of display pixels 401, and each display pixel 401 can include a portion of a common electrode 402, which can be a circuit element of the display system circuitry in the pixel stackup (i.e., the stacked material layers forming the display pixels) of the display pixels of some types of LCD or other displays that can operate as part of the display system to display a display image.

In the example shown in FIG. 4, each common electrode 402 can serve as a multi-function circuit element that can operate as display circuitry of the display system of touch screen 400 and can also operate as touch sensing circuitry of the touch sensing system. In this example, each common electrode 402 can operate as a common electrode of the display circuitry of the touch screen 400, as described above, and can also operate as touch sensing circuitry of the touch screen. For example, a common electrode 402 can operate as a capacitive part of a touch node electrode of the touch sensing circuitry during the touch sensing phase. Other circuit elements of touch screen 400 can form part of the touch sensing circuitry by, for example, switching electrical connections, etc. More specifically, in some examples, during the touch sensing phase, a gate line can be connected to a power supply, such as a charge pump, that can apply a voltage to maintain TFTs in display pixels included in a touch node electrode in an "off" state. Stimulation signals can be applied to common electrode 402. Changes in the total self-capacitance of common electrode 402 can be sensed through an operational amplifier, as previously discussed. The change in the total self-capacitance of common electrode 402 can depend on the proximity of a touch object, such as finger 305, to the common electrode. In this way, the measured change in total self-capacitance of common electrode 402 can provide an indication of touch on or near the touch screen.

In general, each of the touch sensing circuit elements may be either a multi-function circuit element that can form part of the touch sensing circuitry and can perform one or more other functions, such as forming part of the display circuitry, or may be a single-function circuit element that can operate as touch sensing circuitry only. Similarly, each of the display circuit elements may be either a multi-function circuit element that can operate as display circuitry and perform one or more other functions, such as operating as touch sensing circuitry, or may be a single-function circuit element that can operate as display circuitry only. Therefore, in some examples, some of the circuit elements in the display pixel stackups can be multi-function circuit elements and other circuit elements may be single-function circuit elements. In other examples, all of the circuit elements of the display pixel stackups may be single-function circuit elements.

In addition, although examples herein may describe the display circuitry as operating during a display phase, and describe the touch sensing circuitry as operating during a touch sensing phase, it should be understood that a display phase and a touch sensing phase may be operated at the same time, e.g., partially or completely overlap, or the display phase and touch sensing phase may operate at different times. Also, although examples herein describe certain circuit elements as being multi-function and other circuit elements as being single-function, it should be understood that the circuit elements are not limited to the particular functionality in other examples. In other words, a circuit element that is described in one example herein as a single-function circuit element may be configured as a multi-function circuit element in other examples, and vice versa.

The common electrodes 402 (i.e., touch node electrodes) and display pixels 401 of FIG. 4 are shown as rectangular or square regions on touch screen 400. However, it is understood that the common electrodes 402 and display pixels 401 are not limited to the shapes, orientations, and positions shown, but can include any suitable configurations according to examples of the disclosure. Further, the examples of the disclosure will be provided in the context of a touch screen, but it is understood that the examples of the disclosure can similarly be implemented in the context of a touch sensor panel.

As described above, the self-capacitance of each touch node electrode (sometimes, common electrode 402) in touch screen 400 can be sensed to capture a touch image across touch screen 400. To allow for the sensing of the self-capacitance of individual common electrodes 402, it can be necessary to route one or more electrical connections (e.g., touch node traces) between each of the common electrodes and the touch sensing circuitry (e.g., sense channels 208 or sensing circuit 314) of touch screen 400.

Figure 5A:
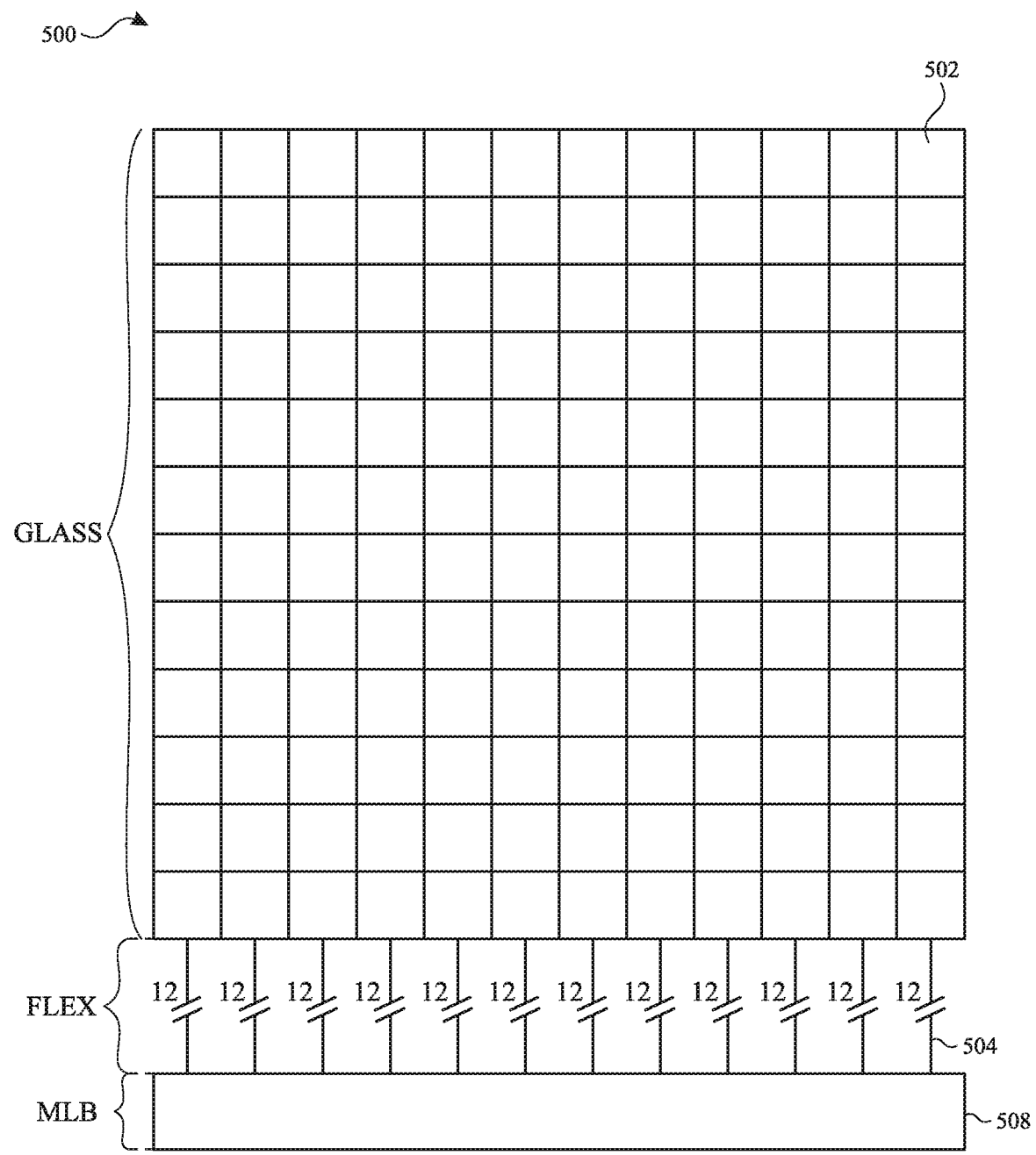
FIG. 5A illustrates an exemplary touch node electrode routing configuration in which touch node traces can be routed directly from touch node electrodes to sense circuitry according to examples of the disclosure.

FIG. 5A illustrates an exemplary touch node electrode 502 routing configuration in which touch node traces 504 can be routed directly from touch node electrodes 502 to sense circuitry 508 according to examples of the disclosure. Similar to as discussed before, touch screen 500 can include touch node electrodes 502. Sense circuitry 508 can correspond to sense channels 208 and/or sensing circuits 314, for example. In the example of FIG. 5A, each touch node electrode 502 can correspond to its own sense channel in sense circuitry 508 (e.g., each touch node electrode can be coupled, via a respective touch node trace 504, to its own driving and/or sensing circuitry in the sense circuitry—e.g., sensing circuit 314). In other words, sense circuitry 508 can include multiple sense channels to which touch node electrodes 502 can be coupled, and by which the touch node electrodes can be sensed, as described with reference to FIGS. 3A-3C. In the example illustrated, touch screen 500 can include 144 touch node electrodes 502 (12 touch nodes horizontally, and 12 touch nodes vertically), though it is understood that different numbers and configurations of touch node electrodes can be utilized in accordance with the examples of the disclosure.

Each of touch node electrodes 502 can be coupled to sense circuitry 508 via respective touch node traces 504. Thus, in some examples, 12 touch node traces 504 can be coupled to 12 respective touch node electrodes 502 in a column of touch node electrodes on touch screen 500 (partially illustrated in FIG. 5A for ease of description). These 12 touch node traces 504 for each column of touch node electrodes 502 can be coupled to sense circuitry 508 for a total of 144 touch node traces coupled between touch screen 500 and sense circuitry 508. In some examples, touch screen 500 and portions of the 144 touch node traces 504 can be disposed on a first substrate (e.g., a glass substrate), remaining portions of the 144 touch node traces can be disposed on a second substrate (e.g., a connector connecting the touch screen and sense circuitry 508, such as a flex connector), and the sense circuitry can be disposed on a third substrate (e.g., an integrated circuit on a main logic board of a device of which the touch screen is a part). It is understood that in some examples, touch screen 500 (including touch node electrodes 502), touch node traces 504 and sense circuitry 508 can be disposed on the same substrate or on different substrates in a different configuration than that described above, though the description that follows will assume that the touch screen, at least a portion of the touch node traces and the sense circuitry are disposed on different substrates.

In some examples, especially in situations where touch screen 500 includes a relatively large number of touch node electrodes 502 (e.g., 40×32 touch node electrodes=1280 touch node electrodes, or 48×36 touch node electrodes=1728 touch node electrodes), it can be difficult to route the resulting relatively large number of touch node traces 504 between touch screen 500 and sense circuitry 508. For example, it can be difficult to include 1280 or 1728 touch node traces 504 on a flex connector that can be coupled between touch screen 500 and sense circuitry 508. Sensing touch on only portions of touch screen 500 at a time, or configuring touch node electrodes 502 to share sense channels (e.g., sensing circuits 314) on sense circuitry 508, can reduce the number of touch node traces 504 needed to couple the touch screen to the sense circuitry. Additionally, such sensing and sharing schemes can reduce the quantity of driving and/or sensing circuitry required in sense circuitry 508 for proper touch screen operation. The examples that follow will illustrate the above-mentioned advantages.

Figure 5B:
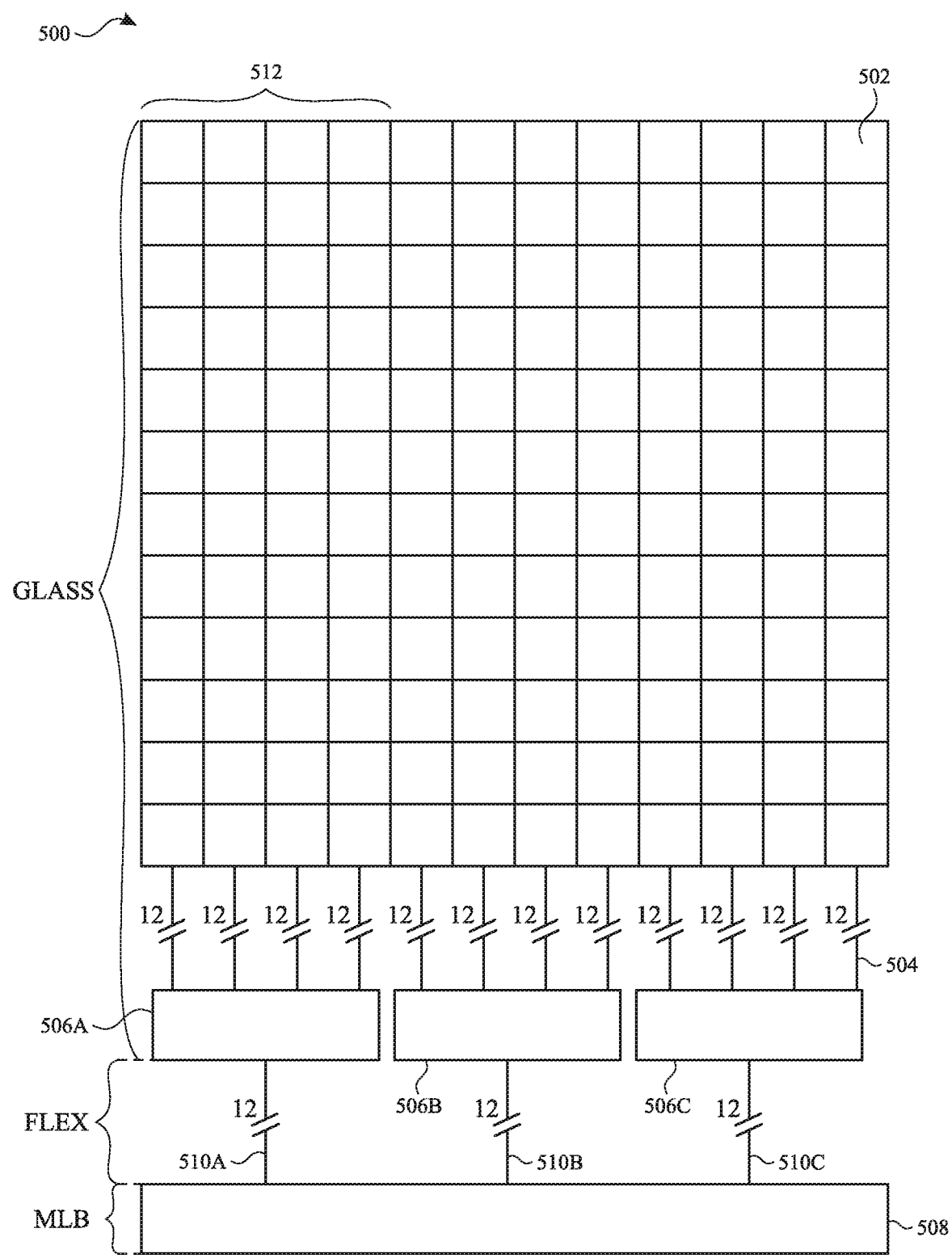
FIG. 5B illustrates an exemplary touch node electrode routing configuration that includes switching circuits according to examples of the disclosure.

FIG. 5B illustrates an exemplary touch node electrode 502 routing configuration that includes switching circuits 506a, 506b and 506c (referred to collectively as 506) according to examples of the disclosure. In touch screen 500 of FIG. 5B, only a portion of touch node electrodes 502 can be driven, sensed, etc., at a given moment in time, as will be described in more detail below. As a result, the number of separate touch node electrode traces 504 that may need to be coupled to sense circuitry 508 can be less than the total number of touch node electrodes 502 included in touch screen 500. Specifically, touch node traces 504 can be individually coupled to touch node electrodes 502, as described with reference to FIG. 5A. However, instead of being routed directly to sense circuitry 508, touch node traces 504 can be routed from respective touch node electrodes 502 to switching circuits 506. In the example of FIG. 5B, three switching circuits 506 are illustrated, but it is understood that the examples of the disclosure can similarly be implemented in configurations employing different numbers of switching circuits (e.g., a single switching circuit).

Traces 510a, 510b and 510c (referred to collectively as 510) can couple switching circuits 506 to sense circuitry 508. Specifically, respective traces 510 can be coupled to respective sense channels in sense circuitry 508 (e.g., respective sensing circuits 314 in the sense circuitry). Traces 510 can be shared by multiple touch node electrodes 502, as will be described below, and thus can be referred to as shared traces. Similar to FIG. 5A, touch screen 500 (including touch node electrodes 502) and switching circuits 506 can be disposed on a first substrate (e.g., a glass substrate), shared traces 510 can be disposed on a second substrate (e.g., a connector coupling the touch screen and sense circuitry 508, such as a flex connector), and the sense circuitry can be disposed on a third substrate (e.g., an integrated circuit on a main logic board of a device of which the touch screen is a part). It is understood that in some examples, touch screen 500 (including touch node electrodes 502), switching circuits 506, touch node traces 504, shared traces 510 and sense circuitry 508 can be disposed on the same substrate or on different substrates in a different configuration than that described above.

The operation of the touch node electrode 502 routing configuration of FIG. 5B will now be described. Switching circuits 506 can have the ability to selectively couple one or more of shared traces 510 to one or more touch node electrodes 502 to which the switching circuits are coupled via respective ones of touch node traces 504. Because respective traces 510 can, in turn, be coupled to respective sense channels in sense circuitry 508, as described above, switching circuits 506 can, thus, selectively couple a given sense channel in sense circuitry 508 (e.g., sensing circuit 314) to a given touch node electrode 502 via shared traces 510 and touch node traces 504. This ability to assign a given sense channel in sense circuitry 508 to a first touch node electrode 502 during a first time period, and to a second touch node electrode during a second time period, can allow for a single sense channel to be used for sensing touch on multiple touch node electrodes at different times, and can thus reduce the quantity of such sense channels (e.g., sensing circuits 314) needed in the sense circuitry for proper touch screen operation. Relatedly, the number of shared traces 510 can be less than the number of touch node traces 504. For example, focusing on switching circuit 506a in FIG. 5B, 48 touch node traces 504 can couple switching circuit 506a to the 48 touch node electrodes 502 in region 512 of touch screen 500, as described previously. The number of shared traces 510a coupling switching circuit 506a and sense circuitry 508 can depend on how many of touch node electrodes 502 in region 512 of touch screen 500 need to be independently driven and/or sensed at a given moment in time. For example, if one-fourth of the touch node electrodes 502 in region 512 of touch screen 500 need to be independently driven and/or sensed at a given moment in time, then only 12 shared traces 510a need to couple switching circuit 506a to sense circuitry 508—during a first time period, switching circuit 506a can couple those 12 shared traces to 12 touch node electrodes, during a second time period, the switching circuitry can couple those 12 shared traces to 12 different touch node electrodes, and so on. The specific ratio of the number of shared traces 510 to the number of touch node traces 504 can depend on the particular operating schemes (e.g., touch screen scan configurations) of touch screen 500. However, in accordance with the particular example disclosed above, the number of traces disposed on the flex connector (e.g., shared traces 510) in FIG. 5B can be less than the number of traces disposed on the flex connector (e.g., traces 504) in FIG. 5A. This reduction of traces can similarly be implemented in touch screens having different operating requirements than those discussed above.

Figure 6A:
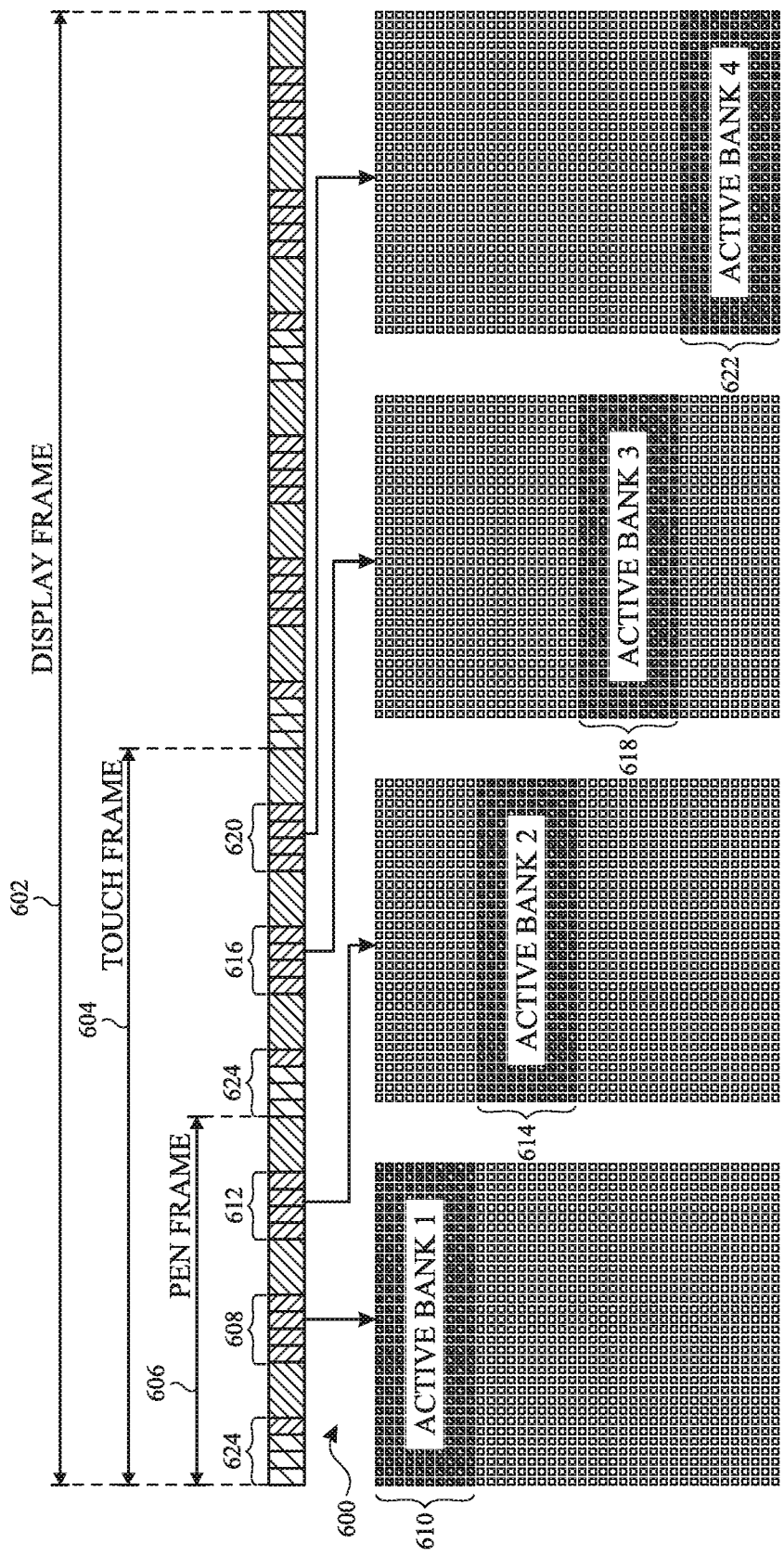
FIG. 6A illustrates exemplary display, touch and pen frames according to examples of the disclosure.

FIGS. 6A-6D illustrate exemplary touch screen scan configurations according to examples of the disclosure. The following touch screen scan configurations are provided by way of example only; other touch screen scan configurations can be implemented according to examples of the disclosure. FIG. 6A illustrates exemplary display 602, touch 604 and pen frames 606 according to examples of the disclosure. Display frame 602 can include two touch frames 604, which can, in turn, include two pen frames 606. In some examples, display frame 602 and touch frame 604 can occur at the same time and have the same length (i.e., display frame 602 can include one touch frame 604). The length of display frame 602 can be related to the frequency with which a display image displayed on the touch screen of the disclosure is updated, the length of touch frame 604 can be related to the frequency with which touch is sensed across the entire touch screen of the disclosure, and the length of pen frame 606 can be related to the frequency with which the location of a pen or stylus is detected on the touch screen of the disclosure.

Touch frame 604 can include time periods during which various pen, touch or display operations can be performed. The discussion that follows will focus on touch frame 604, but as is apparent from FIG. 6A, the structure of display frame 602 can be based on the structure of touch frame 604, and the structure of the touch frame can be based on the structure of pen frame 606. Touch frame 604 can include two time periods 624 during which various pen detection and mutual capacitance scans can be performed on the touch screen of the disclosure, as will be described in more detail later. Touch frame 604 can also include four time periods 608, 612, 616 and 620 during which touch can be sensed in different regions of the touch screen of the disclosure. For example, during time period 608, region 610 of the touch screen can be scanned in a self-capacitance configuration (as described with reference to FIG. 3A, for example) to sense touch in region 610 of the touch screen. Similarly, during time period 612, region 614 of the touch screen can be scanned in a self-capacitance configuration to sense touch in region 614 of the touch screen. Time periods 616 and 620 can similarly correspond to the sensing of touch in regions 618 and 622 of the touch screen, respectively. In this way, touch can be sensed across the entirety of the touch screen by the time touch frame 604 ends. In some examples, a display image displayed by the touch screen can be updated during time periods between time periods 608, 612, 616, 620 and 624 of touch frame 604.

Figure 6B:
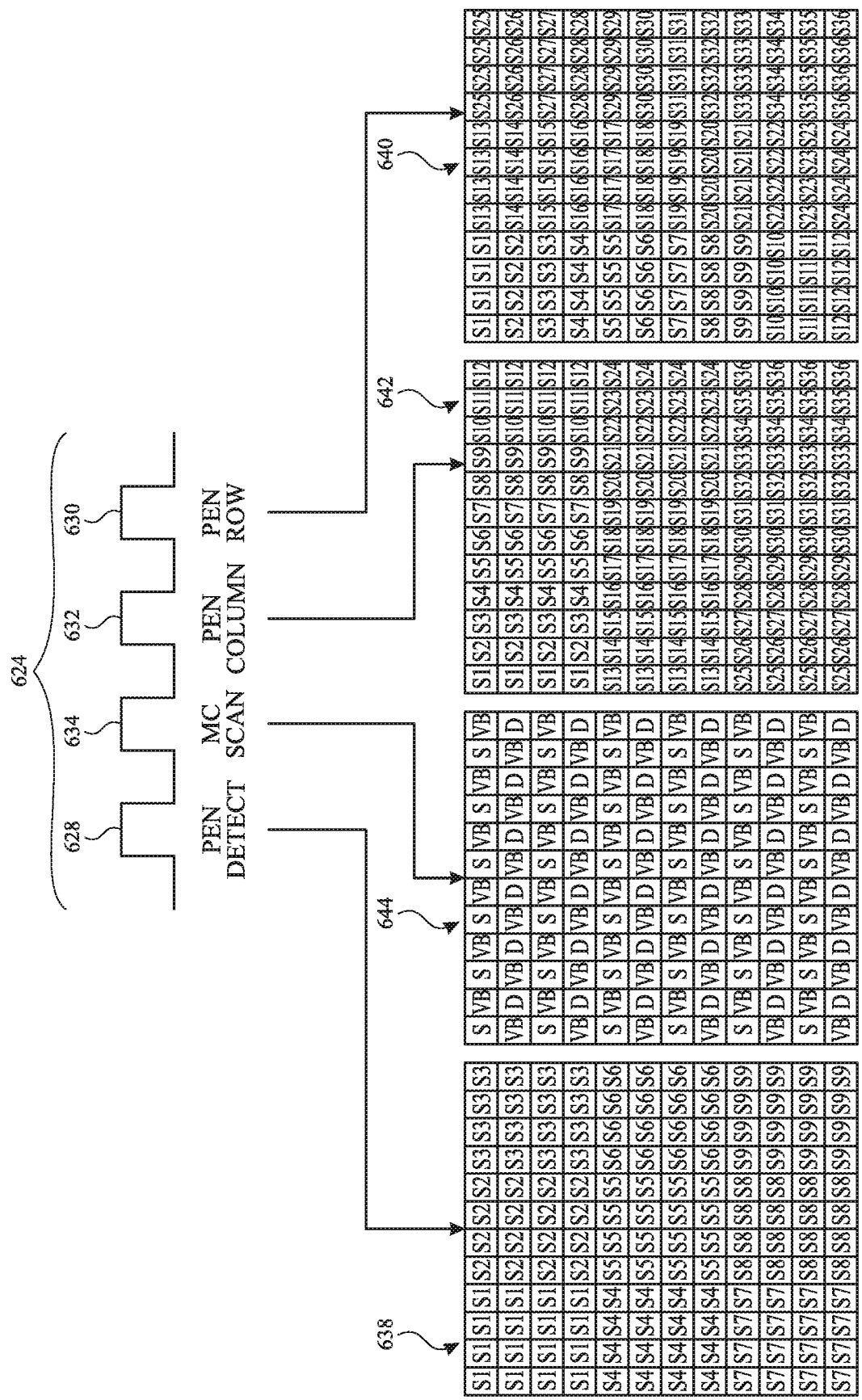
FIG. 6B illustrates exemplary details of a time period in a touch frame according to examples of the disclosure.

FIG. 6B illustrates exemplary details of time period 624 in touch frame 604 according to examples of the disclosure. As described above, during time period 624, various pen-related and mutual capacitance scans can be performed on the touch screen of the disclosure. Specifically, time period 624 can include four scan periods: pen detect scan 628, mutual capacitance scan 634, pen column scan 632 and pen row scan 630. As stated previously, these scan periods are provided by way of example only, and it is understood that time period 624 can include alternative scan periods to those illustrated.

During pen detect 628 scan period, 4×4 blocks of touch node electrodes can be scanned in a mutual capacitance configuration (as described with reference to FIG. 3A, for example) to determine an approximate location of a pen or stylus on or in proximity to the touch screen. In some examples, these 4×4 blocks of touch node electrodes can be referred to as "supernodes." A 4×4 configuration of a supernode is given by example only, and it is understood that supernodes may have configurations different than a 4×4 configuration (e.g., a 2×2 configuration, a 3×3 configuration, etc.). All of the touch node electrodes in a given supernode can be coupled to common sense circuitry (e.g., sense circuit 361 in FIG. 3C), and thus can act as a single large touch node electrode when detecting mutual capacitance modulations that may result from a pen or stylus being in proximity to the given supernode. In some examples, all of the supernodes on the touch screen can be scanned at substantially the same time so that pen detection can occur in a single scan period, as illustrated in scan configuration 638. Specifically, all touch node electrodes labeled "S1" can be coupled to a first sense channel (e.g., sense circuit 361 in FIG. 3C), all touch node electrodes labeled "S2" can be coupled to a second sense channel, and so on, as illustrated. In the illustrated example, nine 4×4 supernodes can be coupled to nine different sense channels—channels 1 through 9. In some examples, pen detection can occur during two or more scan periods. During a first pen detect scan period, the first halves of all of the supernodes on the touch screen can be scanned in a mutual capacitance configuration (e.g., as described with reference to FIG. 3C) to detect the presence of a pen or stylus in proximity to those halves. During a second pen detect scan period, the remaining halves of all of the supernodes on the touch screen can be scanned in the mutual capacitance configuration (e.g., as described with reference to FIG. 3C) to detect the presence of a pen or stylus in proximity to those remaining halves. As a result, the presence or absence of a pen or stylus can have been detected across the entirety of the touch screen at the completion of the first and second pen detect scan periods. In some examples, not every touch node electrode in a supernode needs to be scanned during the pen detection scan period(s), because the pen detection scan period(s) may only need to approximately determine to which supernode the pen or stylus is in proximity. For example, in some examples, touch node electrodes in a supernode can be scanned (e.g., as described with reference to FIG. 3C) in a checkerboard pattern so that every other touch node electrode is coupled to a sense channel and scanned in a mutual capacitance configuration. Reducing the number of touch node electrodes that are coupled to sense circuitry, such as sense channels, can reduce the capacitive load on that sense circuitry, and can yield benefits such as reduced noise gain and improved signal bandwidth, resulting in improved signal-to-noise ratio.

In some examples, pen row 630 and pen column 632 scan periods can be performed in response to detecting a pen or stylus in proximity to the touch screen during the pen detect 628 scan period. In some examples, when a pen or stylus is detected in proximity to a given supernode, the touch node electrodes in that supernode and all surrounding supernodes (e.g., the given supernode and the eight supernodes surrounding the given supernode) can be scanned in a pen row 640 and a pen column 642 configuration. If the given supernode is at an edge or corner of the touch screen, then the given supernode may have fewer than eight surrounding supernodes—in such circumstances, those supernodes can be scanned in the pen row 640 and pen column 642 configurations. In the pen row configuration 640, touch node electrodes in a row of touch node electrodes of each supernode to be scanned can be scanned in a mutual capacitance configuration (e.g., as described with respect to FIG. 3C), and all of the touch node electrodes in that row can be sensed by the same sense channel (e.g., sense circuit 361 in FIG. 3C). For example, the top row of touch node electrodes in the upper-left-most supernode to be scanned can be coupled to sense channel "S1", as illustrated, and sensed in the mutual capacitance configuration. The remaining rows of touch node electrodes in the supernodes to be scanned can similarly be coupled to respective sense channels and sensed in mutual capacitance configurations, as illustrated. In the example illustrated in FIG. 6B, 36 supernode "row segments" (e.g., 1×4 collections of touch node electrodes) can be coupled to 36 different respective sense channels—channels 1 through 36.

In addition to the pen row scan period 630, a pen column scan period 632 can be performed. Analogously to the pen row scan configuration 640, in the pen column scan configuration 642, touch node electrodes in a column of touch node electrodes of each supernode to be scanned can be scanned in a mutual capacitance configuration (e.g., as described with reference to FIG. 3C), and all of the touch node electrodes in that column can be sensed by the same sense channel (e.g., sense circuit 361 in FIG. 3C). For example, the left column of touch node electrodes in the upper-left-most supernode to be scanned can be coupled to sense channel "S1", as illustrated, and sensed in the mutual capacitance configuration (e.g., as described with reference to FIG. 3C). The remaining columns of touch node electrodes in the supernodes to be scanned can similarly be coupled to respective sense channels and sensed in mutual capacitance configurations (e.g., as described with reference to FIG. 3C), as illustrated. In the example illustrated in FIG. 6B, 36 supernode "column segments" (e.g., 4×1 collections of touch node electrodes) can be coupled to 36 different respective sense channels—channels 1 through 36.

In some examples, time period 624 can also include a mutual capacitance scan time period 634. During the mutual capacitance scan time period 634, the entire touch screen can be scanned as illustrated in mutual capacitance scan configuration 644. Specifically, every 2×2 collection of touch node electrodes can have the following configuration: the top-left touch node electrode can be sensed (e.g., coupled to a sense channel, such as sense circuit 331 in FIG. 3B, and referred to as a "S touch node electrode"), the bottom-right touch node electrode can be driven (e.g., coupled to a drive voltage source, such as voltage source 306 in FIG. 3B, and referred to as a "D touch node electrode"), and the top-right and bottom-left touch node electrodes can be biased at a bias voltage (e.g., coupled to a bias voltage source, and referred to as a "VB touch node electrode"). The above-described configuration of touch node electrodes can allow for measurement of a mutual capacitance (and changes in the mutual capacitance) between the D and S touch node electrodes. In some examples, these mutual capacitance measurements can be obtained by stimulating one or more D touch node electrodes on the touch screen with one or more stimulation buffers, biasing one or more VB touch node electrodes with one or more bias buffers (e.g., one or more AC ground buffers), and/or sensing one or more S touch node electrodes with one or more sense amplifiers (e.g., sense circuitry). The above-described mutual capacitance configuration 644 is exemplary only, and it is understood that other mutual capacitance configurations are similarly within the scope of the disclosure (e.g., a configuration in which at least one touch node electrode is driven and at least one touch node electrode is sensed).

Figure 6C:
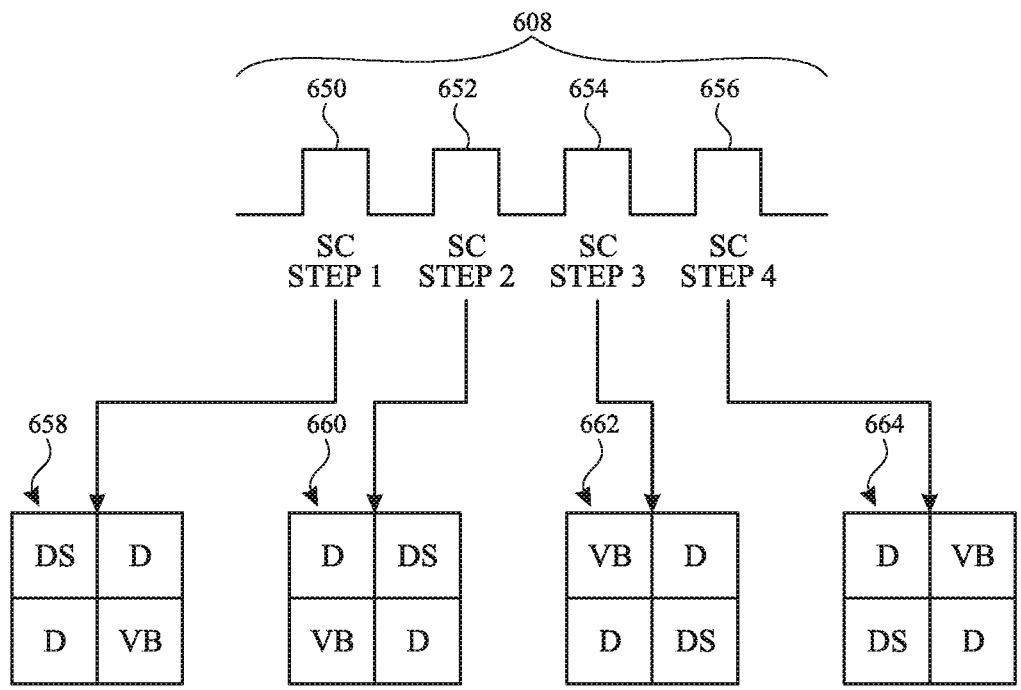
FIG. 6C illustrates exemplary details of various time periods in a touch frame according to examples of the disclosure.

FIG. 6C illustrates exemplary details of time periods 608, 612, 616 and 620 in touch frame 604 according to examples of the disclosure. As described above, during time periods 608, 612, 616 and 620, various self-capacitance scans can be performed on the touch screen of the disclosure. The details of time periods 608, 612, 616 and 620 can be substantially the same, except that the scans described below can be performed in different regions of the touch screen, as described with reference to FIG. 6A. Therefore, the following discussion will focus on time period 608, though it is understood that the discussion can apply similarly to time periods 612, 616 and 620.

Time period 608 can include four scan periods: self-capacitance scan step 1 650, self-capacitance scan step 2 652, self-capacitance scan step 3 654 and self-capacitance scan step 4 656. As stated previously, these scan periods are provided by way of example only, and it is understood that time period 608 can include alternative scan periods to those illustrated.

During self-capacitance scan step 1 650, touch node electrodes in a particular region of the touch screen (e.g., region 610, 614, 618 and/or 622 in FIG. 6A) can be scanned as illustrated in configuration 658. Specifically, in every 2×2 collection of touch node electrodes in the region to be scanned, the top-left touch node electrode can be driven and sensed (e.g., to sense a self-capacitance of that touch node electrode, as described with reference to FIG. 3A), the bottom-right touch node electrode can be biased at a bias voltage, and the top-right and bottom-left touch node electrodes can be driven but not sensed. Thus, in FIG. 6C, the DS touch node electrode can be coupled to sense circuitry (e.g., sense circuitry 314 in FIG. 3A), the D touch node electrodes can be coupled to one or more stimulation buffers, and the VB touch node electrode can be coupled to a bias buffer (e.g., an AC ground buffer). In some examples, the sense circuitry to which the DS touch node electrode is coupled can share the same stimulation source (e.g., AC voltage source 306) as the stimulation buffer(s) to which the D touch node electrodes are coupled, because the DS and D touch node electrodes can be driven by the same stimulation signal.

Self-capacitance scan step 2 652, self-capacitance scan step 3 654 and self-capacitance scan step 4 656 can drive and sense, drive but not sense, and bias different permutations of touch node electrodes, as illustrated in configurations 660, 662 and 664, such that at the end of self-capacitance scan step 4, each of the touch node electrodes in the group of four touch node electrodes has been driven and sensed at some point in time. The order of scan steps provided is exemplary only, and it is understood that a different order of scan steps could be utilized. By performing such self-capacitance measurements across part or all of the touch screen of the disclosure, a self-capacitance touch image on the touch screen can be captured.

As described above, in some examples, the self-capacitance scans discussed above can be performed in a region by region manner on the touch screen of the disclosure. For example, the self-capacitance scans can first be performed in region 610 of touch screen 600, then in region 614 of the touch screen, then in region 618 of the touch screen, and finally in region 622 of the touch screen. While a given region of the touch screen is being scanned in a self-capacitance configuration, the remaining regions of the touch screen can be configured in a way that mirrors the self-capacitance scan taking place in the given region, as will be described below.

Figure 6D:
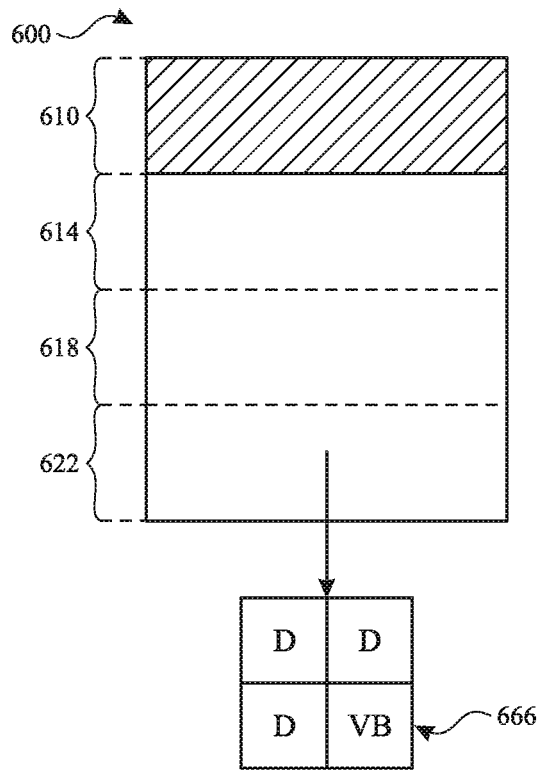
FIG. 6D illustrates an exemplary configuration of touch node electrodes in various regions of a touch screen while another region is being scanned in a self-capacitance configuration as described with reference to FIG. 6C.

FIG. 6D illustrates an exemplary configuration 666 of touch node electrodes in regions 614, 618 and 622 of touch screen 600 while region 610 is being scanned in a self-capacitance configuration as described with reference to FIG. 6C. Specifically, touch node electrodes in a 2×2 group of touch node electrodes can be configured as illustrated in configuration 666, where three of the touch node electrodes can be driven but not sensed, and the remaining one touch node electrode can be biased at a bias voltage. The position of the touch node electrode that is biased at the bias voltage (i.e., the VB touch node electrode) can correspond to the position of the VB touch node electrode in configurations 658, 660, 662 and 664 in FIG. 6C. That is to say that when region 610 is being scanned according to configuration 658, the VB touch node electrode in regions 614, 618 and 622 can be the lower-right touch node electrode in a 2×2 group of touch node electrodes, as illustrated in configuration 666. Similarly, when region 610 is being scanned according to configuration 660, the VB touch node electrode in regions 614, 618 and 622 can be the lower-left touch node electrode in the 2×2 group of touch node electrodes, when region 610 is being scanned according to configuration 662, the VB touch node electrode in regions 614, 618 and 622 can be the upper-left touch node electrode in the 2×2 group of touch node electrodes, and when region 610 is being scanned according to configuration 664, the VB touch node electrode in regions 614, 618 and 622 can be the upper-right touch node electrode in the 2×2 group of touch node electrodes. The above-described touch node electrode configurations can similarly apply to other regions of touch screen 600 when regions other than region 610 are being scanned in a self-capacitance configuration.

As discussed above, in some examples, groups of touch node electrodes ("supernodes") can be collectively scanned during certain time periods in the operation of the touch screen of the disclosure. For example, all of the supernodes on the touch screen can be scanned concurrently during a pen detection scan period, as described above with reference to FIG. 6B. Thus, to be able to scan all of such supernodes on the touch screen concurrently, there can be a minimum number of shared traces (e.g., shared traces 510 in FIG. 5B) that can be required to couple switching circuits (e.g., switching circuits 506 in FIG. 5B) to sense circuitry (e.g., sense circuitry 508 in FIG. 5B). Further, the switching circuits utilized by the touch screen may not align with the number and layout of supernodes on the touch screen—specifically, some supernodes on the touch screen may extend across separate switching circuits, as will be described below. In such configurations, shared traces can be shared amongst multiple switching circuits.

Figure 7A:
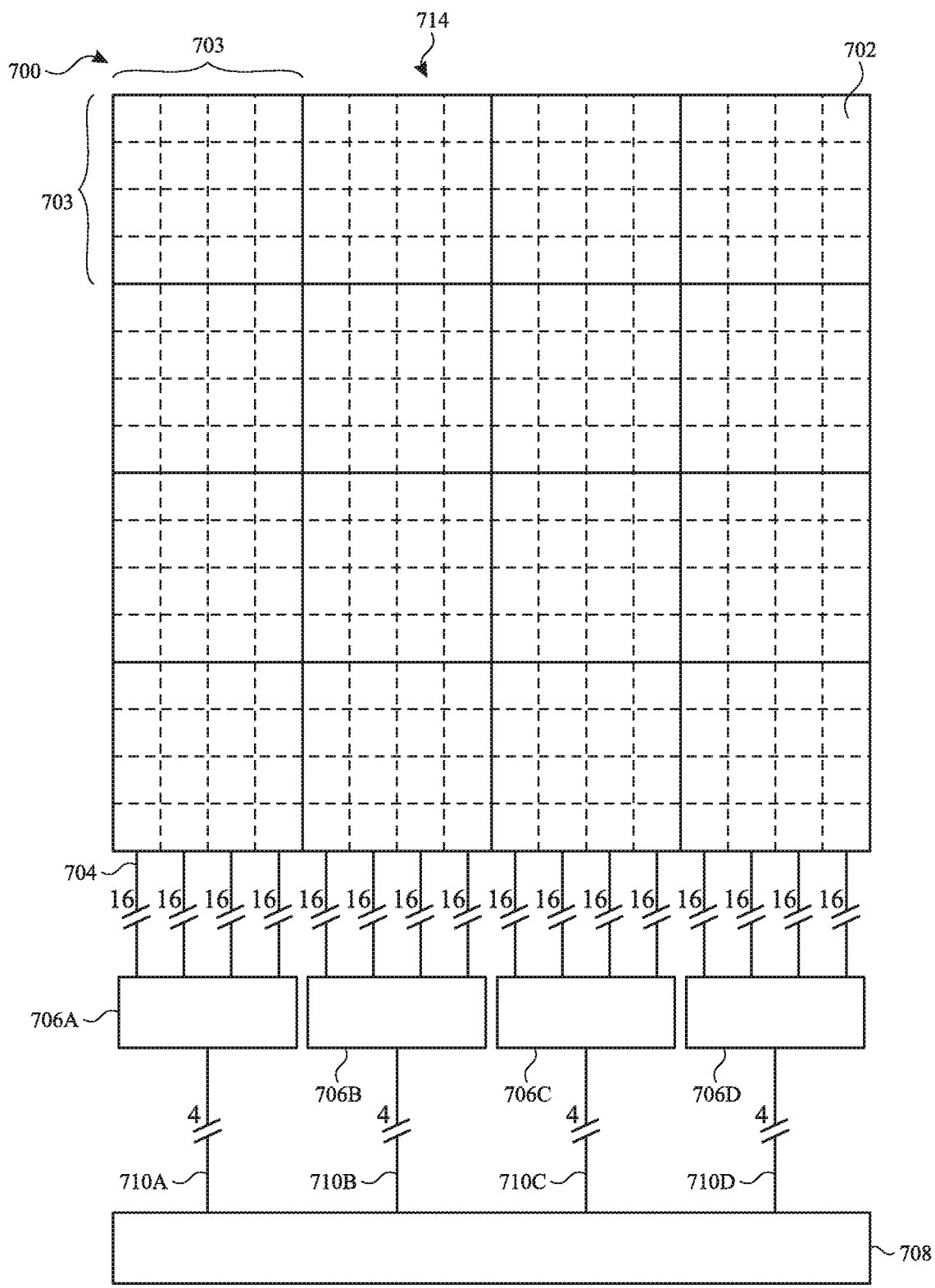
FIGS. 7A-7C illustrate exemplary touch screen configurations in which some supernodes on the touch screen can extend across multiple switching circuits according to examples of the disclosure.
Figure 7B:
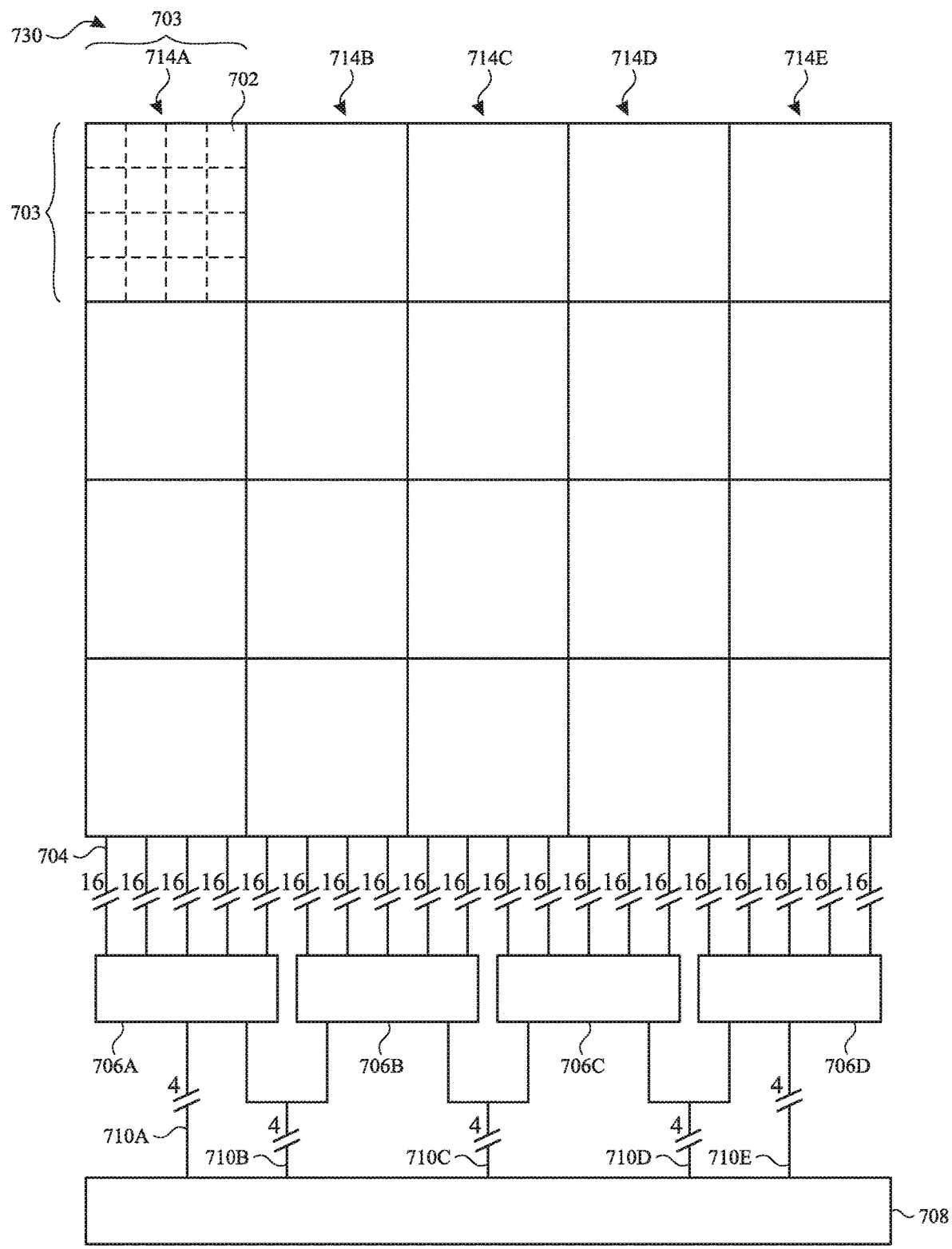
Figure 7C:
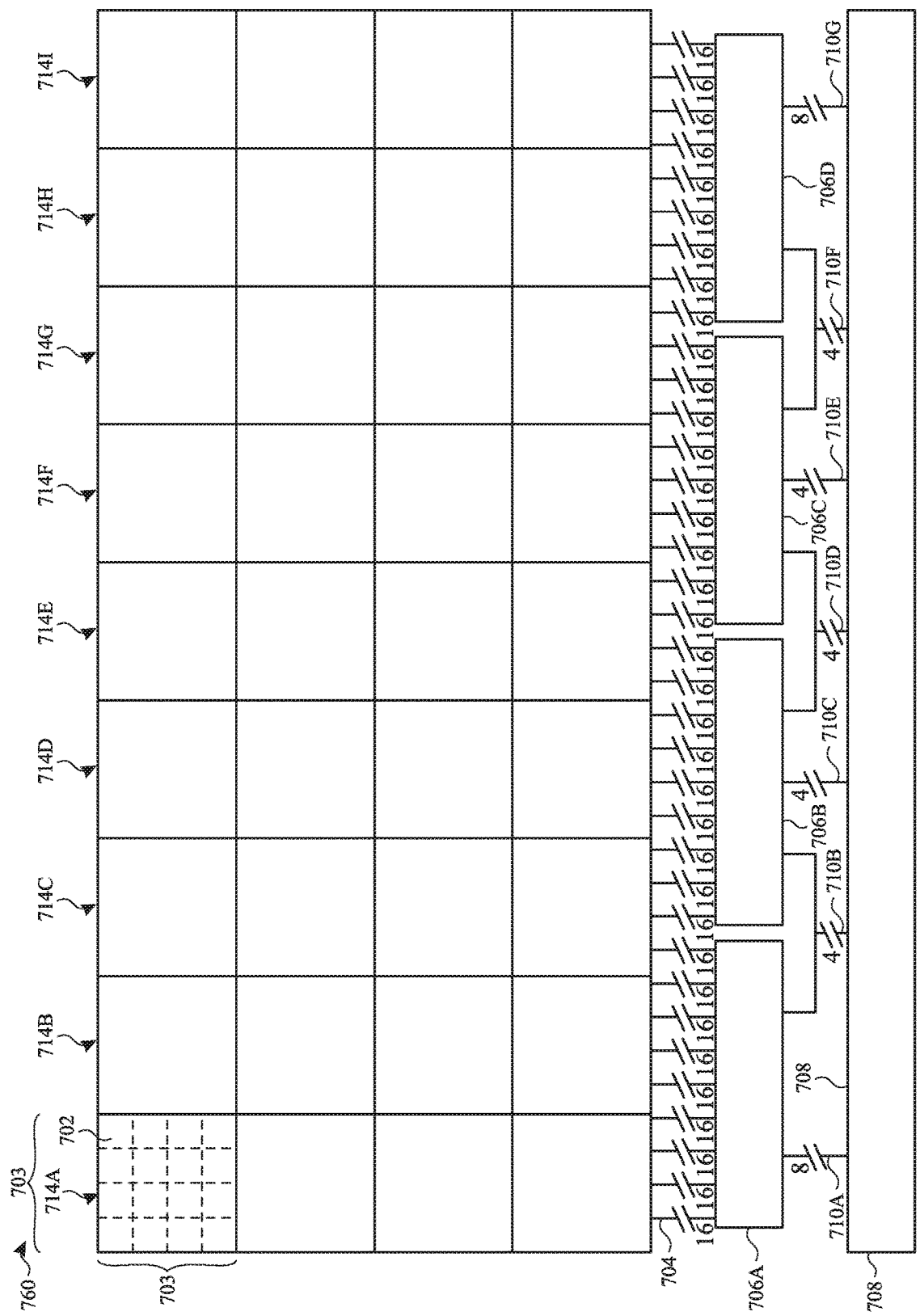

FIGS. 7A-7C illustrate exemplary touch screen and switching circuit configurations according to examples of the disclosure. FIG. 7A illustrates an exemplary touch screen 700 configuration in which switching circuits 706A, 706B, 706C and 706D (referred to collectively as 706) can correspond to full supercolumns 714 of supernodes 703 on the touch screen. In the example of FIG. 7A, supernodes 703 can be made up of groups of 4×4 touch node electrodes 702, as illustrated. It is understood that other supernode configurations can similarly be implemented according to the examples of the disclosure, though the discussion that follows will be directed to 4×4 supernode configurations for ease of description.

Touch screen 700 can include 16 supernodes 703: four supernodes horizontally by four supernodes vertically. Further, touch screen 700 can include four switching circuits 706. Switching circuit 706a can be coupled to the left-most four columns of touch node electrodes 702 (i.e., the left-most supernode 703 supercolumn 714) via respective touch node traces 704, switching circuit 706b can be coupled to the center-left four columns of touch node electrodes via respective touch node traces, switching circuit 706c can be coupled to the center-right four columns of touch node electrodes via respective touch node traces, and switching circuit 706d can be coupled to the right-most four columns of touch node electrodes via respective touch node traces.

Focusing, for now, on exemplary self-capacitance scans to be performed on touch screen 700 (e.g., as discussed with reference to FIGS. 6C-6D), a complete self-capacitance scan of the touch screen can require 16 scan steps (e.g., scan steps 650, 652, 654 and 656 in FIG. 6C, repeated four times across the touch screen as illustrated in FIG. 6D). Further, touch screen 700, as illustrated, can include 256 touch node electrodes 702. As such, the number of unique sense channels required to perform the self-capacitance scan of touch screen 700 can be 16-256 touch node electrodes divided by 16 scan steps. These 16 sense channels can be coupled to appropriate touch node electrodes 702 on touch screen 700 via switching circuits 706, each of which can be coupled to four sense channels in sense circuitry 708 via respective traces 710A, 710B, 710C and 710D (referred to collectively as 710). Therefore, each switching circuit 706 can correspond to one dedicated supercolumn 714, as illustrated.

In some examples, some supernodes on the touch screen can extend across multiple switching circuits—FIG. 7B illustrates such a scenario according to examples of the disclosure. Touch screen 730 in FIG. 7B can include 20, 4×4 supernodes 703: five supernodes horizontally, and four supernodes vertically. Touch node electrodes 702 making up supernodes 703 are only illustrated in the upper-left-most supernode of touch screen 730 for simplicity of illustration, though it is understood that the remaining supernodes can similarly include touch node electrodes.

Touch screen 730 can include four switching circuits 706. Because touch screen 730 can include five supercolumns 714 of supernodes 703, each of switching circuits 706 can be coupled to touch node electrodes 702 in supernodes in two supercolumns, as will be described below. Each switching circuit 706 can be coupled to five columns of touch node electrodes 702. Specifically, switching circuit 706a can be coupled to all of touch node electrodes 702 in supernodes 703 in supercolumn 714a, as well as the left-most column of touch node electrodes in the supernodes in supercolumn 714b. Switching circuit 706b can be coupled to the remaining touch node electrodes 702 in supercolumn 714b, as well as the left-two columns of touch node electrodes in supercolumn 714c. Switching circuit 706c can be coupled to the right-two columns of touch node electrodes 702 in supercolumn 714c, as well as the left-three columns of touch node electrodes in supercolumn 714d. Finally, switching circuit 706d can be coupled to the remaining column of touch node electrodes 702 in supercolumn 714d, as well as all of the touch node electrodes in supercolumn 714e.

Focusing, for now, on exemplary self-capacitance scans to be performed on touch screen 730 (e.g., as discussed with reference to FIGS. 6C-6D), a complete self-capacitance scan of the touch screen can require 16 scan steps (e.g., scan steps 650, 652, 654 and 656 in FIG. 6C, repeated four times across the touch screen as illustrated in FIG. 6D). Further, touch screen 730, as illustrated, can include 320 touch node electrodes 702. As such, the number of unique sense channels required to perform the self-capacitance scan of touch screen 730 can be 20-320 touch node electrodes divided by 16 scan steps. These 20 sense channels can be coupled to appropriate touch node electrodes 702 on touch screen 730 via switching circuits 706. Because each switching circuit 706 may need to support a full and a partial, or two partial, columns 714 of supernodes 703, as described above, neighboring switching circuits can share some connections to sense channels in sense circuitry 708, so that those switching circuits can each have access to the sense channels needed to couple to the supernodes shared between those switching circuits. In other words, in order for touch node electrodes 702 that are part of the same supernode 703, but are coupled to different switching circuits 706, to be coupled to the same sense channel in sense circuitry 708, it can be necessary for those different switching circuits to at least partially share a connection to the sense circuitry. For example, switching circuit 706a and switching circuit 706b can be partially coupled to sense circuitry 708 via shared traces 710b—switching circuit 706a can have four dedicated connections to sense channels in sense circuitry 708 via traces 710a, and can share four connections to sense channels in the sense circuitry with switching circuit 706b via traces 710b. In this way, touch node electrodes 702 coupled to switching circuit 706a and touch node electrodes coupled to switching circuit 706b that are part of the same supernode 703 can be coupled to the same shared trace 710b, and thus to the same sense channel in sense circuitry 708. Switching circuit 706b, switching circuit 706c and switching circuit 706d can similarly share shared traces (e.g., traces 710c and 710d) for the same reasons as described above.

FIG. 7C illustrates an exemplary touch screen having four rows of supernodes 703, and nine supercolumns 714 of supernodes according to examples of the disclosure. Specifically, touch screen 760 in FIG. 7C can include 36, 4×4 supernodes 703: nine supernodes horizontally, and four supernodes vertically. Touch node electrodes 702 making up supernodes 703 are only illustrated in the upper-left-most supernode of touch screen 760 for simplicity of illustration, though it is understood that the remaining supernodes can similarly include touch node electrodes.

Touch screen 760, like touch screen 730 in FIG. 7B, can include four switching circuits 706, though each switching circuit in touch screen 760 can support a greater number of traces 710 and touch node traces 704. Because touch screen 760 can include nine supercolumns 714 of supernodes 703, each of switching circuits 706 can be coupled to touch node electrodes 702 in supernodes in three supercolumns. In particular, each switching circuit 706 can be coupled to nine columns of touch node electrodes 702. Specifically, switching circuit 706a can be coupled to all of touch node electrodes 702 in supernodes 703 in supercolumns 714a and 714b, as well as the left-most column of touch node electrodes in the supernodes in supercolumn 714c. Switching circuit 706b can be coupled to the remaining touch node electrodes 702 in supercolumn 714c, all of the touch node electrodes in supercolumn 714d, as well as the left-two columns of touch node electrodes in supercolumn 714e. Switching circuit 706c can be coupled to the right-two columns of touch node electrodes 702 in supercolumn 714e, all of the touch node electrodes in supercolumn 714f, as well as the left-three columns of touch node electrodes in supercolumn 714g. Finally, switching circuit 706d can be coupled to the remaining column of touch node electrodes 702 in supercolumn 714g, as well as all of the touch node electrodes in supercolumns 714h and 714i.

Similar to as described with reference to FIG. 7B, each switching circuit 706 in FIG. 7C may need to support full and partial columns of supernodes 703, as described above. As such, neighboring switching circuits 706 can share some connections 710 to sense channels in sense circuitry 708, so that those switching circuits can each have access to the sense channels needed to couple to the supernodes 703 shared between those switching circuits. For example, switching circuit 706a and switching circuit 706b can be partially coupled to sense circuitry 708 via shared traces 710b—switching circuit 706a can have eight dedicated connections to sense channels in sense circuitry 708 via traces 710a, and can share four connections to sense channels in the sense circuitry with switching circuit 706b via traces 710b. In this way, touch node electrodes 702 coupled to switching circuit 706a and touch node electrodes coupled to switching circuit 706b that are part of the same supernode 703 can be coupled to the same shared trace 710b, and thus to the same sense channel in sense circuitry 708. Switching circuit 706b, switching circuit 706c and switching circuit 706d can similarly share shared traces (e.g., traces 710d and 710f) for the same reasons as described above.

Figure 8A:
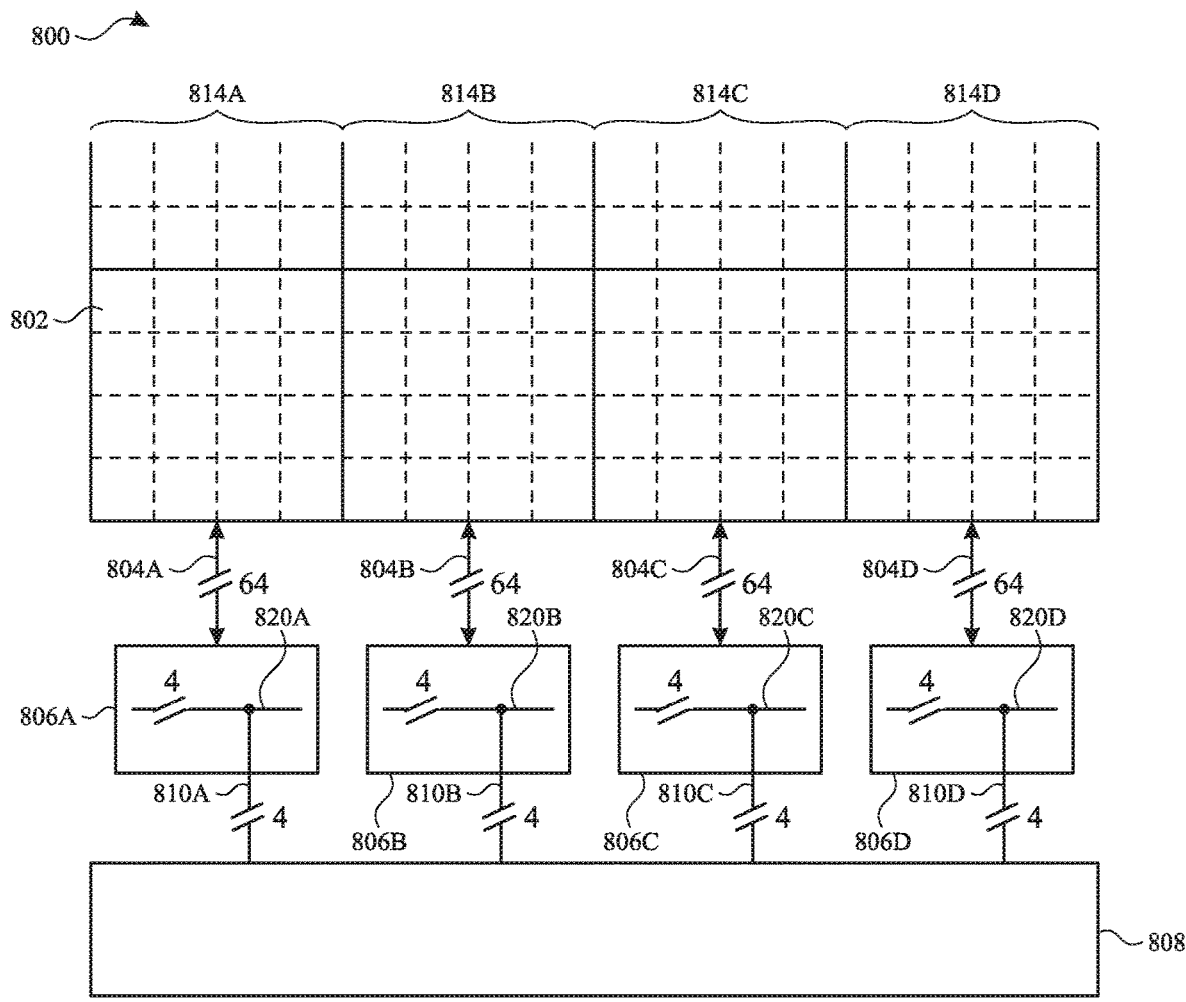
FIG. 8A illustrates an exemplary touch screen configuration, including exemplary interconnect lines that can be part of switching circuits according to examples of the disclosure.

FIGS. 8A-8D illustrate exemplary interconnect structures for the switching circuits of the touch screen according to examples of the disclosure. FIG. 8A illustrates an exemplary switching circuit 806A, 806B, 806C and 806D (referred to collectively as 806) configuration according to examples of the disclosure. The configuration of FIG. 8A can be substantially that of FIG. 7A. Specifically, switching circuit 806a can be coupled to touch node electrodes 802 in supercolumn 814a of supernodes, switching circuit 806b can be coupled to touch node electrodes in supercolumn 814b of supernodes, switching circuit 806c can be coupled to touch node electrodes in supercolumn 814c of supernodes, and switching circuit 806d can be coupled to touch node electrodes in supercolumn 814d of supernodes, as previously described with reference to FIG. 7A. Respective switching circuits 806 can be coupled to touch node electrodes 802 in respective supercolumns 814 via 64 traces 804A, 804B, 804C and 804D (referred to collectively as 804), because each supercolumn of supernodes can include 64 touch node electrodes. Further, respective switching circuits 806 can be coupled to respective sense channels in sense circuitry 808 via four sense traces 810A, 810B, 810C and 810D (referred to collectively as 810), as previously discussed.

Switching circuits 806 can include interconnect lines 820A, 820B, 820C and 820D (referred to collectively as 820) that can facilitate the coupling of touch node traces 804 to respective ones of sense traces 810. Focusing on switching circuit 806a (switching circuits 806b, 806c and 806d can be similarly structured), the switching circuit can include interconnect lines 820a. Interconnect lines 820a can be coupled to respective ones of sense traces 810a, such that each sense trace 810a can be coupled to a different interconnect line 820a. Touch node traces 804a can then be selectively coupled to respective ones of interconnect lines 820a so as to couple touch node electrodes 802 to appropriate sense traces 810a (and thus to appropriate sense channels in sense circuitry 808) according to desired touch screen operation (e.g., according to any touch screen scan configuration, such as described with reference to FIGS. 6A-6D).

In some examples, interconnect lines 820a can extend across substantially the entire width of switching circuit 806a. Further, although illustrated as single lines, it is understood that interconnect lines 820a can each be comprised of multiple lines—specifically, a sufficient number of lines so as to allow for implementation of desired touch screen scan configurations. For example, the total number of lines in interconnect lines 820a can correspond to the maximum number of sense channels in sense circuitry 808 to which touch node electrodes 802 in column 814a of touch node electrodes will be coupled at a given moment in time. For example, with respect to the self-capacitance scan described with reference to FIGS. 6C-6D and FIG. 7A, the maximum number of sense channels in sense circuitry 808 to which touch node electrodes 802 in column 814a of touch node electrodes will be coupled at a given moment in time can be four, as previously described. Therefore, interconnect lines 820a (and thus sense traces 810a) can be comprised of four lines that extend across substantially the entire width of switching circuit 806a. The preceding discussion can apply analogously to switching circuits 806b, 806c and 806d.

Figure 8B:
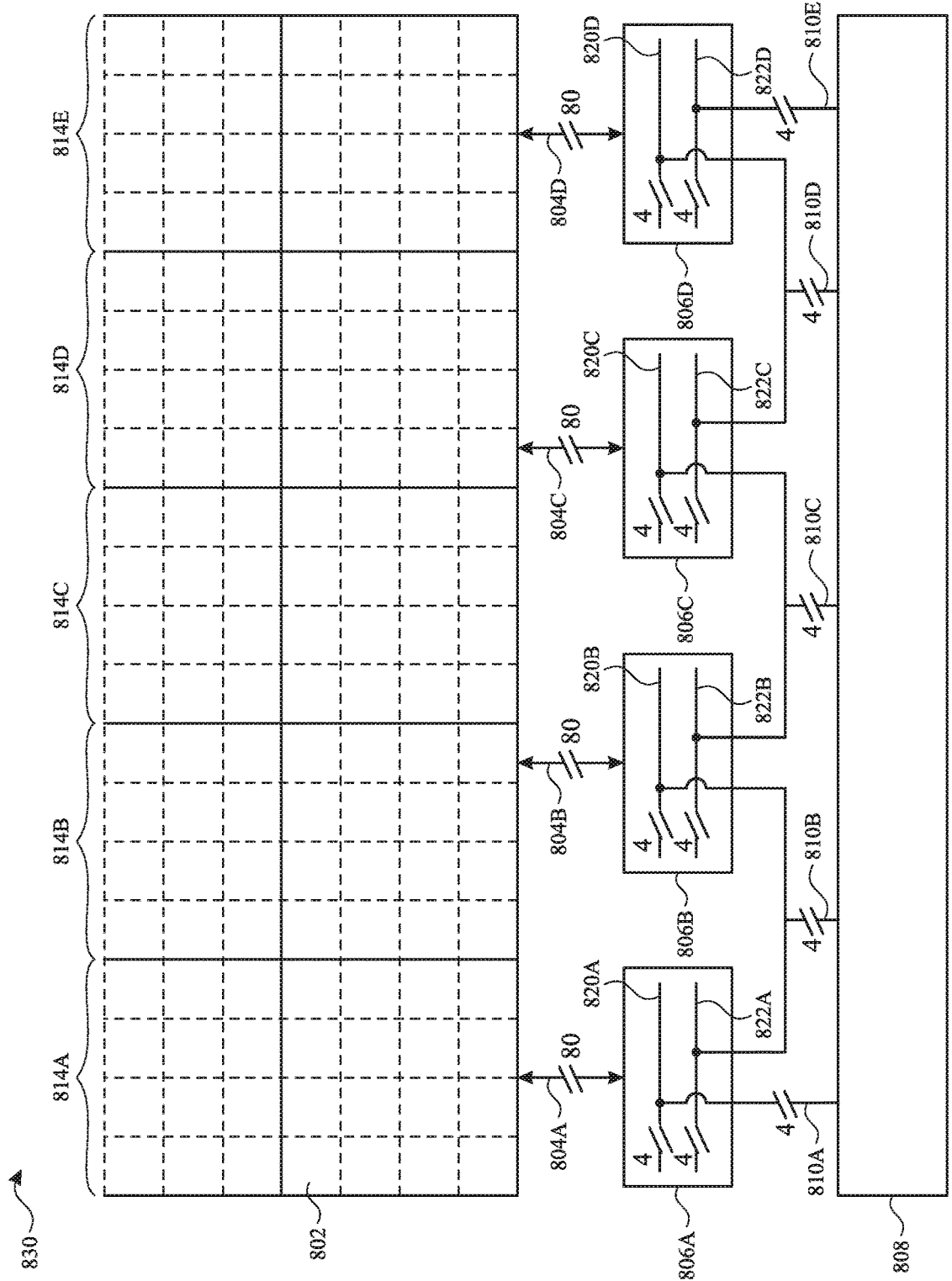
FIG. 8B illustrates an exemplary touch screen configuration having shared interconnect lines across switching circuits according to examples of the disclosure.

In some examples, neighboring switching circuits may need to share connections to sense circuitry, as described above with reference to FIGS. 7B-7C. FIG. 8B illustrates an exemplary switching circuit 806 configuration in which neighboring switching circuits can share connections to sense circuitry 808 according to examples of the disclosure. The configuration of FIG. 8B can be substantially that of FIG. 7B. Specifically, switching circuit 806a can be coupled to touch node electrodes 802 in supercolumn 814a and part of supercolumn 814b of supernodes, switching circuit 806b can be coupled to touch node electrodes in part of supercolumn 814b and part of supercolumn 814c of supernodes, switching circuit 806c can be coupled to touch node electrodes in part of supercolumn 814c and part of supercolumn 814d of supernodes, and switching circuit 806d can be coupled to touch node electrodes in part of supercolumn 814d and supercolumn 814e of supernodes, as previously described with reference to FIG. 7B. Respective switching circuits 806 can be coupled to touch node electrodes 802 via 80 traces 804, as described above with reference to FIG. 7B. Further, respective switching circuits 806 can be coupled to respective sense channels in sense circuitry 808 via sense traces 810. In some examples, switching circuits 806 can share sense traces 810. For example, switching circuit 806a can be coupled to four sense channels in sense circuitry 808 via four dedicated sense traces 810a, and can also be coupled to another four sense channels in the sense circuitry via four shared traces 810b that can be shared with switching circuit 806b. Switching circuit 806b can be coupled to four sense channels in sense circuitry 808 via shared traces 810b, and can also be coupled to another four sense channels in the sense circuitry via four shared traces 810c that can be shared with switching circuit 806c. Switching circuits 806c and 806d can be coupled to sense channels in sense circuitry 808 in manners analogous to those described with reference to switching circuits 806a and 806b, above.

Switching circuits 806 can include interconnect lines 820 and 822a, 822b, 822c and 822d (referred to collectively as 822) that can facilitate the coupling of touch node traces 804 to respective ones of traces 810. Focusing on switching circuit 806a (switching circuits 806b, 806c and 806d can be similarly structured), the switching circuit can include interconnect lines 820a and 822a. Interconnect lines 820a can be coupled to respective ones of traces 810a, while interconnect lines 822a can be coupled to respective ones of shared traces 810b that can be shared with switching circuit 806b and further coupled to interconnect lines 820b in switching circuit 806b. Touch node traces 804a can then be selectively coupled to respective ones of interconnect lines 820a and 822a so as to couple touch node electrodes 802 with appropriate traces 810a and 810b (and thus with appropriate sense channels in sense circuitry 808) according to desired touch screen operation (e.g., according to any touch screen scan configuration, such as described with reference to FIGS. 6A-6D).

In some examples, interconnect lines 820a and 822a can extend across substantially the entire width of switching circuit 806a. Further, although illustrated as single lines, it is understood that interconnect lines 820a and 822a can each be comprised of multiple lines—specifically, a sufficient number of lines so as to allow for implementation of desired touch screen scan configurations. For example, the total number of lines in interconnect lines 820a and 822a can correspond to the maximum number of sense channels in sense circuitry 808 to which the touch node electrodes 802 to which switching circuit 806a is coupled will be coupled at a given moment in time. For example, with respect to the self-capacitance scan described with reference to FIGS. 6C-6D and FIG. 7B, the maximum number of sense channels in sense circuitry 808 to which switching circuit 806a's touch node electrodes 802 will be coupled at a given moment in time can be eight: one each for the four complete supernodes coupled to switching circuit 806a, and one each for the four partial supernodes coupled to switching circuit 806a. Therefore, interconnect lines 820a (and thus traces 810a) can be comprised of four lines, and interconnect lines 822a (and thus traces 810b) can be comprised of four lines, for a total of eight interconnect lines that extend across substantially the entire width of switching circuit 806a. The preceding discussion can apply analogously to switching circuits 806b, 806c and 806d.

Figure 8C:
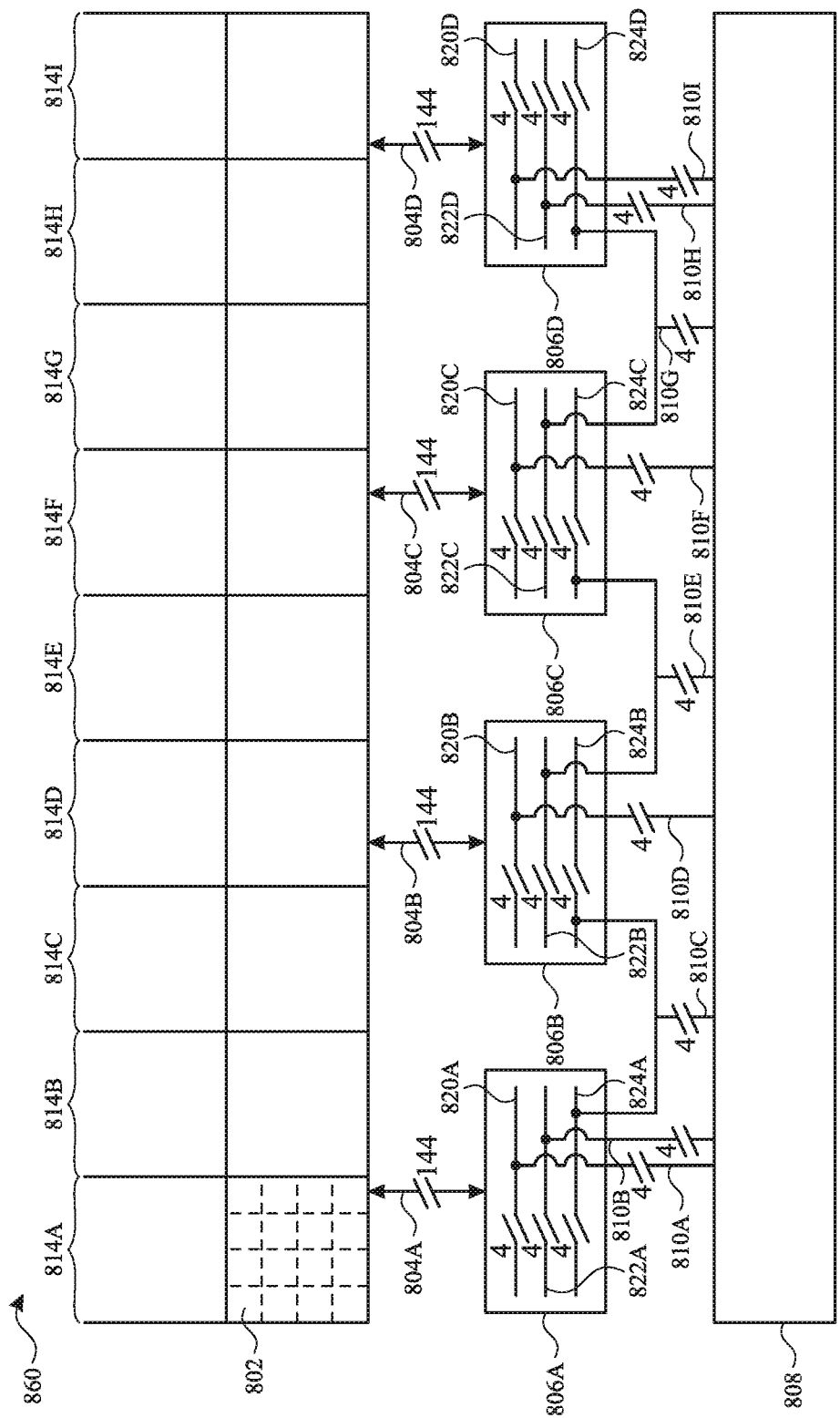
FIG. 8C illustrates an exemplary switching circuit configuration in which the switching circuits include three sets of interconnect lines according to examples of the disclosure.

With larger touch screens that include more touch node electrodes 802, and with more complicated touch screen scan configurations, the number of such interconnect lines can be substantially more than those illustrated in FIG. 8B. For example, FIG. 8C illustrates another exemplary switching circuit 806 configuration in which switching circuits have three sets of interconnect lines according to examples of the disclosure. The configuration of FIG. 8C can be substantially that of FIG. 7C. Specifically, switching circuit 806a can be coupled to touch node electrodes 802 in supercolumns 814a and 814b and part of supercolumn 814c of supernodes, switching circuit 806b can be coupled to touch node electrodes in part of supercolumns 814c and 814e and supercolumn 814d of supernodes, switching circuit 806c can be coupled to touch node electrodes in part of supercolumns 814*e* and 814*g* and supercolumn 814*f* of supernodes, and switching circuit 806*d* can be coupled to touch node electrodes in part of supercolumn 814*g* and supercolumns 814*h* and 814*i* of supernodes, as previously described with reference to FIG. 7C. Respective switching circuits 806 can be coupled to touch node electrodes 802 via 144 traces 804, as described above with reference to FIG. 7C. Further, respective switching circuits 806 can be coupled to respective sense channels in sense circuitry 808 via sense traces 810. In some examples, switching circuits 806 can share sense traces 810. For example, switching circuit 806*a* can be coupled to eight sense channels in sense circuitry 808 via eight dedicated sense traces 810*a* and 810*b*, and can also be coupled to another four sense channels in the sense circuitry via four shared traces 810*c* that can be shared with switching circuit 806*b*. Switching circuit 806*b* can be coupled to four sense channels in sense circuitry 808 via shared traces 810*c*, four sense channels in the sense circuitry via four dedicated sense traces 810*d*, and can also be coupled to another four sense channels in the sense circuitry via four shared traces 810*e* that can be shared with switching circuit 806*c*. Switching circuits 806*c* and 806*d* can be coupled to sense channels in sense circuitry 808 in manners analogous to those described with reference to switching circuits 806*a* and 806*b*, above.

Switching circuits 806 can include interconnect lines 820, 822 and 824*a*, 824*b*, 824*c* and 824*d* (referred to collectively as 824) that can facilitate the coupling of touch node traces 804 to respective ones of traces 810. Focusing on switching circuit 806*a* (switching circuits 806*b*, 806*c* and 806*d* can be similarly structured), the switching circuit can include interconnect lines 820*a*, 822*a* and 824*a*. Interconnect lines 820*a* can be coupled to respective ones of traces 810*a*, interconnect lines 822*a* can be coupled to respective ones of traces 810*b*, and interconnect lines 824*a* can be coupled to respective ones of shared traces 810*c* that can be shared with switching circuit 806*b* and further coupled to interconnect lines 824*b* in switching circuit 806*b*. Touch node traces 804*a* can then be selectively coupled to respective ones of interconnect lines 820*a*, 822*a* and 824*a* so as to couple touch node electrodes 802 with appropriate traces 810*a*, 810*b* and 810*c* (and thus with appropriate sense channels in sense circuitry 808) according to desired touch screen operation (e.g., according to any touch screen scan configuration, such as described with reference to FIGS. 6A-6D).

In some examples, interconnect lines 820*a*, 822*a* and 824*a* can extend across substantially the entire width of switching circuit 806*a*. Further, although illustrated as single lines, it is understood that interconnect lines 820*a*, 822*a* and 824*a* can each be comprised of multiple lines—specifically, a sufficient number of lines so as to allow for implementation of desired touch screen scan configurations. For example, the total number of lines in interconnect lines 820*a*, 822*a* and 824*a* can correspond to the maximum number of sense channels in sense circuitry 808 to which the touch node electrodes 802 to which switching circuit 806*a* is coupled will be coupled at a given moment in time. For example, with respect to the self-capacitance scan described with reference to FIGS. 6C-6D and FIG. 7C, the maximum number of sense channels in sense circuitry 808 to which switching circuit 806*a*'s touch node electrodes 802 will be coupled at a given moment in time can be twelve: one each for the eight complete supernodes coupled to switching circuit 806*a*, and one each for the four partial supernodes coupled to switching circuit 806*a*. Therefore, interconnect lines 820*a* (and thus traces 810*a*) can be comprised of four lines, interconnect lines 822*a* (and thus traces 810*b*) can be comprised of four lines, and interconnect lines 824*a* (and thus traces 810*c*) can be comprises of four lines, for a total of twelve interconnect lines that extend across substantially the entire width of switching circuit 806*a*. The preceding discussion can apply analogously to switching circuits 806*b*, 806*c* and 806*d*. As shown above, with larger touch screens that include more touch node electrodes 802, and with more complicated touch screen scan configurations, the number of such interconnect lines can be substantially more than those illustrated in FIG. 8C. Thus, it can be beneficial to reduce the number of interconnect lines that extend across substantially the entire width of switching circuits 806 to reduce the size and complexity of the switching circuits, and to save cost in manufacturing the switching circuits. Further, in some examples, due to specifics of the touch screen scan configurations utilized by the touch screen of the disclosure, certain touch node electrodes 802 may not need to be coupled to certain traces 810 during any touch screen scan, and thus not all touch node electrodes 802 on the touch screen may need to have access to all of interconnect lines 820, 822 and 824. Thus, interconnect lines 820, 822 and 824 need not extend across substantially the entirety of switching circuits 806, as will be shown below.

Figure 8D:
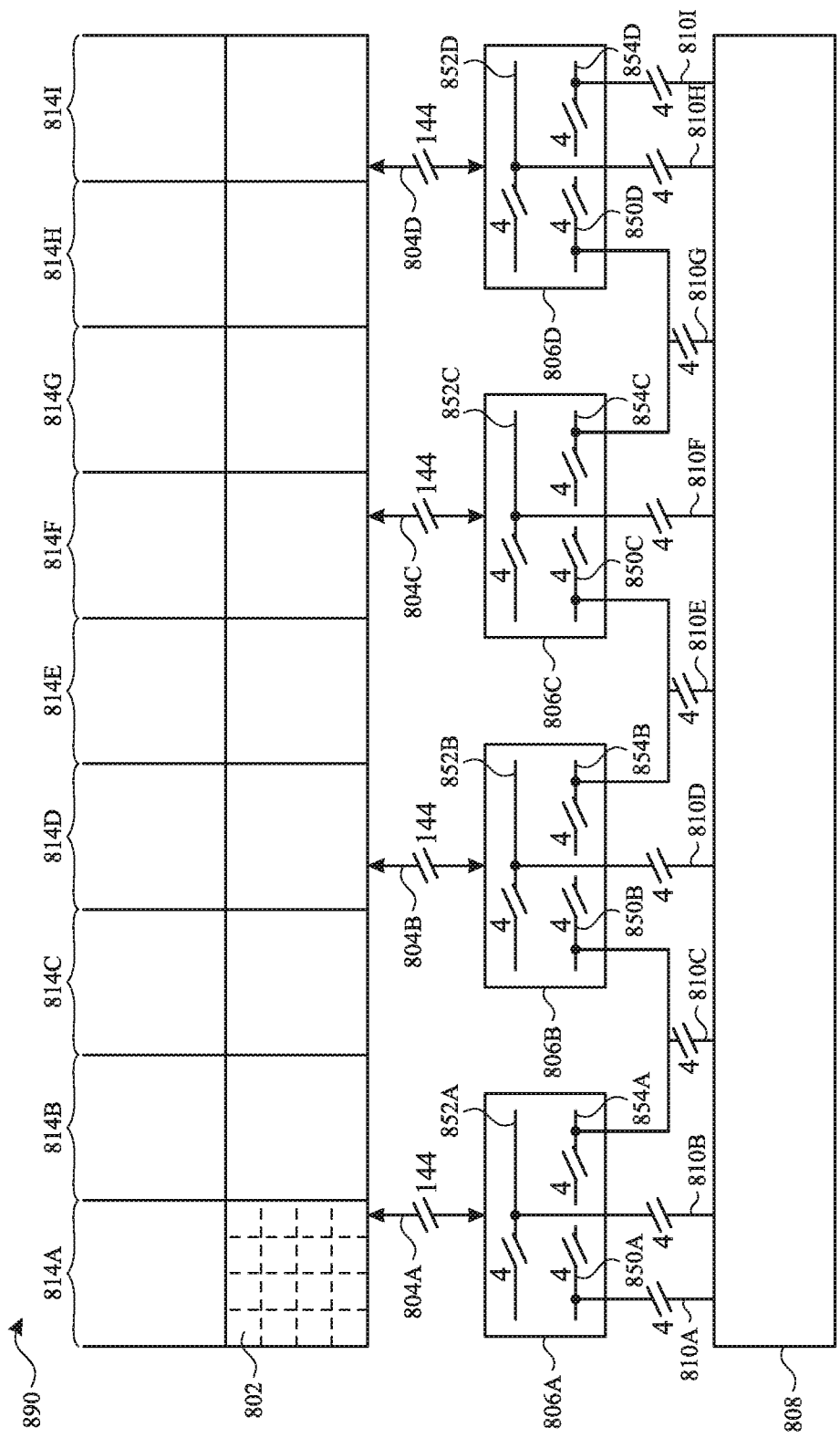
FIG. 8D illustrates an exemplary switching circuit configuration having a reduced number of interconnect lines according to examples of the disclosure.

FIG. 8D illustrates an exemplary switching circuit 806 configuration in which switching circuits have three sets of interconnect lines according to examples of the disclosure. The touch screen 800 configuration of FIG. 8D can be substantially that of FIGS. 8C and 7C. Specifically, switching circuit 806*a* can be coupled to touch node electrodes 802 in supercolumns 814*a* and 814*b* and part of supercolumn 814*c* of supernodes, switching circuit 806*b* can be coupled to touch node electrodes in part of supercolumns 814*c* and 814*e* and supercolumn 814*d* of supernodes, switching circuit 806*c* can be coupled to touch node electrodes in part of supercolumns 814*e* and 814*g* and supercolumn 814*f* of supernodes, and switching circuit 806*d* can be coupled to touch node electrodes in part of supercolumn 814*g* and supercolumns 814*h* and 814*i* of supernodes, as previously described with reference to FIG. 7C. Respective switching circuits 806 can be coupled to touch node electrodes 802 via 144 traces 804, as described above with reference to FIG. 7C. Further, respective switching circuits 806 can be coupled to respective sense channels in sense circuitry 808 via sense traces 810. In some examples, switching circuits 806 can share sense traces 810. For example, switching circuit 806*a* can be coupled to eight sense channels in sense circuitry 808 via eight dedicated sense traces 810*a* and 810*b*, and can also be coupled to another four sense channels in the sense circuitry via four shared traces 810*c* that can be shared with switching circuit 806*b*. Switching circuit 806*b* can be coupled to four sense channels in sense circuitry 808 via shared traces 810*c*, four sense channels in the sense circuitry via four dedicated sense traces 810*d*, and can also be coupled to another four sense channels in the sense circuitry via four shared traces 810*e* that can be shared with switching circuit 806*c*. Switching circuits 806*c* and 806*d* can be coupled to sense channels in sense circuitry 808 in manners analogous to those described with reference to switching circuits 806*a* and 806*b*, above.

Switching circuits 806 can include interconnect lines 850*a*, 850*b*, 850*c* and 850*d* (referred to collectively as 850), 852*a*, 852*b*, 852*c* and 852*d* (referred to collectively as 852) and 854*a*, 854*b*, 854*c* and 854*d* (referred to collectively as 854) that can facilitate the coupling of touch node traces 804 to respective ones of traces 810. Focusing on switching circuit 806*a* (the discussion that follows can similarly apply to switching circuits 806*b*, 806*c* and 806*d*), interconnect lines 850a can extend across a portion of switching circuit 806a, and interconnect lines 854a can extend across a remaining portion of the switching circuit, as illustrated. In some examples, interconnect lines 850a and 854a can be horizontally aligned lines with a break between the two to form the resulting separate interconnect lines. Interconnect lines 852a can extend across substantially the entirety of switching circuit 806a. Touch node traces 804a can couple switching circuit 806a's touch node electrodes 802 to one or more of interconnect lines 850a, 852a and 854a. Thus, the configuration of switching circuit 806a in FIG. 8D can include the same number of separate interconnect lines (lines 850a, 852a and 854a) as the configuration of switching circuit 806a in FIG. 8C (lines 820a, 822a and 824a). However, interconnect lines 850a, 852a and 854a in switching circuit 806a in FIG. 8D can occupy the space of two interconnect lines extending across substantially the entirety of the switching circuit, whereas interconnect lines 820a, 822a and 824a in switching circuit 806a in FIG. 8C can occupy the space of three interconnect lines extending across substantially the entirety of the switching circuit. Thus, the interconnect line configuration of FIG. 8D can occupy approximately 33% less space in switching circuits 806 than the interconnect line configuration of FIG. 8C, while maintaining desired touch screen operation. Therefore the switching circuits can require less width and area, enabling thinner display border areas and reduced cost.

In some examples, all of traces 804a can have access to (i.e., can be coupled to) all of interconnect lines 850a, 852a and 854a. In some examples, interconnect lines 850a may only have access to a first portion of traces 804a (e.g., because interconnect lines 850a may only extend across a portion of switching circuit 806a), interconnect lines 854a may only have access to a second portion of traces 804a (e.g., because interconnect lines 854a may only extend across a portion of switching circuit 806a), and interconnect lines 852a may have access to all of traces 804a (e.g., because interconnect lines 852a may extend across the entirety of switching circuit 806a).

In general, the number of switches in a given switching circuit (as described throughout this disclosure) can be optimized based on the number of full super columns and partial super columns the switching circuit supports. For example, two interconnect line segments (e.g., interconnect lines 850b and 854b), one for each partial super column, can be side by side in the switching circuit, while the remaining full super columns (if any) may require an interconnect line/matrix that extends substantially across the entire width of the switching circuit (e.g., interconnect lines 852b), as shown in the example of FIG. 8D. For self-capacitance scanning, the total number of interconnect lines/sense channels needed per partial or full super column can be Nsns_scol=Nnode_scol/Nsteps, where Nnode_scol is the number of nodes per super column, and Nsteps is the number of scan steps in the self-capacitance scan. The depth of the interconnect line/matrix segment (i.e., the number of interconnect lines per segment) can be Nsw=(Npartial/2+Nfull)*Nnode_scol, where Npartial is the number of partial super columns (e.g., generally 2) supported by a given switching circuit, and Nfull is the number of full super columns supported by the given switching circuit.

As described above with respect to FIGS. 6A-6D, in some examples, the touch screen of the disclosure may need to accommodate a variety of different touch screen scan configurations. Therefore, it can be beneficial for the touch screen, and in particular the switching circuits of the touch screen, to be sufficiently flexible to allow for a variety of touch screen scan configurations to be implemented on the touch screen. FIGS. 9-11 illustrate various switching circuit configurations that allow for such flexibility.

Figure 9A:
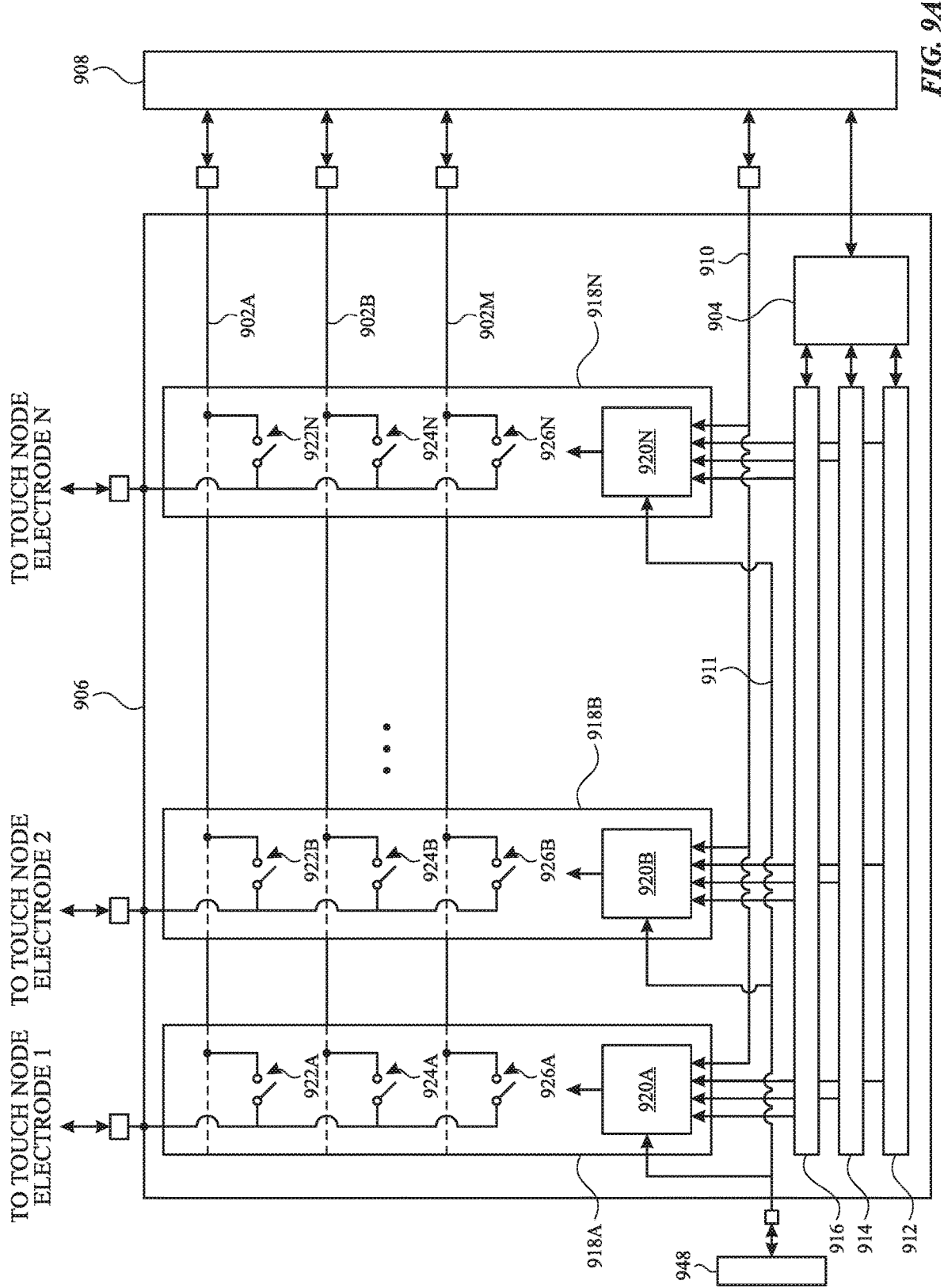
FIG. 9A illustrates an exemplary memory-based switching circuit configuration according to examples of the disclosure.

FIG. 9A illustrates an exemplary memory-based switching circuit 906 configuration according to examples of the disclosure. Switching circuit 906 can correspond to any of the switching circuits described in this disclosure, including switching circuits 506 in FIG. 5B, switching circuits 706 in FIGS. 7A-7C and/or switching circuits 806 in FIGS. 8A-8D. Switching circuits 906 can be coupled to sense circuitry 908 in a variety of ways, as will be described below. Switching circuit 906 can include pixel mux blocks ("PMBs") 918a-918N (referred to collectively as 918). Each PMB 918 can be coupled to a particular touch node electrode on the touch screen of the disclosure (not illustrated). For example, PMB 918a can be coupled to touch node electrode 1, PMB 918b can be coupled to touch node electrode 2, and PMB 918N can be coupled to touch node electrode N. For the purposes of this disclosure, touch node electrodes can be numbered from top to bottom, then from left to right, on the touch screen, as illustrated in FIG. 9B, though it is understood that the particular touch node electrode numbering scheme used can be modified within the scope of this disclosure. Thus, moving from PMB 918a to PMB 918b (i.e., moving horizontally to the right across switching circuit 906) can correspond to moving from touch node electrode 1 to touch node electrode 2 (i.e., moving vertically downwards across the touch screen). It is understood that while FIG. 9B illustrates a touch screen with 144 touch node electrodes, other touch screen configurations are also within the scope of the disclosure, including touch screens with 320 touch node electrodes (e.g., a five by four supernode touch screen having 20 columns of touch node electrodes, and 16 rows of touch node electrodes). There can be as many PMBs 918 in switching circuit 906 as there are touch node electrodes to which the switching circuit is coupled. For example, referring back to FIG. 7A, if switching circuit 906 corresponds to switching circuit 706a, then switching circuit 906 can include 64 PMBs 918, each PMB coupled to a respective one of the 64 touch node electrodes to which the switching circuit is coupled. The above-provided numbers are exemplary only, and it is understood that the switching circuit 906 architecture of FIG. 9A can be adapted to operate with any number of touch node electrodes. Switching circuit 906 can also include various memories 912, 914 and 916 and interface 904, all of which will be described in more detail later.

Sense circuitry 908 can be coupled to switching circuit 906 at lines 902a-902M (referred to collectively as 902). Lines 902 can correspond to interconnect lines 820, 822, 830, 832, 840, 842, 844, 850, 852 and/or 854 in FIGS. 8A-8D, for example. Lines 902 can transmit any number of signals to and/or from sense circuitry 908. For example, one or more of lines 902 can be coupled to particular sense channels in sense circuitry 908, one or more of lines 902 can be coupled to a common voltage source at which to bias touch node electrodes during a display phase of the touch screen (e.g., a Vcom voltage source) in the sense circuitry, one or more of lines 902 can be coupled to a Vbias voltage source (e.g., as described with reference to FIGS. 6A-6D) in the sense circuitry, and/or one or more of lines 902 can be coupled to a Vdrive voltage source (e.g., as described with reference to FIGS. 6A-6D) in the sense circuitry. While three such lines—lines 902a, 902b and 902M—are illustrated in FIG. 9A, fewer or more lines can be utilized in accordance with the examples of the disclosure.

PMBs 918 can include a number of switches (e.g., switches 922a-922N (referred to collectively as 922), 924a-

924N (referred to collectively as 924) and 926a-926N (referred to collectively as 926)) equal to the number of lines 902 in switching circuit 906. Using these switches 922, 924 and 926, PMBs 918 can selectively couple their respective touch node electrodes to any one of lines 902. For example, PMB 918a can couple touch node electrode 1—to which PMB 918a can be coupled—to line 902M by closing switch 926a while leaving switches 922a and 924a open. In this way, touch node electrode 1 can be coupled to any signal that can exist on lines 902, such as those discussed above. PMBs 918b through 918N can similarly selective couple their respective touch node electrodes to any one of lines 902, thereby providing significant flexibility in which signals can get coupled to which touch node electrodes via switching circuit 906. In some examples, PMBs 918 can include fewer or more switches 922, 924, 926 than the number of lines 902 in switching circuit 906, depending on the touch screen scan configurations to be implemented by the touch screen (e.g., as described with reference to FIGS. 6A-6D). For example, a given PMB 918 (and thus a given touch node electrode) may not need to be coupled to a particular line 902, because the touch screen scan configurations implemented on the touch screen may specify that the PMB's corresponding touch node electrode need not be so coupled. In such a circumstance, that given PMB 918 need not include a switch for coupling that PMB to that particular line 902. Other examples in which the number of switches in the PMBs 918 is different from the number of lines 902 in switching circuit 906 are similarly contemplated. Control of switches 922, 924 and 926 can be provided by PMB logic 920a-920N (referred to collectively as 920) that can be included in each PMB 918. The details of this control will now be described.

In addition to being coupled to switching circuit 906 at lines 902, sense circuitry 908 (e.g., a sensing application specific integrated circuit (ASIC)) can be coupled to bank ID line 910 and interface 904 in the switching circuit. Bank ID line 910 can be coupled to PMB logic 920, and can be used, by sense circuitry 908, to identify particular PMBs 918/bank IDs of interest for use in various touch screen scan operations, as will be described in this disclosure. Interface 904 can be an interface (e.g., a serial peripheral interface (SPI)) that can allow for communication between sense circuitry 908 and switching circuit 906. Interface 904 can be coupled to memories 912, 914 and 916. Memories 912, 914 and 916 can store information relating to various touch screen scan configurations (e.g., touch screen scan configurations as discussed with respect to FIGS. 6A-6D) that are to be implemented on the touch screen to which the switching circuit is coupled. Interface 904 can facilitate exchange of this touch screen scan information from sense circuitry 908 to memories 912, 914 and 916, so that the sense circuitry can control the touch screen scan information stored on the memories. In some examples, sense circuitry 908 can update or change the touch screen scan information stored on memories 912, 914 and 916, which can give the sense circuitry substantial flexibility in what touch screen scan configurations are to be implemented on the touch screen. For example, during a power-up of the touch screen (or at any time during touch screen operation), sense circuitry 908 can populate memories 912, 914 and 916 with touch screen scan information based on the touch screen scans to be implemented on the touch screen. The touch screen scan information stored on memories 912, 914 and 916 can be used by PMB logic 920 on PMBs 918 to control the states of switches 922, 924 and 926 in the PMBs. Thus, the touch screen scan information stored on memories 912, 914 and 916 can control the lines 902 to which touch node electrodes on the touch screen will be coupled via PMBs 918 during various touch screen scans.

In some examples, memories 912, 914 and 916 can be combined into a single memory or a different number of memories than as described here. However, for the purposes of the disclosure, switching circuit 906 can include three memories: 912, 914 and 916, as illustrated. Each of memories 912, 914 and 916 can be coupled to PMB logic 920 in PMBs 918. Memory 916 can be referred to as a "bank ID memory." Bank ID memory 916 can include identification information (e.g., a "bank ID") for each PMB 918 in switching circuit 906; this identification information can provide an identifier—not necessarily a unique identifier—for each PMB in the switching circuit. In some examples, the bank IDs assigned to each PMB 918 in bank ID memory 916 can correspond to the supernode configuration utilized during one or more touch screen scan configurations on the touch screen (e.g., the touch screen scan configurations as described with reference to FIGS. 6A-6D). Specifically, every touch node electrode in a supernode, and thus those touch node electrodes' corresponding PMBs 918, can be assigned the same bank ID. For example, PMB 918a can be assigned a bank ID of 1, PMB 918b can also be assigned a bank ID of 1, and PMB 918N can be assigned a bank ID of 16. The above numbers are exemplary only, and do not limit the scope of the disclosure relating to bank ID memory 916 storing identification information for each PMB 918 in switching circuit 906. In this way, a bank ID can refer to a unique supernode on the touch screen, and can provide a simple way to identify all touch node electrodes included in a supernode on the touch screen. For example, referring back to FIG. 7A, all of the touch node electrodes 702 in supernode 703, and thus the PMBs coupled to those touch node electrodes, can be assigned a bank ID of 1. In some examples, bank IDs can be numbered consecutively from top to bottom and from left to right on touch screen 700. In such examples, supernode 703 can be assigned a bank ID of 1, as described above, the supernode below supernode 703 can be assigned a bank ID of 2, the supernode below that can be assigned a bank ID of 3, and the final supernode in that column of supernodes can be assigned a bank ID of 4. The top supernode in column 714 of supernodes can be assigned a bank ID of 5, and the assignments of bank IDs to supernodes can continue as described above. The bottom-right supernode on touch screen 700 can be assigned a bank ID of 16. In turn, the PMBs 918 in switching circuit 906 to which touch node electrodes in the above supernodes are coupled can be assigned the same bank ID as is assigned to their corresponding supernodes. Additional information about how bank IDs can be utilized by the touch screen will be provided later.

Memory 914 can be referred to as a "channel switch configuration memory." Channel switch configuration memory 914 can include switch control information for switches 922, 924 and 926 in PMBs 918 for one or more scan types. For example, as discussed with reference to FIGS. 6A-6D, the touch screen of the disclosure can implement five scan types: a pen detection scan type, a pen row scan type, a pen column scan type, a mutual capacitance scan type and a self-capacitance scan type. Other scan types are also possible, and the scan types provided are provided by way of example only. Each of these scan types can require that different touch node electrodes on the touch screen be coupled to different signals/sense channels in sense circuitry 908. For example, as illustrated in FIGS. 6A-6D, in the mutual capacitance scan type, in a collection of 2×2 touch node electrodes, one touch node electrode may be driven and sensed (and thus can be coupled to a sense channel in sense circuitry), one touch node electrode made be driven but not sensed (and thus can be coupled to driving circuitry), and the remaining two touch node electrodes may be biased at a reference voltage (and thus can be coupled to bias circuitry). Thus, channel switch configuration memory 914 can include switch control information corresponding to the mutual capacitance scan type for all of the PMBs 918 included in switch circuit 906, such that PMB logic 920 on the PMBs can, based on the switch control information in the channel switch configuration memory, control switches 922, 924 and 926 to ensure that corresponding touch node electrodes are coupled to the appropriate signals/sense channels for implementing the mutual capacitance scan type. Channel switch configuration memory 914 can similarly include other switch control information for other scan types that are to be implemented on the touch screen of the disclosure, such as a pen detection scan type, a pen row scan type, a pen column scan type and a self-capacitance scan type. Thus, channel switch configuration memory 914 can define how touch node electrodes are mapped to sense channel(s) in sensing circuitry 908.

Some scan types may include more than one scan step. For example, the self-capacitance scan type can include four self-capacitance scan steps, as illustrated in FIGS. 6A-6D. Each of these scan steps can require different PMB 918 switch configurations, because in each of these scan steps, touch node electrodes can be required to be coupled to different signals/sense channels in sense circuitry 908. Memory 912 can be referred to as "scan step memory." Scan step memory 912 can, similar to channel switch configuration memory 914, include switch control information corresponding to the various scan steps to be implemented on the touch screen for all of the PMBs 918 included in switch circuit 906, such that PMB logic 920 on the PMBs can, based on the switch control information in the scan step memory, control switches 922, 924 and 926 to ensure that corresponding touch node electrodes are coupled to the appropriate signals/sense channels for implementing the various scan steps. In particular, scan step memory 912 can indicate whether a given PMB 918 (and thus its corresponding touch node electrode) should be coupled to a collection of global signals (e.g., Vdrive, Vcom or Vbias) or a sense channel for a given scan step. If a PMB 918 is to be coupled to a sense channel, channel switch configuration memory 914 can specify which sense channel, as described above. For example, focusing on scan step 1 of the self-capacitance scan type illustrated in FIG. 6C, scan step memory 912 can include switch control information indicating that: the PMB 918 corresponding to the upper-left touch node electrode in configuration 658 should be coupled to a sense channel in sense circuitry 908 (and channel switch configuration memory 914 can indicate to which sense channel the touch node electrode should be coupled), the PMB corresponding to the lower-right touch node electrode in configuration 658 should be coupled to bias circuitry in the sense circuitry, and the PMBs corresponding to the upper-right and lower-left touch node electrodes in configuration 658 should be coupled to driving circuitry in sense circuitry 908. Scan step memory 912 can also include switch control information for the remaining three scan steps of the self-capacitance scan type, and other scan steps that may be implemented by the touch screen of the disclosure (e.g., scan steps of the pen detection scan type).

Thus, bank ID memory 916, channel switch configuration memory 914 and scan step memory 912, together, can include all of the switch control information needed for PMBs 918 to properly implement all of the various touch screen scan configurations of the touch screen. During touch screen operation, sense circuitry 908 (e.g., sensing ASIC) can simply prompt switching circuit 906 to implement a particular scan type and/or scan step, and bank ID memory 916, channel switch configuration memory 914 and scan step memory 912 can operate in conjunction with PMB logic 920 in PMBs 918 to effectuate the prompted scan type and/or scan step.

Display subsystem 948 (e.g., systems for controlling display functions of the touch screen) can be coupled to switching circuit 906 at BSYNC line 911, which can be coupled to PMB logic 920 in PMBs 918. Display subsystem 948 can assert BSYNC=HIGH and BSYNC=LOW to indicate whether the touch screen is in a touch mode or a display mode, which PMB logic 920 can utilize in making various determinations about the states of switches 922, 924 and 926, as will be described later in more detail.

Figure 9C:
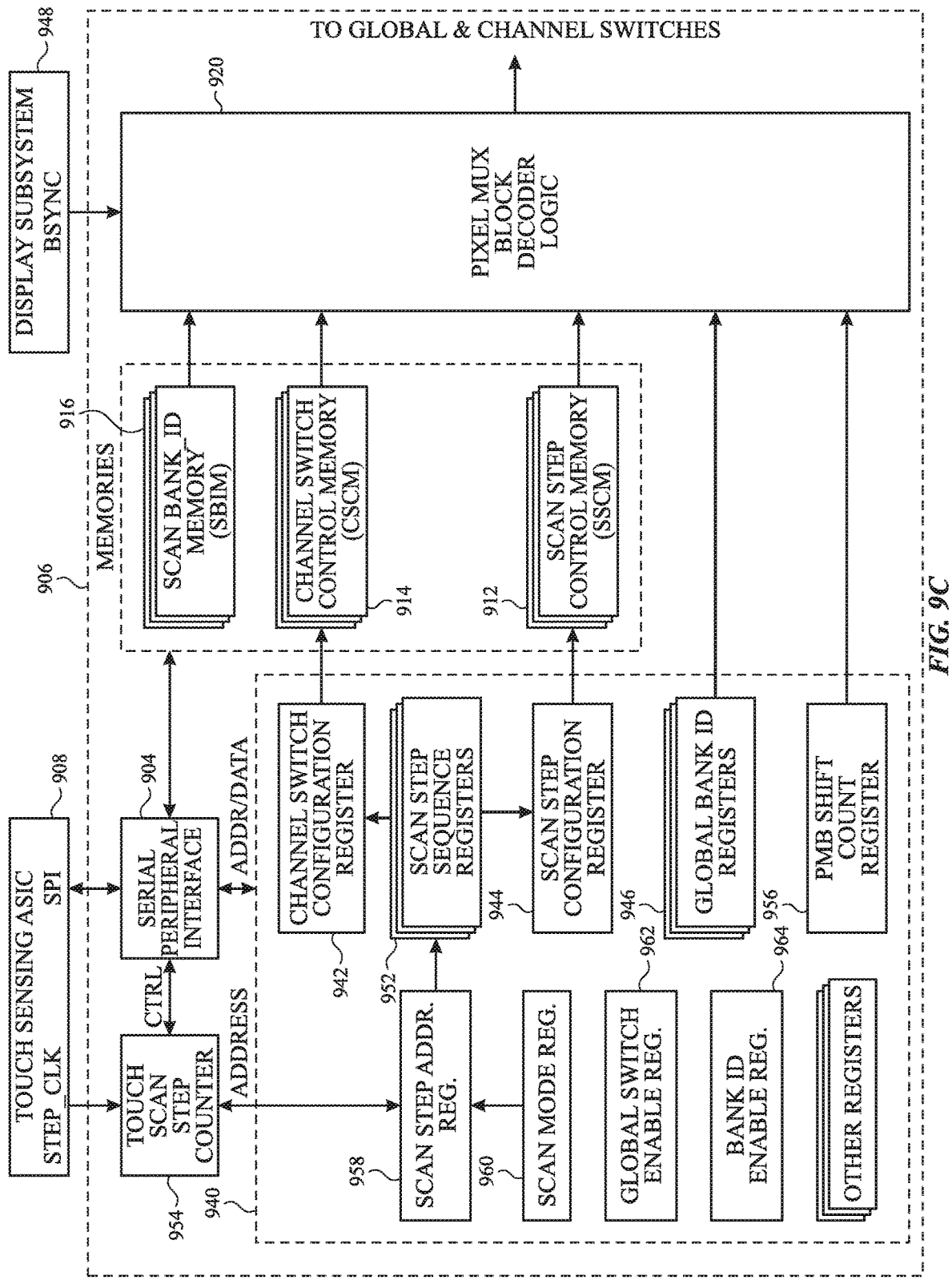
FIG. 9C illustrates an exemplary logical block diagram for a switching circuit including PMB logic distributed across the switching circuit according to examples of the disclosure.

FIG. 9C illustrates an exemplary logical block diagram for a switching circuit 906 including PMB logic 920 (e.g., PMB logic 920a, 920b, 920N) distributed across the switching circuit according to examples of the disclosure. Switching circuit 906 may contain a variety of registers 940. Registers 940 can include a channel switch configuration register 942 to store a pointer into channel switch configuration memory 914 (described above), and a scan step configuration register 944 to store a pointer into scan step memory 912 (described above). A bank of registers 946 can be dedicated to store global bank IDs to identify PMBs 918 determined for pen row/column scanning after a pen detection scan, as previously described. Display subsystem 948 can furnish a BSYNC signal to switching circuit 906, which can be used to determine how to configure the PMBs 918 during touch and display modes according to logic in PMB logic decoder 920, as will be illustrated in FIG. 9D. In some examples, channel switch configuration register 942 and scan step configuration register 944 can be configured via settings stored in a bank of scan sequence registers 952 (e.g., one scan sequence register for each scan step). For example, at the beginning of a touch screen scan, scan step counter 954 can be reset, and touch sensing ASIC 908 can furnish a STEP_CLK to scan step counter 954 to advance the scan step counter, which can, in turn, cause retrieval of channel switch and scan step configurations from the scan sequence registers 952 in preparation for the next scan step. For example, advancing scan step counter 954 can provide an index/address to scan step address register 958, which can store a pointer into scan step sequence registers 952 corresponding to the current scan being performed. Each successive scan step count from scan step counter 954 can cause the pointer to cycle to the next appropriate scan step sequence register 952 corresponding to the current scan step being performed. Channel switch configuration register 942 and scan step configuration register 944 can, then, be populated with the appropriate switch configuration information from scan step sequence registers 952 for the current scan step. Scan mode register 960 can store mode information (e.g., as described with reference to FIG. 11C) to designate which of a self-capacitance, mutual capacitance, pen detection, pen row and pen column scans should be performed. Global switch enable register 962 can designate whether or not the switches in switching circuit 906 should be configured based on the switch configuration information in channel switch configuration register 942 and/or scan step configuration register 944, and bank ID enable register can designate whether or not bank ID-based scanning for pen row and pen column scans should be performed. In an example switching circuit 906 configuration that uses shift registers to transfer switch configuration information from one PMB 918 to another, a PMB shift count register 956 can store the number of PMBs 918 by which to shift the above-described PMB configuration to other PMBs in switching circuit 906 (e.g., as described with reference to FIG. 12).

An exemplary logic table for PMB logic decoder 920 illustrating its exemplary operation is shown below. In the table, PMB SENSE, PMB VDRIVE, PMB VB and PMB VC columns can correspond to output signals from PMB logic decoder 920, while the remaining columns can correspond to input signals to the PMB logic decoder. PMB SENSE being high (H) can correspond to a command to configure a PMB's switches based on switch configuration provided from the channel switch configuration memory 914. Similarly, PMB VDRIVE, PMB VB and PMB VC being high (H) can correspond to a command to close a PMB's Vdrive, Vbias and Vcom switches, respectively, to implement the various scans described in this disclosure. In the table, below, a low (L) BSYNC value can indicate a touch screen display mode, which can cause a PMB VC switch (e.g., one of switches 922, 924, 926 in FIG. 9A) to be engaged to discharge corresponding touch node electrodes to a display voltage, VCOM, from the voltage levels maintained during the touch mode. A high (H) BSYNC value can, correspondingly, indicate a touch screen touch mode. The global channel switch enable bit (GLB_CH_SW_EN) can cause the PMB switches coupled to sense channels to be enabled according to the programmed channel switch configuration in channel switch configuration memory 914 and/or channel switch configuration register 942. This feature can primarily be used in the touch screen pen detect mode. BANK_ID_EN can be asserted HIGH prior to sending the global BANK IDs to the switching chip, which can identify the BANK IDs in which pen row/column scans are to be performed. Setting BANK_ID_EN high can also cause matching PMBs (e.g., PMBs in which the programmed BANK_ID matches the provided global BANK ID) to enable their switches as programmed through the channel switch configuration memory, and can be used during pen row and/or column scans.

Figure 10A:
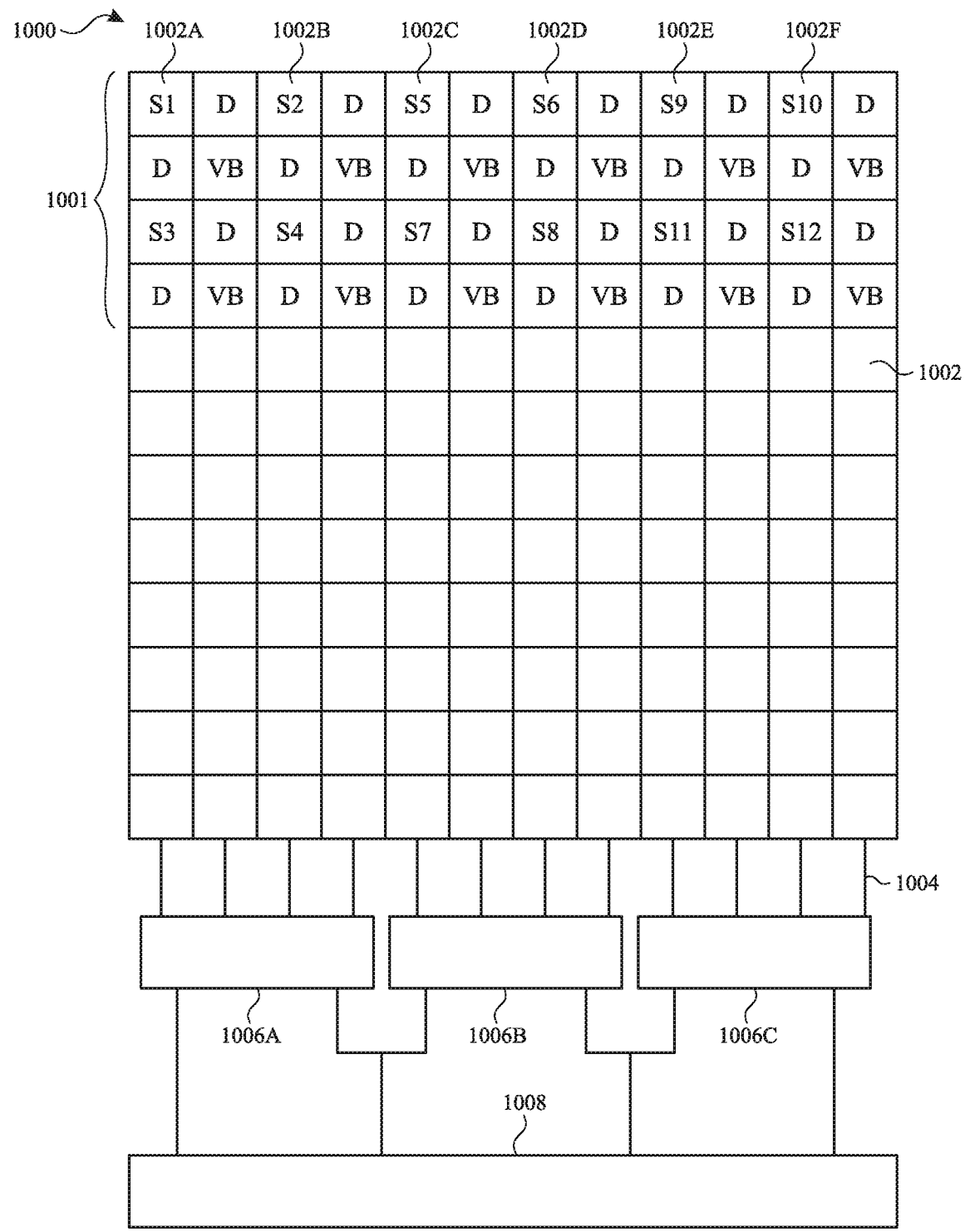
FIG. 10A illustrates an exemplary first scan step of a self-capacitance scan type on a touch screen according to examples of the disclosure.

10D illustrate a touch screen 1000 with 144 touch node electrodes 1002 (e.g., touch node electrodes 1002a-1002f), other touch screen configurations are also within the scope of the disclosure, including touch screens with 320 touch node electrodes (e.g., a five by four supernode touch screen having 20 columns of touch node electrodes, and 16 rows of touch node electrodes, and coupled to four switching circuits 1006, as described with reference to FIG. 8B). The discussion below can apply analogously to such other touch screens. As described with reference to FIGS. 6A-6D, in some examples, touch screen 1000 can implement a self-capacitance scan type having four scan steps. In the first scan step, focusing on a 2×2 collection of touch node electrodes 1002, a top-left touch node electrode can be driven and sensed, a bottom-right touch node electrode can be biased at a reference voltage, and top-right and bottom-left touch node electrodes can be driven but not sensed. Further, in some examples, touch screen 1000 can be scanned in portions rather than all at once, as illustrated in FIG. 6D. Thus, as illustrated in FIG. 10A, portion 1001 of touch screen 1000 can be scanned in the first scan step of the self-capacitance scan type, as described. Touch node electrodes 1002 labeled with sense channel numbers (e.g., S1, S2, S3, S4, etc.) can indicate touch node electrodes that are being driven and sensed, and the number can indicate by which sense channel in sense circuitry 1008 the touch node electrode is being driven and sensed. For example, touch node electrode 1002a, which is labeled with "S1", can be driven and sensed by a different sense channel in sense circuitry 1008 than touch node electrode 1002b, which is labeled with "S2".

Figure 10B:
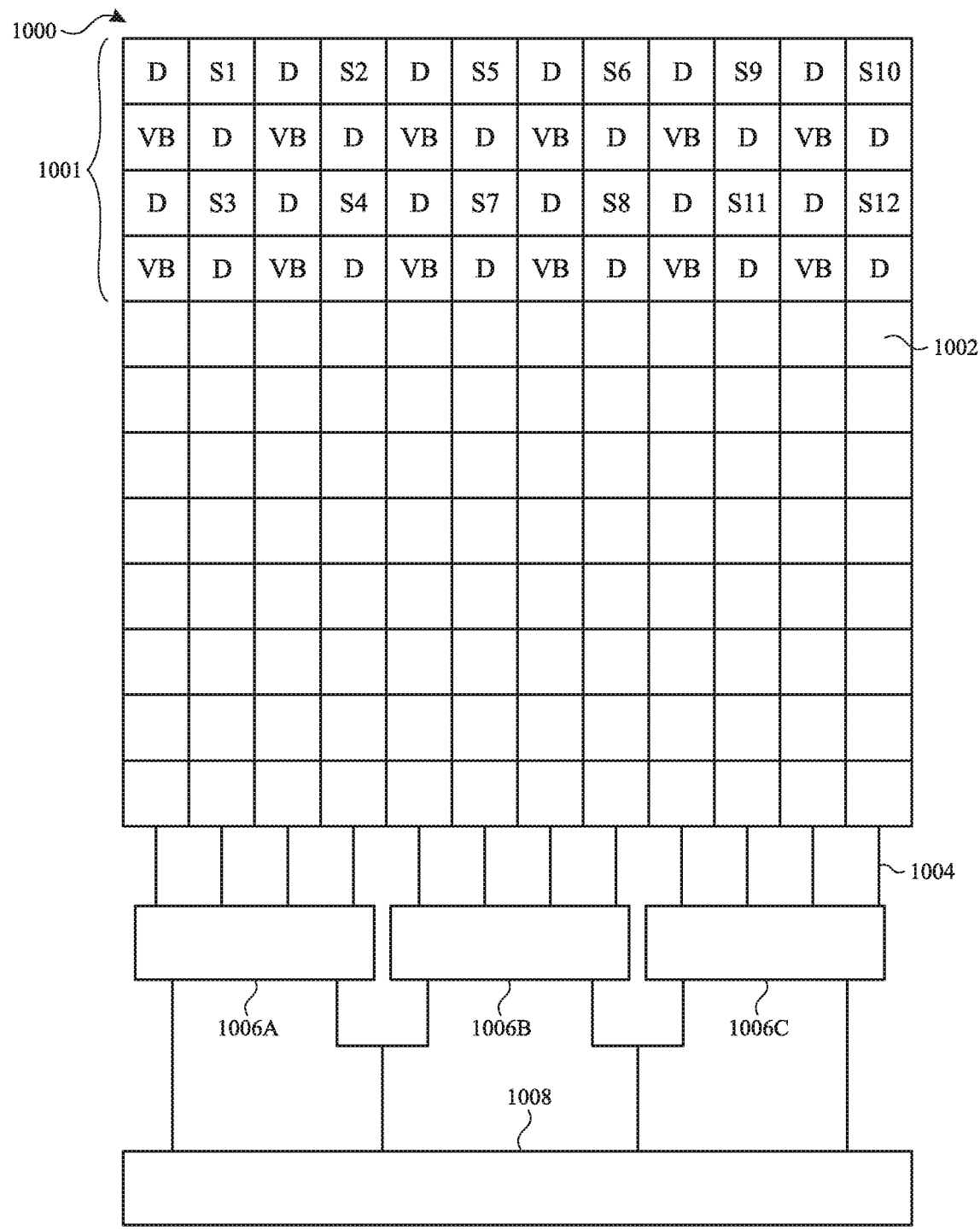
FIG. 10B illustrates an exemplary second scan step of a self-capacitance scan type on a touch screen according to examples of the disclosure.

FIG. 10B illustrates an exemplary second scan step of a self-capacitance scan type on touch screen 1000 according to examples of the disclosure. As described with reference to FIGS. 6A-6D, the second scan step of the self-capacitance scan type can result from a clockwise rotation of 2×2 groups of touch node electrodes 1002 in the first scan step of the self-capacitance scan type, as illustrated in FIG. 10B.

Because switching circuits 1006 (e.g., switching circuits 1006a-1006c) can have memory (e.g., memories 912, 914 and 916 in FIG. 9A) that already includes the specific switch control information for implementing the first scan step of FIG. 10A and the second scan step of FIG. 10B on touch screen 1000, sense circuitry 1008 need only prompt the

| GLB_BANK_ID_GLB[5:0] | GLB_CH_SW_EN | BANK_ID_EN | Scan Step Config. | BSYNC | PMB SENSE Switch (as programmed in channel switch configuration memory) | PMB VDRIVE Switch Enable | PMB VB Switch | PMB VC Switch |
|---|---|---|---|---|---|---|---|---|
| X | H | X | X | H | H | L | L | L |
| BANK_ID | L | H | X | H | H | L | L | L |
| ~BANK_ID | L | H | X | H | L | L | H | L |
| X | L | L | 2'B00 | H | L | L | H | L |
| X | L | L | 2'B01 | H | L | H | L | L |
| X | L | L | 2'B10 | H | H | L | L | L |
| X | L | L | 2'B11 | H | H | L | L | L |
| X | L | L | 2'B10 | H | L | L | H | L |
| X | L | L | 2'B11 | H | L | L | H | L |
| X | L | L | X | L | L | L | L | H |

FIG. 10A illustrates an exemplary first scan step of a self-capacitance scan type on touch screen 1000 according to examples of the disclosure. Touch screen 1000 can correspond to any of the touch screens described in this disclosure. It is understood that while FIGS. 10A, 10B and switching circuits to implement the first and second scan steps—the switching circuits can then autonomously configure their respective PMBs (e.g., PMBs 918 in FIG. 9A) to couple their respective touch node electrodes 1002 to the appropriate signals/sense channels in the sense circuitry.

Figure 10C:
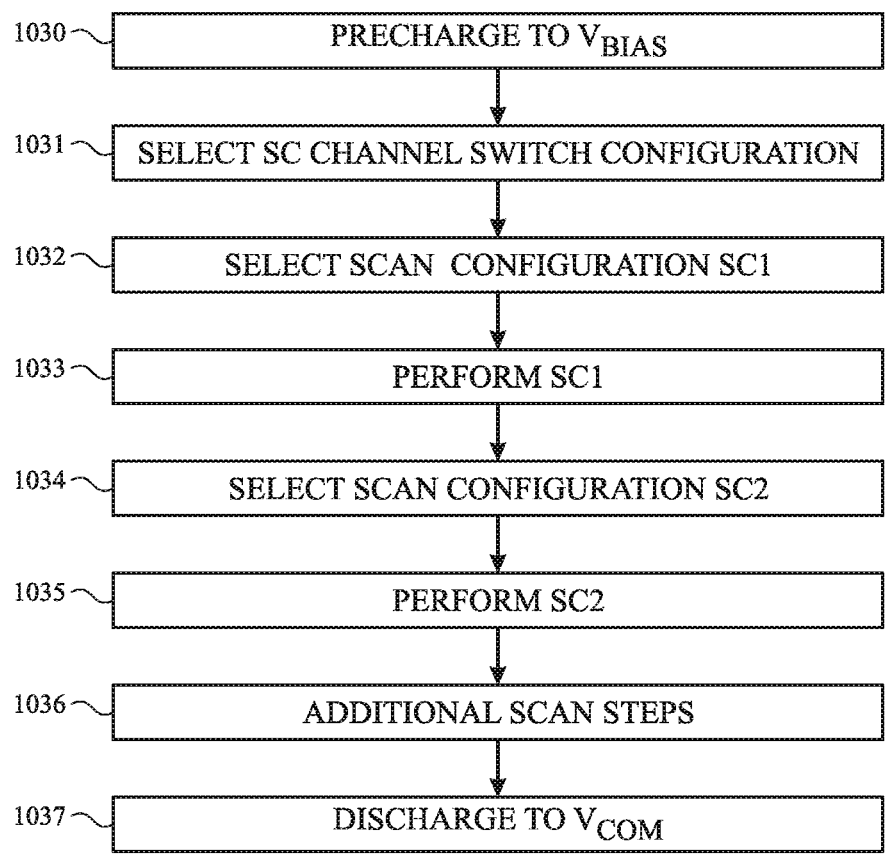
FIG. 10C illustrates exemplary commands transmitted by sense circuitry to switching circuits for implementing the first and second scan steps of FIGS. 10A and 10B according to examples of the disclosure.

FIG. 10C illustrates exemplary commands transmitted by sense circuitry 1008 to switching circuits 1006 for implementing the first and second scan steps of FIGS. 10A and 10B according to examples of the disclosure. In step 1030, the display subsystem can assert BSYNC=HIGH to indicate touch mode operation, and to therefore pre-charge touch node electrodes from a display voltage level VCOM to a bias voltage for the upcoming touch screen scans (e.g., Vbias) by enabling switches coupled to Vbias in the PMBs. Next, sense circuitry 1008 can transmit to switching circuits 1006a, 1006b and 1006c command 1031, which can include a pointer into channel switch configuration memory for selecting the appropriate channel switch configuration for a self-capacitance scan of touch screen 1000. Specifically, command 1031 can indicate that the upcoming touch screen scan will have a self-capacitance scan type, as previously described. Following command 1031, sense circuitry 1008 can transmit to switching circuits 1006a, 1006b and 1006c command 1032 indicating that the upcoming touch screen 1000 scan will be the first scan step of the self-capacitance scan type (e.g., as described with reference to FIG. 10A). For example, command 1032 can include a pointer into scan step configuration memory for selecting the appropriate scan step configuration for the first scan step of the self-capacitance scan type. In response to command 1032, switching circuits 1006 can configure their respective PMBs as described previously such that the touch node electrodes 1002 coupled to the switching circuits can be coupled to appropriate signals/sense channels in sense circuitry 1008 to implement the first scan step of the self-capacitance scan type. For example, referring back to FIG. 10A, in response to command 1032, switching circuit 1006a can configure its respective PMBs such that touch node electrode 1002a is coupled to sense channel 1 in sense circuitry 1008 and touch node electrode 1002b is coupled to sense channel 2 in the sense circuitry, switching circuit 1006b can configure its respective PMBs such that touch node electrode 1002c is coupled to sense channel 5 in the sense circuitry and touch node electrode 1002d is coupled to sense channel 6 in the sense circuitry, and switching circuit 1006c can configure its respective PMBs such that touch node electrode 1002e is coupled to sense channel 9 in the sense circuitry and touch node electrode 1002f is coupled to sense channel 10 in the sense circuitry. Switching circuits 1006a, 1006b and 1006c can similarly configure their remaining PMBs such that the remaining touch node electrodes 1002 are coupled to appropriate signals/sense channels in sense circuitry 1008, as illustrated in FIG. 10A. Sense circuitry 1008 can then perform the first scan step of the self-capacitance scan type in region 1001 of touch screen 1000 at step 1033.

After sense circuitry 1008 has completed the first scan step of the self-capacitance scan type, it can transmit to switching circuits 1006a, 1006b and 1006c via respective interfaces (e.g., interface 904 in FIG. 9A) command 1034 indicating that the upcoming touch screen 1000 scan will be the second scan step of the self-capacitance scan type (e.g., as described with reference to FIG. 10B), similar to as described with reference to command 1032. In response to command 1034, switching circuits 1006 can configure their respective PMBs as described previously such that the touch node electrodes 1002 coupled to the switching circuits can be coupled to appropriate signals/sense channels in sense circuitry 1008 to implement the second scan step of the self-capacitance scan type, as illustrated in FIG. 10B. Sense circuitry 1008 can then perform the second scan step of the self-capacitance scan type in region 1001 of touch screen 1000 at step 1035. Additional scan steps (e.g., the third and fourth scan steps) of the self-capacitance scan type can similarly be implemented, at step 1036, with commands analogous to those discussed above. At 1037, the display subsystem can assert BSYNC=LOW indicating the touch period is completed, and thus causing touch node electrodes to be discharged from the bias voltage used during the self-capacitance scans above to a common voltage (e.g., Vcom) used during display operation by enabling switches coupled to Vcom in the PMBs. The touch integration time (e.g., the touch scan time) can be adjusted so as to ensure that the touch scan(s) complete before the BSYNC=LOW assertion. In this way, sense circuitry 1008 can implement a variety of touch screen scans—including relatively complex scans—by issuing simple commands to switching circuits 1006, and communication overhead between the sense circuitry and the switching circuits can be relatively low.

Figure 10D:
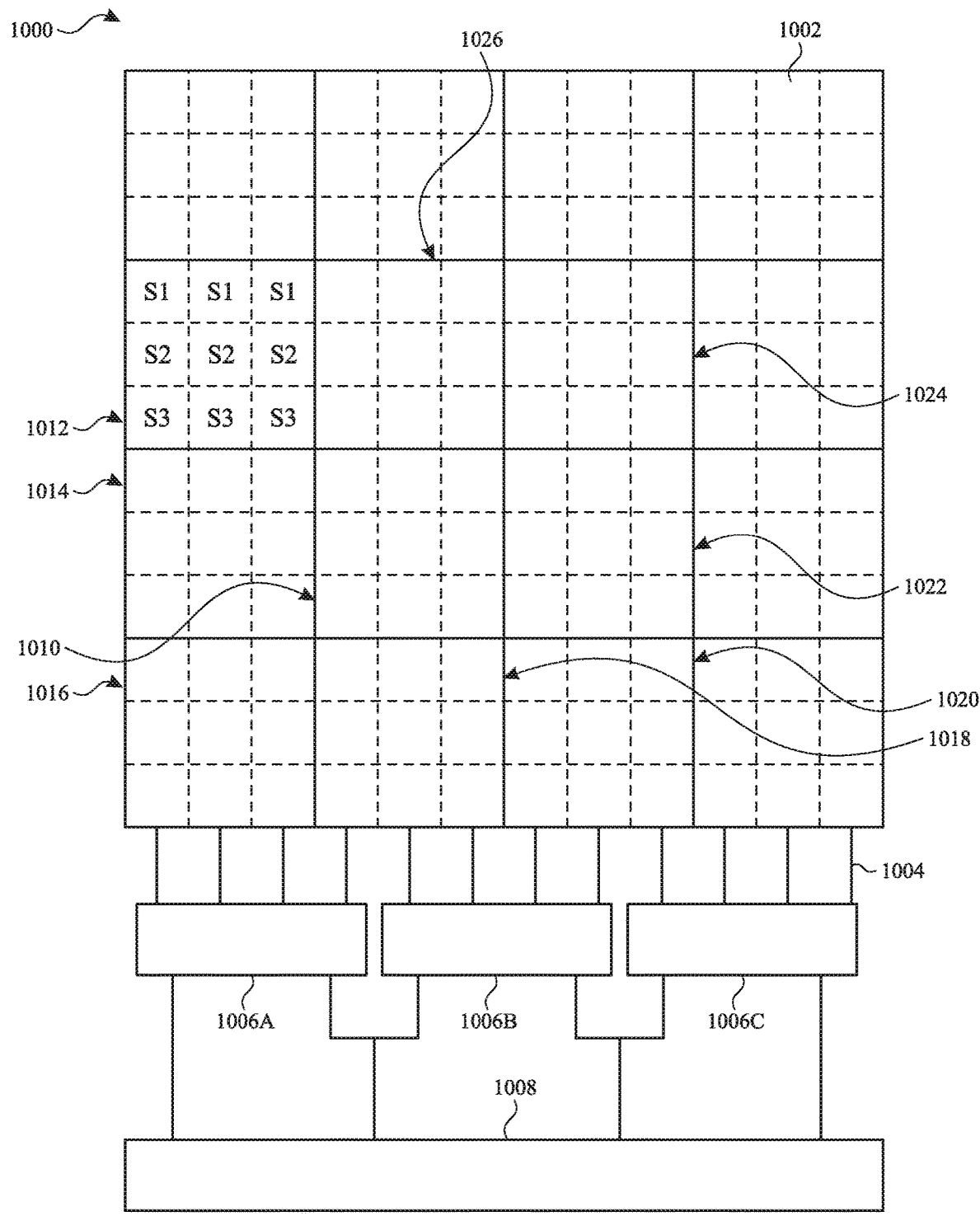
FIG. 10D illustrates an exemplary pen row scan type performed in a supernode of a touch screen according to examples of the disclosure.

As another example, FIG. 10D illustrates an exemplary pen row scan type performed in supernode 1012 of touch screen 1000 according to examples of the disclosure. As described with references to FIGS. 6A-6D, in some examples, touch screen 1000 can implement a pen row scan type in response to detecting the presence of a pen or stylus on the touch screen during a pen detection scan. For example, as described previously, if a pen or stylus is detected in supernode 1010 on touch screen 1000, pen row and pen column scans can be initiated in the supernode in which the pen or stylus was detected (e.g., supernode 1010), as well as the supernodes surrounding the supernode in which the pen or stylus was detected (e.g., supernodes 1012, 1014, 1016, 1018, 1020, 1022, 1024 and 1026). The process by which such pen row and pen column scans can be performed in one supernode can be substantially the same as the process by which such pen row and pen column scans can be performed in another supernode—thus, the discussion that follows will focus on a pen row scan performed in supernode 1012, understanding that the process can similarly apply to performing pen row scans in other supernodes, as well as pen column scans in supernode 1012 or other supernodes.

As illustrated in FIG. 10D, a pen row scan can be performed in supernode 1012. Touch node electrodes 1002 labeled with sense channel numbers (e.g., S1, S2, S3) can indicate touch node electrodes that are being sensed, and the number can indicate by which sense channel in sense circuitry 1008 the touch node electrode is being sensed. For example, the top row of touch node electrodes 1002 in supernode 1012 can be coupled to sense channel 1 in sense circuitry 1008, the middle row of touch node electrodes in supernode 1012 can be coupled to sense channel 2 in the sense circuitry, and the bottom row of touch node electrodes in supernode 1012 can be coupled to sense channel 3 in the sense circuitry. It is understood that the precise numbering of sense channels provided is exemplary only, and does not limit the scope of the disclosure. Switching circuits 1006 can configure their respective PMBs (e.g., PMBs 918 in FIG. 9A) to couple their respective touch node electrodes 1002 to the appropriate signals/sense channels in sense circuitry 1008 in order to implement the pen row scan illustrated, as well as other pen-related scans on the touch screen, as will be described below.

Figures 10E, 10F:
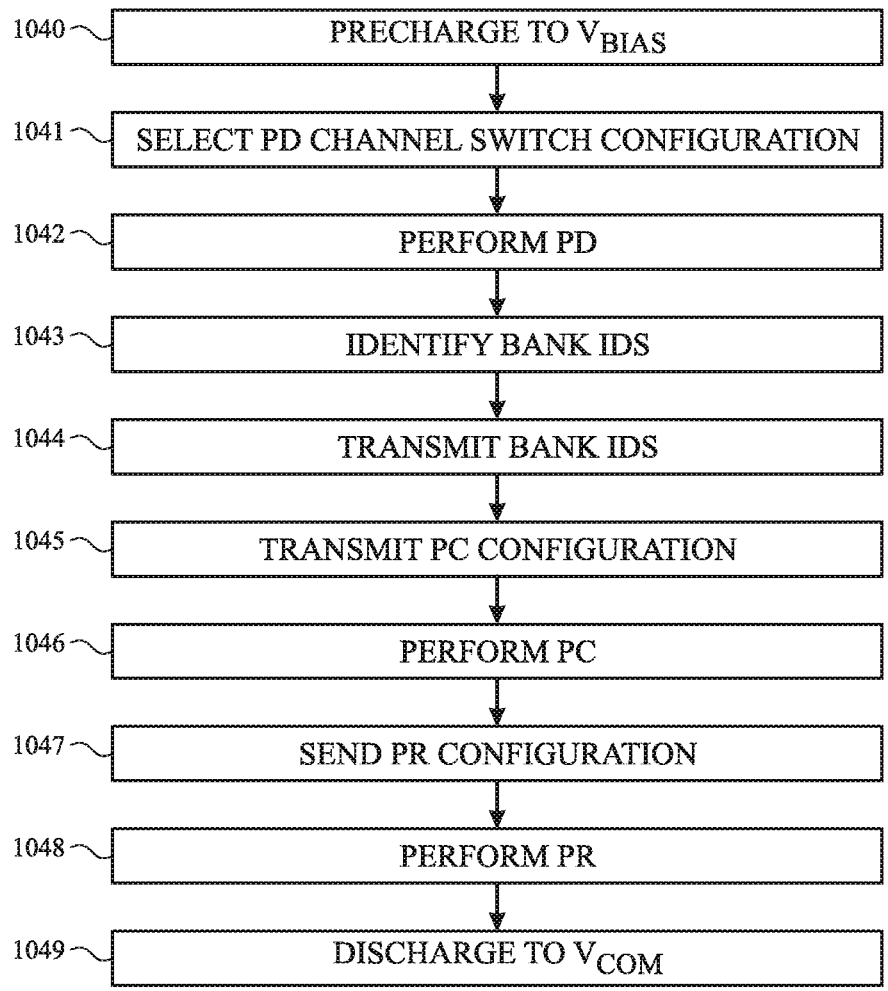
FIG. 10E illustrates exemplary commands transmitted by sense circuitry to switching circuits for implementing pen scans according to examples of the disclosure.
FIG. 10F illustrates exemplary switching circuit command combinations that can be utilized to implement the touch screen scans discussed with reference to FIGS. 6A-6D according to examples of the disclosure.

FIG. 10E illustrates exemplary commands transmitted by sense circuitry 1008 to switching circuits 1006 for implementing pen scans according to examples of the disclosure. In step 1040, the display subsystem can assert BSYNC=HIGH to indicate touch mode, and to therefore pre-charge touch node electrodes from a display voltage VCOM to a bias voltage for the upcoming touch screen scans (e.g., Vbias) by enabling switches coupled to Vbias in the PMBs. Next, sense circuitry 1008 can transmit to switching circuits 1006a, 1006b and 1006c command 1041, which can include a pointer into channel switch configuration memory for selecting the appropriate channel switch configuration for pen detection scans. Specifically, command 1041 can specify that the upcoming touch screen scan will be a pen detection scan, as previously described. Next, sense circuitry 1008 can perform the pen detection scan at step 1042. At 1043, sense circuitry 1008 can identify addresses of supernodes at and around the touch screen location at which pen activity was detected, and can map those supernodes to corresponding bank IDs, as previously described. At 1044, sense circuitry 1008 can set the BANK_ID mode bit (to enable BANK ID-based touch scan operation) and the relevant BANK_IDs in the switching circuits to enable the bank latches of the relevant PMBs (i.e., the PMBs in which pen row and pen column scans are to be performed). At 1045, sense circuitry 1008 can transmit to switching circuits 1006a, 1006b and 1006c command 1045, which can include a pointer into channel switch configuration memory for selecting the appropriate channel switch configuration for a pen column scan to be performed in supernodes having the bank IDs determined at 1043. In response, switching circuits 1006 can configure their respective PMBs as described previously such that the touch node electrodes 1002 coupled to the switching circuits can be coupled to appropriate signals/sense channels in sense circuitry 1008 to implement the pen column scan type in the supernodes having the relevant bank IDs, as described with reference to FIG. 6B. At 1046, sense circuitry 1008 can perform the pen column scans. After performing the pen column scans, sense circuitry 1008 can transmit to switching circuits 1006a, 1006b and 1006c command 1047, which can include a pointer into channel switch configuration memory for selecting the appropriate channel switch configuration for a pen row scan to be performed in supernodes having the bank IDs determined at 1043. In response, switching circuits 1006 can configure their respective PMBs as described previously such that the touch node electrodes 1002 coupled to the switching circuits can be coupled to appropriate signals/sense channels in sense circuitry 1008 to implement the pen row scan type in the supernodes having the relevant bank IDs, as described with reference to FIG. 6B. At 1048, sense circuitry 1008 can perform the pen row scans. After performing the pen row scans, the display subsystem can assert BSYNC=LOW indicating the touch period is completed, and thus causing touch node electrodes to be discharged from the bias voltage used during the pen detection/column/row scans above to a common voltage (e.g., Vcom) used during display operation by enabling switches coupled to Vcom in the PMBs. The pen integration time (e.g., the pen scan time) can be adjusted so as to ensure that the pen scan(s) complete before the BSYNC=LOW assertion.

The switching circuit control and configuration schemes discussed above can be used to implement any number of touch screen scans in addition to those illustrated in FIGS. 10A-10E. FIG. 10F illustrates exemplary switching circuit command combinations 1070 that can be utilized to implement the touch screen scans discussed with reference to FIGS. 6A-6D according to examples of the disclosure. Five scan types can be supported by the switching circuits of the disclosure, though other scan types can similarly be supported. A first scan type can be a mutual capacitance scan type 1072. The mutual capacitance scan type 1072 can be implemented with a single command indicating the mutual capacitance scan type is to be performed. No scan step or bank ID commands need be transmitted by the sense circuitry to the switching circuits for the mutual capacitance scan type 1072.

A second scan type can be a self-capacitance scan type 1074. The self-capacitance scan type 1074 can be associated with a number of scan steps—in some examples, 16 scan steps (e.g., four scan steps per bank, with, in some examples, four banks). Thus, the self-capacitance scan type 1074 can be implemented with a command indicating the self-capacitance scan type is to be performed, followed by one or more commands indicating respective scan steps of the self-capacitance scan type to be performed. No bank ID command need be transmitted by the sense circuitry to the switching circuits for the self-capacitance scan type 1074. In some examples, a bank ID command could be used to specify that self-capacitance scans should only be performed in the bank IDs specified in the bank ID command, such as those bank IDs in which (or in proximity to which) touch is detected on the touch sensor panel/touch screen.

A third scan type can be a pen detection scan type 1076. The pen detection scan type 1076 can be associated with a number of scan steps—in some examples, two scan steps. Thus, the pen detection scan type 1076 can be implemented with a command indicating the pen detection scan type is to be performed, followed by one or more commands indicating respective scan steps of the pen detection scan type to be performed. No bank ID command need be transmitted by the sense circuitry to the switching circuits for the pen detection scan type 1076.

A fourth scan type can be a pen row scan type 1078. The pen row scan type can be performed in any of a number of bank IDs. Thus, the pen row scan type 1078 can be implemented with a command indicating the pen row scan type is to be performed, followed by one or more commands indicating respective bank IDs in which the pen row scan is to be performed. No scan step command need be transmitted by the sense circuitry to the switching circuits for the pen row scan type 1078.

A fifth scan type can be a pen column scan type 1080. The pen column scan type can be performed in any of a number of bank IDs. Thus, the pen column scan type 1080 can be implemented with a command indicating the pen column scan type is to be performed, followed by one or more commands indicating respective bank IDs in which the pen column scan is to be performed. No scan step command need be transmitted by the sense circuitry to the switching circuits for the pen column scan type 1080.

Figure 11A:
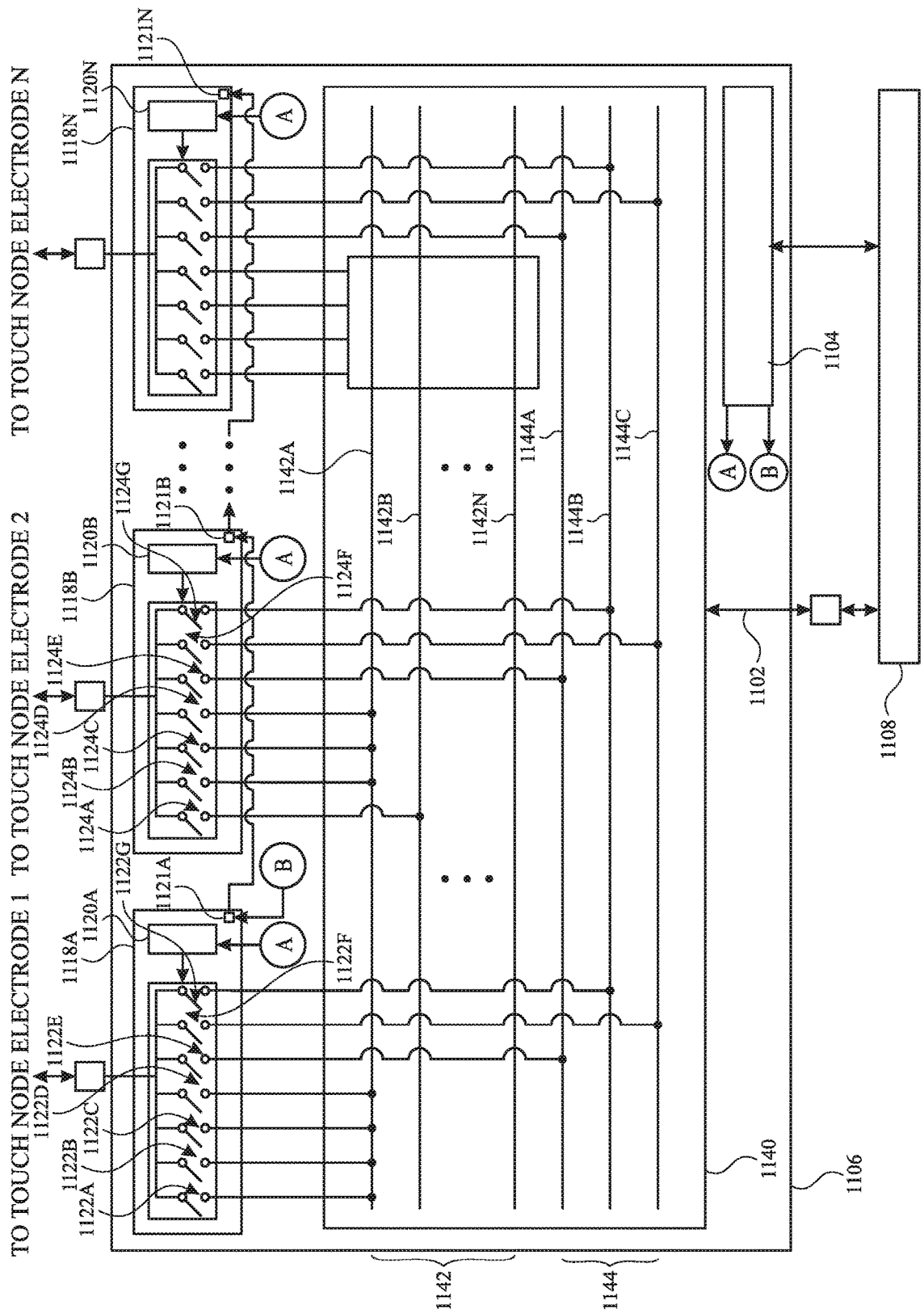
FIG. 11A illustrates an exemplary switching circuit configuration in which PMBs include switches that correspond to scan types and signals according to examples of the disclosure.

In some examples, rather than the PMBs in the switching circuits of the disclosure including switches corresponding to sense channels to be utilized during the various touch screen scans of the touch screen (e.g., as described with reference to FIG. 9A), the PMBs can include switches that correspond instead to scan types to be implemented during the various touch screen scans of the touch screen. FIG. 11A illustrates an exemplary switching circuit 1106 configuration in which PMBs 1118a-1118N (referred to collectively as 1118) include switches that correspond to scan types according to examples of the disclosure. Switching circuit 1106 can correspond to any of the switching circuits described in this disclosure, including switching circuit 506 in FIG. 5B, switching circuits 706 in FIGS. 7A-7C and/or switching circuits 806 in FIGS. 8A-8D.

Switching circuit 1106 can include pixel mux blocks ("PMBs") 1118. Each PMB can be coupled to a particular touch node electrode on the touch screen of the disclosure (not illustrated). For example, PMB 1118a can be coupled to touch node electrode 1, PMB 1118b can be coupled to touch node electrode 2, and PMB 1118N can be coupled to touch node electrode N. For the purposes of this disclosure, touch node electrodes can be numbered from top to bottom, then from left to right, on the touch screen, as illustrated in FIG. 9B, though it is understood that the particular numbering scheme used can be modified within the scope of this disclosure. Thus, moving from PMB 1118*a* to PMB 1118*b* (i.e., moving horizontally to the right across switching circuit 1106) can correspond to moving from touch node electrode 1 to touch node electrode 2 (i.e., moving vertically downwards across the touch screen). There can be as many PMBs 1118 in switching circuit 1106 as there are touch node electrodes to which the switching circuit is coupled. Further, each PMB 1118 can be assigned a bank ID in association with supernode-identification on the touch screen, similar to as described with reference to FIG. 9A. These bank IDs can be stored or hardcoded in each PMB 1118 itself (not illustrated).

Sense circuitry 1108 can be coupled to switching circuit 1106 at lines 1102. Each of lines 1102 can be coupled to a respective one of lines 1142*a*-1142N (referred to collectively as 1142) and 1144*a*-1144*c* (referred to collectively as 1144) in interconnect matrix 1140. Lines 1142 and 1144 can correspond to interconnect lines 820, 822, 830, 832, 840, 842, 844, 850, 852 and/or 854 in FIGS. 8A-8D, for example. Lines 1142 and 1144 can carry any number of signals to and/or from sense circuitry 1108. For example, lines 1142 can be coupled to particular sense channels in sense circuitry 1108. Three such lines are illustrated in FIG. 11A—line 1142*a*, which can be coupled to sense channel 1; line 1142*b*, which can be coupled to sense channel 2; and line 1142N, which can be coupled to sense channel N—though it is understood that a different number of lines may be utilized. Lines 1144 can be coupled to a common voltage source (e.g., a Vcom voltage source) in sense circuitry 1108, a Vbias voltage source (e.g., as described with reference to FIGS. 6A-6D) in the sense circuitry, and/or a Vdrive voltage source (e.g., as described with reference to FIGS. 6A-6D) in the sense circuitry. For example, line 1144*a* can be coupled to a Vdrive voltage source in the sense circuitry, line 1144*b* can be coupled to a Vbias voltage source in the sense circuitry, and line 1144*c* can be coupled to a Vcom voltage source in the sense circuitry. Together, lines 1142 and 1144 can form an interconnect matrix 1140 via which PMBs 1118 can get access to (i.e., be coupled to) sense channels or signals in sense circuitry 1108.

PMBs 1118 can include a number of switches (e.g., switches 1122*a*-1122*g*, referred to collectively as 1122, in PMB 1118*a*). One end of switches 1122 can be coupled to the touch node electrode to which the PMB 1118 is coupled. The other ends of switches 122 can be coupled to lines that can be coupled to respective ones of lines 1142 and 1144. As stated previously, some of switches 1122 can correspond to scan types to be implemented on the touch screen, and others of the switches can correspond to signals to be utilized during the various touch screen scans of the touch screen. For example, switches 1122*e*, 1122*f* and 1122*g* can correspond to signals on lines 1144 (e.g., Vcom, Vbias and Vdrive signals). Specifically, switch 1122*e* can be coupled to a line that is coupled to line 1144*a*, switch 1122*f* can be coupled to a line that is coupled to line 1144*c*, and switch 1122*g* can be coupled to a line that is coupled to line 1144*b*. Thus, if switch 1122*e* is closed, touch node electrode 1 can be coupled to line 1144*a*, and thus to a Vdrive signal. Similarly, if switch 1122*f* is closed, touch node electrode 1 can be coupled to line 1144*c*, and thus to a Vcom signal. Finally, if switch 1122*g* is closed, touch node electrode 1 can be coupled to line 1144*b*, and thus to a Vbias signal. The configuration of switches corresponding to switches 1122*e*, 1122*f* and 1122*g* in other PMBs (e.g., PMBs 1118*b* through 1118N) can be the same as that of switches 1122*e*, 1122*f* and 1122*g* in PMB 1118*a*. Thus, switches 1122*e*, 1122*f* and 1122*g* can be referred to as "global signal switches."

The remaining switches in PMB 1118*a* (e.g., switches 1122*a*, 1122*b*, 1122*c* and 1122*d*) can be scan type dependent switches, and can be referred to as "scan type switches." Specifically, the configuration of the lines to which switches 1122*a*, 1122*b*, 1122*c* and 1122*d* are coupled can depend on the touch screen scans that are to be implemented on the touch screen with which switching circuit 1106 is utilized, and the particular configuration that a respective touch node electrode that is coupled to PMB 1118*a* will have during those touch screen scans. For example, switch 1122*a* can be a pen row scan switch that can be closed when the touch node electrode to which PMB 1118*a* is coupled (e.g., touch node electrode 1) is to be utilized in a pen row scan. During a pen row scan, touch node electrode 1 can be coupled to sense channel 1 in sense circuitry 1108, as illustrated in FIG. 6B. Thus, the line in interconnect matrix 1140 to which switch 1122*a* is coupled can be line 1142*a*, which, as described previously, can be coupled to sense channel 1 in sense circuitry 1108. In other words, the pen row scan configuration of PMB 1118*a* (and thus touch node electrode 1) can be hardcoded in interconnect matrix 1140. In this way, to implement a pen row scan that includes touch node electrode 1, pen row scan switch 1122*a* in PMB 1118*a* need only be closed, and touch node electrode 1 can have the proper configuration for performing a pen row scan. Sense circuitry 1108 can then perform a pen row scan including touch node electrode 1.

In manners similar to above, switch 1122*b* can be a pen column scan switch that can be closed when the touch node electrode to which PMB 1118*a* is coupled (e.g., touch node electrode 1) is to be utilized in a pen column scan, switch 1122*c* can be a pen detect scan switch that can be closed when the touch node electrode to which PMB 1118*a* is coupled is to be utilized in a pen detection scan, and switch 1122*d* can be a drive/sense switch that can be closed when the touch node electrode to which PMB 1118*a* is coupled is to be utilized in a drive and/or sense scan (e.g., in a scan in which the touch node electrode is to be driven and sensed to detect the self-capacitance of the touch node electrode, or simply sensed to detect a mutual capacitance of the touch node electrode with respect to another electrode). As above, the lines in interconnect matrix 1140 to which switches 1122*b*, 1122*c* and 1122*d* are coupled can be hardcoded based on the various configurations that touch node electrode 1 is to have during the various scan types with which the switches correspond. For example, pen column scan switch 1122*b* can be coupled to line 1142*a* in interconnect matrix 1140, because during a pen column scan of the supernode in which touch node electrode 1 is included, touch node electrode 1 can be coupled to sense channel 1 in sense circuitry 1108, as illustrated in FIG. 6B. Pen detect scan switch 1122*c* can also be coupled to line 1142*a* in interconnect matrix 1140, because during a pen detection scan of the supernode in which touch node electrode 1 is included, touch node electrode 1 can be coupled to sense channel 1 in sense circuitry 1108, as illustrated in FIG. 6B. Finally, drive/sense switch 1122*d* can be coupled to line 1142*a* in interconnect matrix 1140, because during a self-capacitance or mutual capacitance scan of the touch screen, touch node electrode 1 can be coupled to sense channel 1 in sense circuitry 1108 (e.g., as illustrated in FIGS. 6B and 10A).

Thus, switches 1122 in PMB 1118*a*, and the lines 1142 or 1144 in interconnect matrix 1140 to which the switches are coupled, can facilitate the proper configuration of touch node electrode 1 in the scans that are to be implemented on the touch screen of the disclosure.

Switches 1124*a*-1124*g* (referred to collectively as 1124) in PMB 1118*b*, and the lines 1142 or 1144 in interconnect matrix 1140 to which the switches are coupled, can similarly be configured to facilitate the proper configuration of the touch node electrode to which the PMB is coupled (e.g., touch node electrode 2) in the scans that are to be implemented on the touch screen of the disclosure. In the example illustrated in FIG. 11A, switches 1124 can be configured in the same way as switches 1122, except that pen row switch 1124*a* can be coupled to line 1142*b* in interconnect matrix 1140, and thus can be coupled to sense channel 2 in sense circuitry 1108. In other words, touch node electrode 2 can be coupled to the same sense channels or signals as touch node electrode 1 during touch screen scans that are to be performed on touch node electrode 2, except for during a pen row scan in which touch node electrode 2 can be coupled to sense channel 2 instead of sense channel 1. The switches on remaining PMBs 1118 can analogously be configured to facilitate proper configuration of the touch node electrodes to which the PMBs are coupled during the various scans to be implemented on the touch screen of the disclosure.

Similar to as described above with reference to FIG. 9A, sense circuitry 1108 can transmit touch screen scan information to switching circuit 1106 via interface 1104. Interface 1104 can be any interface (e.g., a serial peripheral interface (SPI)) that can allow for communication between sense circuitry 1108 and switching circuit 1106. The touch screen scan information transmitted by sense circuitry 1108 to switching circuit 1106 can be used by interface 1104 and/or PMB logic 1120*a*-1120N (referred to collectively as 1120) to control the states of the switches on the PMBs 1118 (e.g., switches 1122, 1124), and thus to configure the touch screen to implement the desired touch screen scan. Any appropriate command or control signal structure can be utilized for communication between sense circuitry 1108 and interface 1104, and any appropriate logic can be utilized in interface 1104 and/or PMB logic 1120 to facilitate proper control of switches 1122, 1124 in PMBs 1118. In some examples, the command structure for controlling switching circuit 1106 in FIG. 11A can be similar to the command structure for controlling switching circuit 906 in FIG. 9A, as previously described. In some examples, each PMB 1118 can contain two shift registers and two shadow registers, represented by 1121 (e.g., 1121A, 1121B and 1121N in FIG. 11A). The shift registers 1121 of the PMBs 1118 can be connected together to form a long shift register, as illustrated in FIG. 11A, the contents of which can be used to control the states of switches in the PMBs. Specifically, shift register 1121A can be connected to shift register 1121B, which can be connected to shift registers in other PMBs 1118 through to PMB 1118N. A transfer to interface 1104 can be framed by a low chip select signal assertion, and can load the PMB shift register 1121. At a rising edge of the chip select, the shift register 1121 contents can be loaded into a shadow register in the PMBs 1118, which can contain the mode bits shown in column 1156 illustrated in FIG. 11C. Such operation can allow the shadow registers to retain the PMB state while loading the shift registers 1121 with new data via the interface 1104 (e.g., providing for pipelined operation).

Figure 11B:
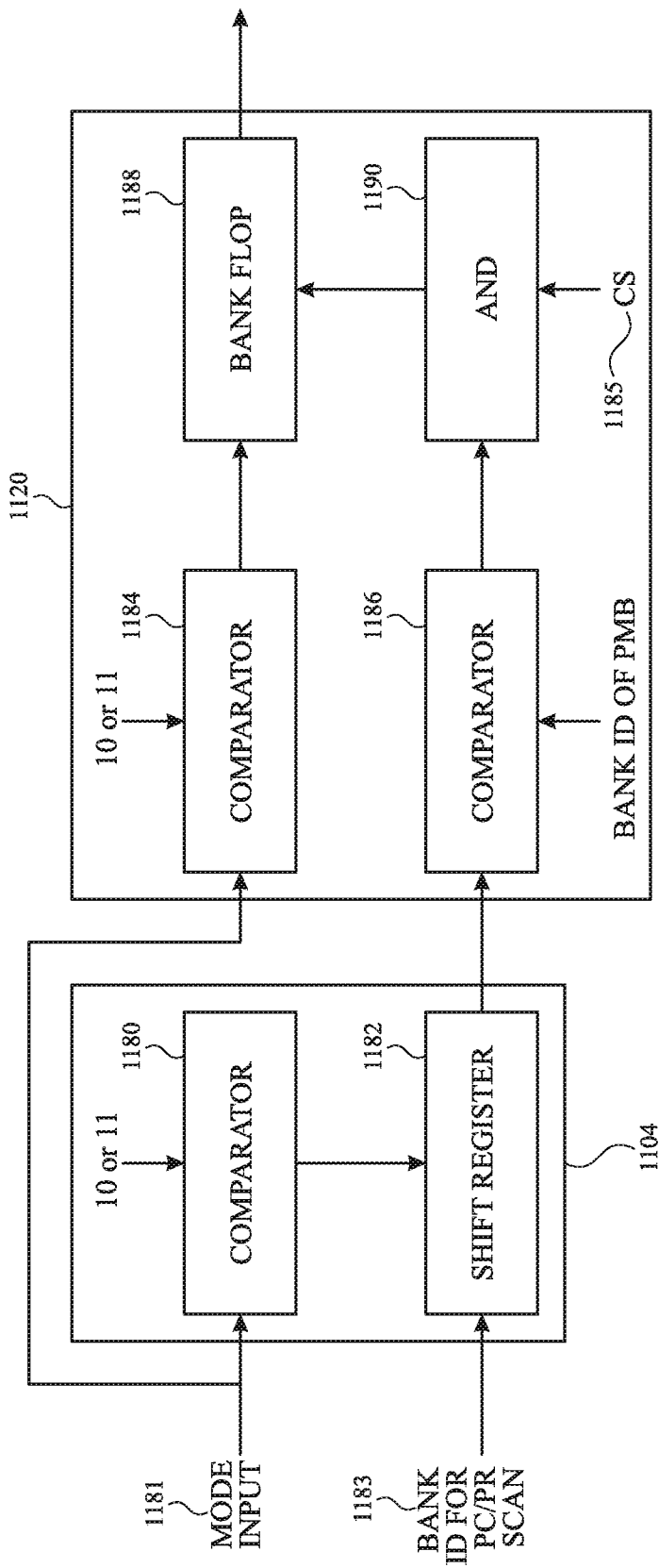
FIG. 11B illustrates an exemplary logic structure for a PMB interface and PMB logic for implementing pen row and pen column scans on the touch screen according to examples of the disclosure.

FIG. 11B illustrates an exemplary logic structure for interface 1104 and PMB logic 1120 for implementing pen row and pen column scans on the touch screen according to examples of the disclosure. In this example, sensing circuitry 1108 can provide various control signals to switching circuit 1106 to control its operation—namely, a mode signal 1181, a bank ID signal 1183 and a chip select signal 1185. The mode signal 1181 can be a two bit number, and can specify whether the touch screen scan to be implemented is a pen row scan or a pen column scan. A mode signal 1181 of "10" can indicate a pen row scan, and a mode signal of "11" can indicate a pen column scan, for example. The bank ID signal 1183 can indicate the bank ID of the supernode in which the pen row or pen column scan is to be implemented. The chip select signal 1185 can be utilized by PMB logic 1120 for timing purposes, as mentioned above, and as will be described below.

In interface 1104, comparator 1180 can compare the mode signal 1181 with "10" or "11" (corresponding to a pen row or pen column scan, as discussed above). If the mode signal 1181 is "10" or "11", comparator 1180 can enable shift register 1182, which can take the bank ID indicated by the bank ID signal 1183 as its value (i.e., the value of the bank ID signal 1183 can be loaded onto the shift register). In PMB logic 1120, comparator 1184 can, similar to comparator 1180, compare the mode signal 1181 with "10" or "11". If the mode signal 1181 is "10" or "11", comparator 1184 can transmit to bank flop 1188 the switch control information for the switches in the PMB (e.g., switches 1122 or 1124). In parallel, comparator 1186 can compare the bank ID stored by shift register 1182 with the bank ID of the PMB in which PMB logic 1120 is included (e.g., PMB 1118*a*). If the bank ID stored by shift register 1182 matches the bank ID of the PMB in which PMB logic 1120 is included, then comparator 1186 can output a positive (or high) signal to "and" logic 1190. When the chip select signal 1185 is also positive (or high), "and" logic 1190 can output a positive (or high) signal to bank flop 1188, which, in response, can output the switch control information to the switches in the PMB (e.g., switches 1122 or 1124). The switches in the PMB (e.g., switches 1122 or 1124) can then be configured based on the switch control information in order to implement the pen row or pen column scan instructed by the sense circuitry.

FIG. 11B illustrates an exemplary logic structure for implementing pen row and pen column scans on the touch screen. It is understood that other logic can be included in interface 1104 and/or PMB logic 1120 for implementing other scan configurations on the touch screen (e.g., scan configurations as described with reference to FIGS. 6A-6D). FIG. 11C illustrates exemplary states of switches in PMBs 1118 in correspondence to various control signals received by switching circuit 1106 from sense circuitry 1108 according to examples of the disclosure. The exemplary states of switches in PMBs 1118 illustrated in FIG. 11C can result from appropriate logic operating on various control signals received from sense circuitry 1108—this logic can be included in interface 1104 and/or PMB logic 1120.

Sense circuitry 1108 can transmit four signals to switching circuit 1106: a Vcom enable signal 1150, a Vbias enable signal 1152, a bank ID signal 1154 (e.g., via a SPI) and a 2 bit mode signal 1156. Bank ID signal 1154 in FIG. 11C can correspond to bank ID signal 1183 in FIG. 11B, and mode signal 1156 in FIG. 11C can correspond to mode signal 1181 in FIG. 11B. Bank_latch signal 1158 can be generated internally in switching circuit 1106 when the bank ID signal 1154 matches the programmed bank ID for a given PMB. When Vcom enable signal 1150 is high, the switch enable state of the Vcom switch (e.g., switch 1122*f* in FIG. 11A) can be high—thus the Vcom switch can be closed—regardless of the values of the other control signals.

When Vcom enable signal 1150 is low, and Vbias enable signal 1152 is high, the switch enable state of the Vbias switch (e.g., switch 1122g in FIG. 11A) can be high—thus the Vbias switch can be closed—regardless of the values of the other control signals.

A mode signal 1156 of "00" can signify a self-capacitance or mutual capacitance scan configuration. When Vcom enable signal 1150 and Vbias enable signal 1152 are low, and mode signal 1156 is "00", the switch enable states of the drive/sense switch (e.g., switch 1122d in FIG. 11A), the Vdrive switch (e.g., switch 1122e in FIG. 11A) and the Vbias switch (e.g., switch 1122g in FIG. 11A) can be high or low depending on whether the self-capacitance or mutual capacitance scan is being implemented, and if self-capacitance, which step of the self-capacitance scan is being implemented. The details of exemplary self-capacitance and mutual capacitance scans were described with reference to FIGS. 6A-6D.

A mode signal 1156 of "01" can signify a pen detection scan configuration. When Vcom enable signal 1150 and Vbias enable signal 1152 are low, and mode signal 1156 is "01", the switch enable state of the pen detect switch (e.g., switch 1122c in FIG. 11A) can be high—thus the pen detect switch can be closed—regardless of the values of the other control signals.

A mode signal 1156 of "10" can signify a pen row scan configuration. When Vcom enable signal 1150 and Vbias enable signal 1152 are low, mode signal 1156 is "10", and bank ID signal 1154 matches the bank ID of the relevant PMB, the switch enable state of the pen row switch in that PMB (e.g., switch 1122a in FIG. 11A) can be high—thus the pen row switch can be closed. Further, the bank_latch signal 1158 can be high for those PMBs in which pen row scans are to be performed, and low for others.

Finally, a mode signal 1156 of "11" can signify a pen column scan configuration. When Vcom enable signal 1150 and Vbias enable signal 1152 are low, mode signal 1156 is "11", and bank ID signal 1154 matches the bank ID of the relevant PMB, the switch enable state of the pen column switch in that PMB (e.g., switch 1122b in FIG. 11A) can be high—thus the pen column switch can be closed. Further, the bank_latch signal 1158 can be high for those PMBs in which pen column scans are to be performed, and low for others.

The relationships described above between various control signals and various switch enable states of PMB switches are exemplary only, and do not limit the scope of the disclosure.

Figure 12A:
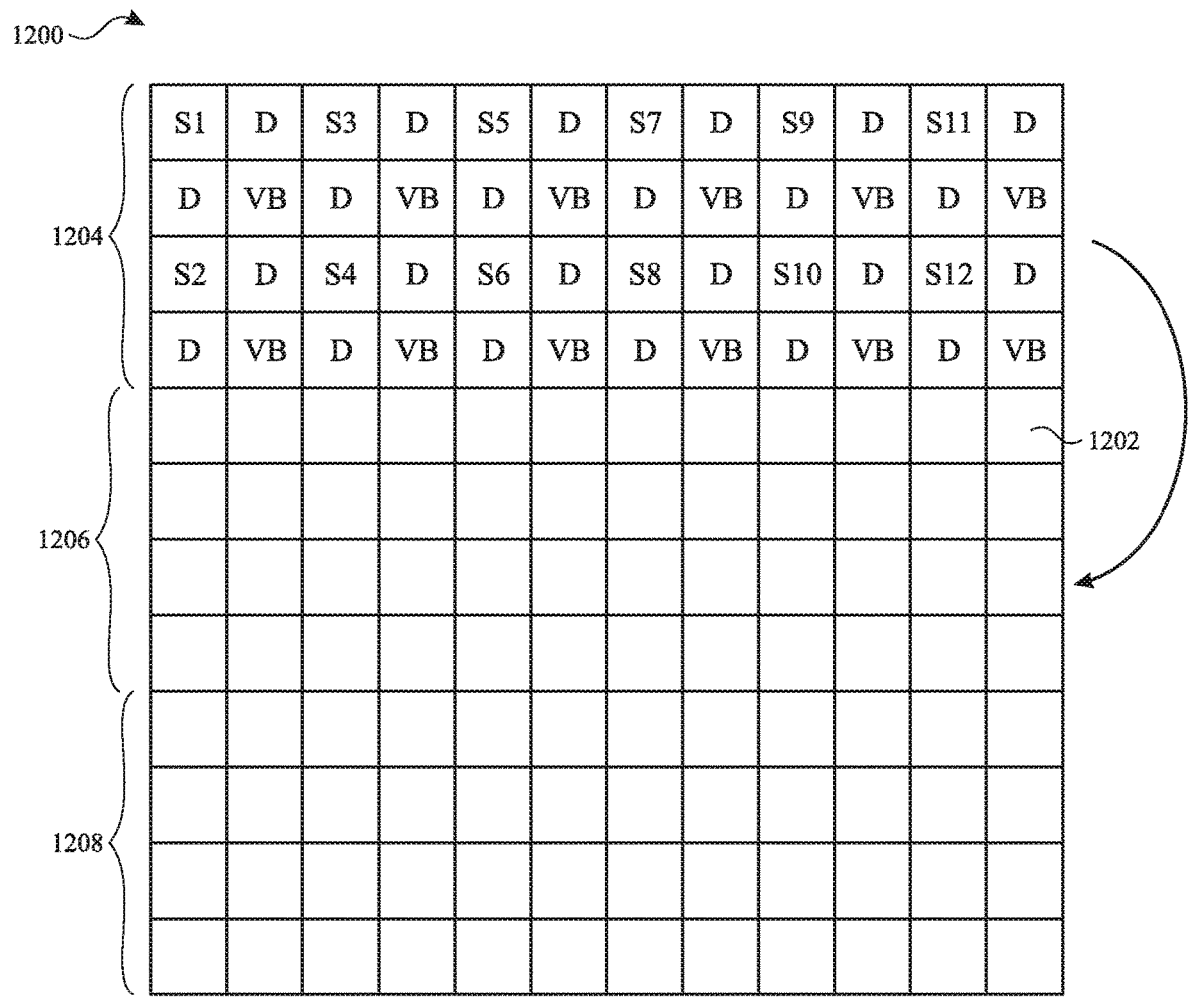
FIG. 12A illustrates an exemplary first scan step of a self-capacitance scan type performed in a region of a touch screen during a first time period according to examples of the disclosure.

In some examples, the configurations of touch node electrodes (and thus the configurations of the PMBs to which the touch node electrodes are coupled) in one scan period or step can mirror the configurations of other touch node electrodes in another scan period or step. For example, FIG. 12A illustrates an exemplary first scan step of a self-capacitance scan type performed in region 1204 of touch screen 1200 during a first time period according to examples of the disclosure. The configuration of touch node electrodes 1202 in region 1204 of touch screen 1200 can be similar to as described with reference to FIG. 10A.

Figure 12B:
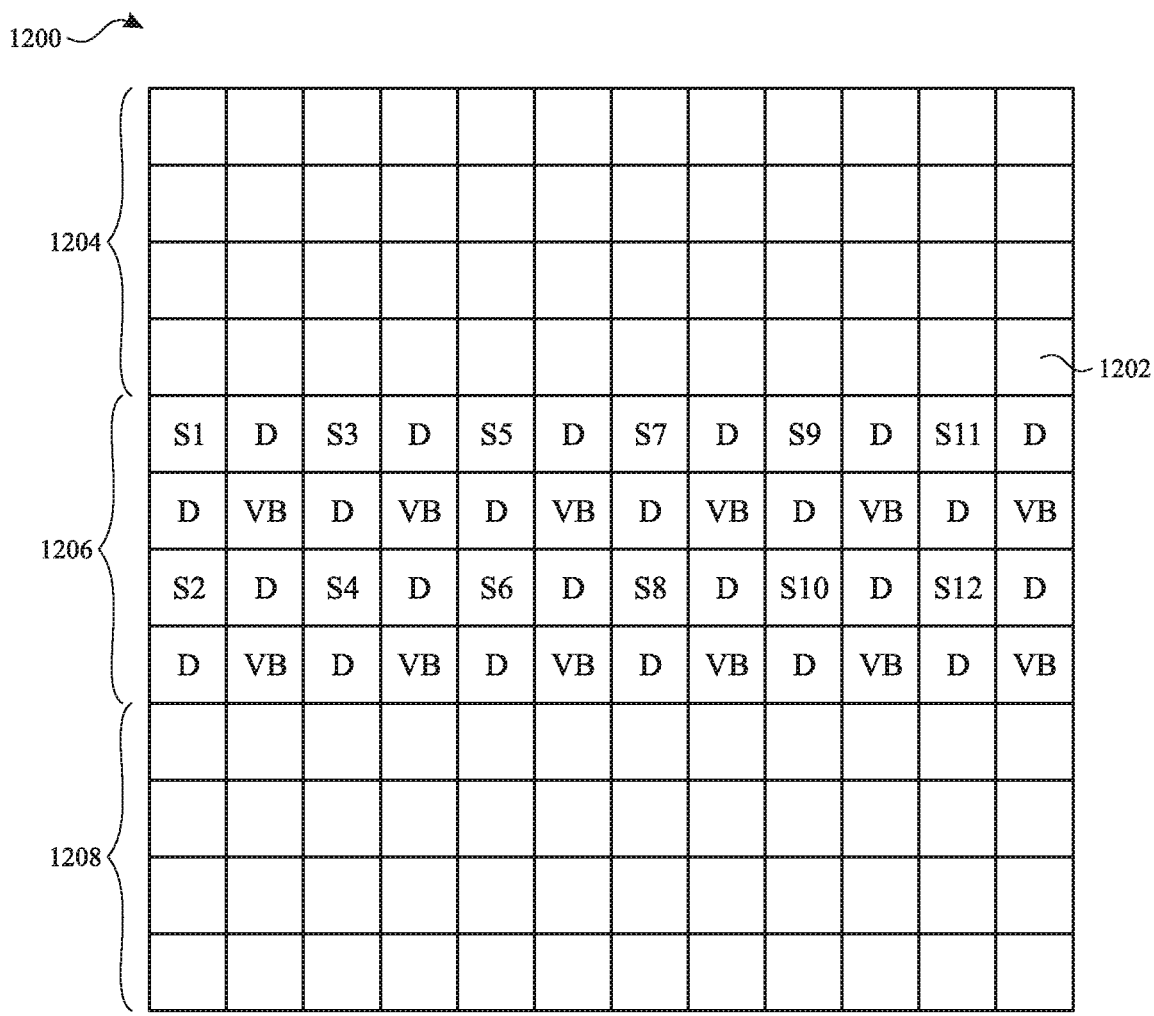
FIG. 12B illustrates an exemplary first scan step of a self-capacitance scan type performed in another region of the touch screen during a second time period according to examples of the disclosure.

FIG. 12B illustrates an exemplary first scan step of a self-capacitance scan type performed in region 1206 of touch screen 1200 during a second time period according to examples of the disclosure. As is evident from FIGS. 12A and 12B, the configuration of touch node electrodes 1202 in region 1206 of touch screen 1200 in FIG. 12B mirrors the configuration of the touch node electrodes in region 1204 of the touch screen in FIG. 12A. Therefore, in some examples, instead of requiring the sense circuitry to transmit touch screen scan information to switching circuits during the first time period (e.g., illustrated in FIG. 12A) and during the second time period (e.g., as illustrated in FIG. 12B), sense circuitry can transmit the touch screen scan information once during the first time period, and the resulting switch configuration information of the switches in the PMBs corresponding to the touch node electrodes 1202 in region 1204 can be shifted down to region 1206 of touch screen 1200 during the second time period. PMBs corresponding to the touch node electrodes 1202 in region 1206 can then utilize that switch control information that was shifted down to configure their own switches. Thus, sense circuitry can be required to transmit less information to the switching circuits than it otherwise may have, and communication overhead between the sense circuitry and the switching circuits can be reduced.

Figure 12C:
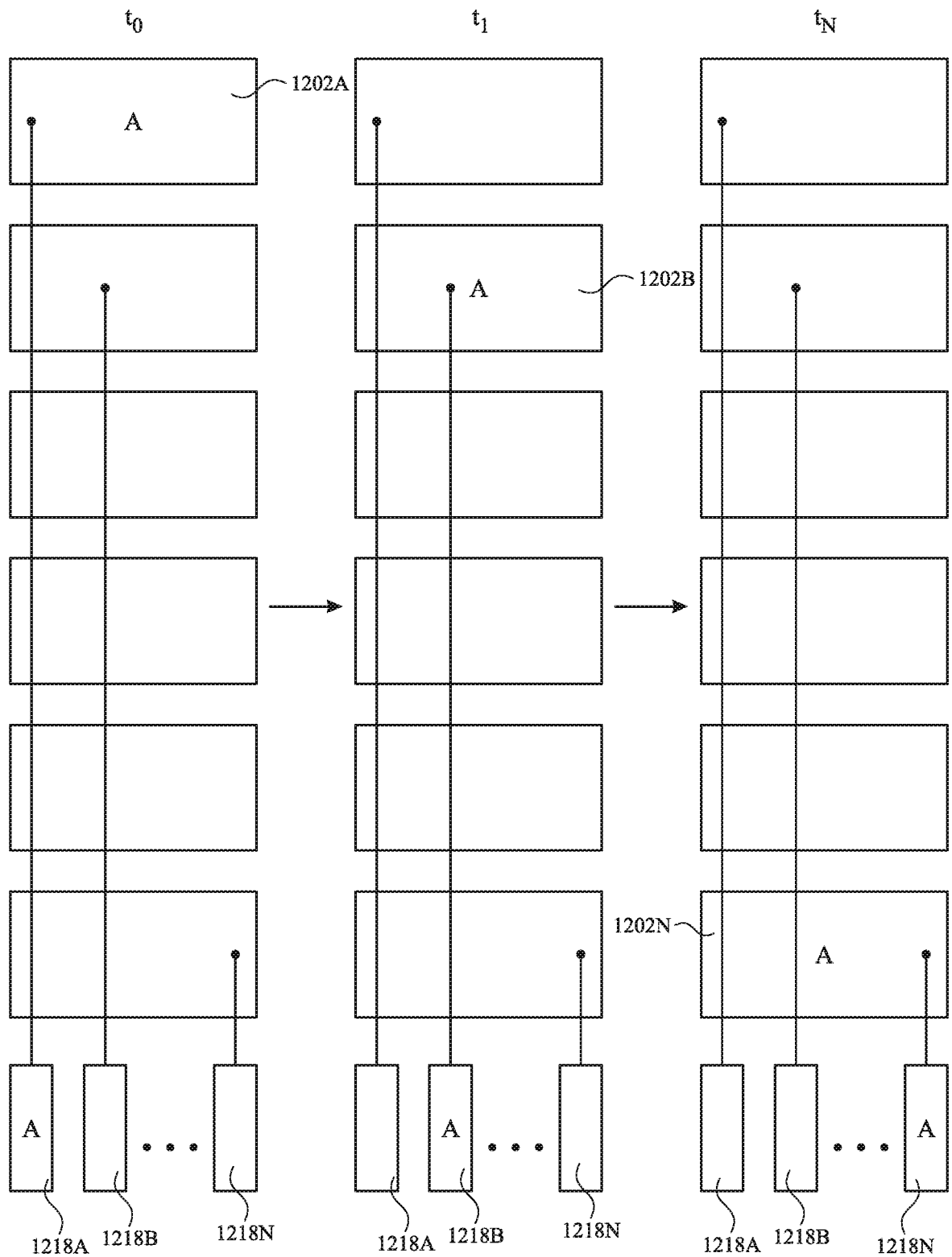
FIG. 12C illustrates exemplary shifting of switch control information from one PMB to another PMB according to examples of the disclosure.

In some examples, the above-described shifting of switch control information can be performed by shifting the switch control information from one set of PMBs to another set of PMBs. FIG. 12C illustrates exemplary shifting of switch control information from one PMB 1218 to another PMB according to examples of the disclosure. PMBs 1218a-1218N (referred to collectively as 1218) can be coupled to touch node electrodes 1202a-1202N (referred to collectively as 1202), as previously described. At time t0, the switches in PMB 1218a can be configured to be in a particular state (e.g., state "A"). Thus, touch node electrode 1202a, to which PMB 1218a can be coupled, can be said to be configured to be in state A. State A is provided for ease of description, but it is understood that state A can correspond to any configuration of a touch node electrode 1202 as described in this disclosure, such as a touch node electrode being coupled to a particular sense channel in sense circuitry.

The configuration of touch node electrode 1202a can be shifted down to touch node electrode 1202b by shifting the configuration of PMB 1218a to PMB 1218b. In some examples, PMB 1218a can itself shift its configuration over to PMB 1218b. In some examples, PMB 1218a can shift its configuration over to PMB 1218b in response to a particular "shift" command received from sense circuitry. If PMB 1218a were to shift its configuration over to PMB 1218b, at time t1, touch node electrode 1202b would be configured to be in state A. This type of shifting of state configuration can continue through touch node electrode 1202N and PMB 1218N, as illustrated at time tN. In this way, the configurations of touch node electrodes 1202 and PMBs 1218 can be shifted from one touch node electrode or PMB to another, rather than those configurations needing to be provided from sense circuitry in each instance. In some examples, configuration information can be shifted by more than one PMB at a time, though single-PMB shifts are provided for ease of description. Referring back to FIGS. 12A and 12B, the touch node electrode 1202 configurations in region 1204 of touch screen 1200 can be shifted down in the manner described above to region 1206 of the touch screen by shifting the configuration of each touch node electrode down by four touch node electrodes on the touch screen. In some examples, this shift can correspond to shifting the configuration information of PMBs to the right by four PMBs. Such shifting of configuration information can be performed using shift registers that can be included in the PMBs, as discussed with reference to FIG. 11A, for example.

Thus, the examples of the disclosure provide a flexible system architecture for use in a self-capacitance and mutual capacitance touch sensing system.

Therefore, according to the above, some examples of the disclosure are directed to a switching circuit comprising: a plurality of pixel mux blocks, each of the pixel mux blocks configured to be coupled to a respective touch node electrode on a touch sensor panel, and each of the pixel mux blocks including logic circuitry; and a plurality of signal lines configured to be coupled to sense circuitry, at least one of the signal lines configured to transmit a touch signal from one of the respective touch node electrodes to the sense circuitry, wherein the logic circuitry in each pixel mux block of the plurality of pixel mux blocks is configured to control the respective pixel mux block so as to selectively couple the respective pixel mux block to any one of the plurality of signal lines. Additionally or alternatively to one or more of the examples disclosed above, in some examples, each of the pixel mux blocks further includes a plurality of switches coupled to the respective touch node electrodes, and controlling the respective pixel mux block so as to selectively couple the respective pixel mux block to any one of the plurality of signal lines comprises controlling the states of the plurality of switches. Additionally or alternatively to one or more of the examples disclosed above, in some examples, the switching circuit further comprises: a memory including switch control information for controlling the plurality of switches in each pixel mux block, wherein the logic circuitry in each pixel mux block is coupled to the memory. Additionally or alternatively to one or more of the examples disclosed above, in some examples, the logic circuitry in each pixel mux block controls the plurality of switches in each pixel mux block based on the switch control information. Additionally or alternatively to one or more of the examples disclosed above, in some examples, the memory is configured to be populated with the switch control information by the sense circuitry. Additionally or alternatively to one or more of the examples disclosed above, in some examples, each of the plurality of switches is coupled to one of the plurality of signal lines. Additionally or alternatively to one or more of the examples disclosed above, in some examples, a first switch of the plurality of switches is coupled to a first signal line of the plurality of signal lines, and a second switch of the plurality of switches is coupled to the first signal line of the plurality of signal lines. Additionally or alternatively to one or more of the examples disclosed above, in some examples, the sense circuitry is configured to perform a plurality of touch sensor panel scans on the touch sensor panel, and each of the plurality of switches is coupled to one of the plurality of signal lines in correspondence to configurations of the plurality of touch sensor panel scans. Additionally or alternatively to one or more of the examples disclosed above, in some examples, the logic circuitry in each pixel mux block is configured to control the respective pixel mux block so as to selectively couple the respective pixel mux block to any of the plurality of signal lines in response to control provided by the sense circuitry. Additionally or alternatively to one or more of the examples disclosed above, in some examples, at least one of the signal lines is configured to be coupled to the sense circuitry via a shared trace that is shared with at least another signal line included in another switching circuit coupled to the touch sensor panel. Additionally or alternatively to one or more of the examples disclosed above, in some examples, the shared trace is disposed on a flex connector configured to couple the switching circuit to the sense circuitry. Additionally or alternatively to one or more of the examples disclosed above, in some examples, the switching circuit is configured to be coupled to a first plurality of touch node electrodes that are part of a supernode on the touch sensor panel, and the other switching circuit is configured to be coupled to a second plurality of touch node electrodes that are part of the supernode on the touch sensor panel. Additionally or alternatively to one or more of the examples disclosed above, in some examples, the shared trace is configured to transmit a touch signal from the supernode to the sense circuitry. Additionally or alternatively to one or more of the examples disclosed above, in some examples, the switching circuit further comprises a second plurality of signal lines, wherein: the plurality of signal lines comprise a first plurality of signal lines, the first plurality of signal lines is configured to be coupled to a first set of touch node electrodes on the touch sensor panel, the second plurality of signal lines is configured to be coupled to a second set of touch node electrodes on the touch sensor panel, and a first end of the first plurality of signal lines is disposed adjacent to a second end of the second plurality of signal lines. Additionally or alternatively to one or more of the examples disclosed above, in some examples, a number of signal lines in the first plurality of signal lines is the same as a number of signal lines in the second plurality of signal lines. Additionally or alternatively to one or more of the examples disclosed above, in some examples, the first plurality of signal lines is configured to be coupled to a first plurality of sense channels in the sense circuitry, and the second plurality of signal lines is configured to be coupled to a second plurality of sense channels in the sense circuitry. Additionally or alternatively to one or more of the examples disclosed above, in some examples, the switching circuit has a first dimension, the first plurality of signal lines extend across a first portion of the switching circuit along the first dimension, and the second plurality of signal lines extend across a second portion of the switching circuit along the first dimension.

Some examples of the disclosure are directed to a method of operating a touch screen, the method comprising: coupling each of a plurality of pixel mux blocks to a respective touch node electrode on a touch sensor panel; transmitting a touch signal on at least one of a plurality of signal lines from one of the respective touch node electrodes to sense circuitry; and selectively coupling each pixel mux block to any one of the plurality of signal lines. Additionally or alternatively to one or more of the examples disclosed above, in some examples, selectively coupling each pixel mux block to any one of the plurality of signal lines is based on switch control information included on a memory. Additionally or alternatively to one or more of the examples disclosed above, in some examples, the method further comprises populating the memory with the switch control information by the sense circuitry.

Some examples of the disclosure are directed to a switching circuit comprising: a plurality of pixel mux blocks including a first plurality of pixel mux blocks and a second plurality of pixel mux blocks, each pixel mux block of the plurality of pixel mux blocks configured to selectively couple a respective touch node electrode on a touch sensor panel to sense circuitry, wherein the first plurality of pixel mux blocks is associated with a first group identification, and the second plurality of pixel mux blocks is associated with a second group identification, different from the first group identification; and logic circuitry included in each pixel mux block of the first plurality of pixel mux blocks and the second plurality of pixel mux blocks, the logic circuitry configured to configure its respective pixel mux block based on a group identification of its respective pixel mux block and a target group identification provided by the sense circuitry. Additionally or alternatively to one or more of the examples disclosed above, in some examples, the logic circuitry is configured to: in accordance with a determination that the target group identification corresponds to the respective group identification of the respective pixel mux block corresponding to the logic circuitry, configuring the respective pixel mux block to couple the respective touch node electrode corresponding to the respective pixel mux block to a first signal line; and in accordance with a determination that the target group identification does not correspond to the respective group identification of the respective pixel mux block, configuring the respective pixel mux block to decouple the respective touch node electrode corresponding to the respective pixel mux block from the first signal line. Additionally or alternatively to one or more of the examples disclosed above, in some examples, the target group identification corresponds to the first group identification, the pixel mux blocks in the first plurality of pixel mux blocks are configured in a first scan configuration, and the pixel mux blocks in the second plurality of pixel mux blocks are configured in a second scan configuration, different from the first scan configuration. Additionally or alternatively to one or more of the examples disclosed above, in some examples, the first scan configuration comprises a pen scan configuration, and the second scan configuration does not comprise a pen scan configuration.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. A switching circuit comprising:
a plurality of signal lines configured to be coupled to sense circuitry, at least one of the signal lines configured to transmit a touch signal from one or more touch electrodes on a touch sensor panel to the sense circuitry; and
a plurality of pixel mux blocks, each of the pixel mux blocks configured to be coupled to different respective touch electrodes on the touch sensor panel, and each of the pixel mux blocks including one or more switches corresponding to different scan types to be performed on the touch sensor panel, wherein a first respective switch of the one or more switches included in a respective pixel mux block corresponds to a first scan type and a second respective switch of the one or more switches corresponds to a second scan type, different from the first scan type, wherein the plurality of pixel mux blocks includes:
a first pixel mux block configured to be coupled to a first touch electrode and receive a scan type control signal that indicates a scan type according to which the touch sensor panel is operating, wherein:
the first pixel mux block includes a first set of switches configured to selectively couple the first touch electrode to a first set of signal lines, including a first switch of the first set of switches that corresponds to the first scan type and a second switch of the first set of switches that corresponds to the second scan type; and
the first switch of the first set of switches is configured to selectively couple the first touch electrode to a first signal line of the first set of signal lines based on the scan type control signal indicating that the touch sensor panel is operating according to the first scan type; and
a second pixel mux block configured to be coupled to a second touch electrode and receive the scan type control signal, wherein:
the second pixel mux block includes a second set of switches configured to selectively couple the second touch electrode to a second set of signal lines, different from the first set of signal lines, including a first switch of the second set of switches that corresponds to the first scan type and a second switch of the second set of switches that corresponds to the second scan type; and
the first switch of the second set of switches is configured to selectively couple the second touch electrode to a first signal line of the second set of signal lines, different from the first signal line of the first set of signal lines, based on the scan type control signal indicating that the touch sensor panel is operating according to the first scan type.

2. The switching circuit of claim 1, further comprising:
first logic in the first pixel mux block, the first logic configured to:
in accordance with the scan type control signal indicating that the touch sensor panel is operating according to the first scan type, cause the first switch of the first set of switches to couple the first touch electrode to the first signal line of the first set of signal lines; and
in accordance with the scan type control signal indicating that the touch sensor panel is not operating according to the first scan type, cause the first switch of the first set of switches to decouple the first touch electrode from the first signal line of the first set of signal lines; and
second logic in the second pixel mux block, the second logic configured to:
in accordance with the scan type control signal indicating that the touch sensor panel is operating according to the first scan type, cause the first switch of the second set of switches to couple the second touch electrode to the first signal line of the second set of signal lines; and
in accordance with the scan type control signal indicating that the touch sensor panel is not operating according to the first scan type, cause the first switch of the second set of switches to decouple the second touch electrode from the first signal line of the second set of signal lines.

3. The switching circuit of claim 2, further comprising:
the second switch of the first set of switches coupled to a second signal line of the first set of signal lines; and
the second switch of the second set of switches coupled to a second signal line of the second set of signal lines, wherein:
the first logic is further configured to, in accordance with the scan type control signal indicating that the touch sensor panel is operating according to the second scan type, cause the second switch of the first set of switches to couple the first touch electrode to the second signal line of the first set of signal lines, and
the second logic is further configured to, in accordance with the scan type control signal indicating that the touch sensor panel is operating according to the second scan type, cause the second switch of the second set of switches to couple the second touch electrode to the second signal line of the second set of signal lines.

4. The switching circuit of claim 3, wherein the second signal line of the first set of signal lines and the second signal line of the second set of signal lines are a same signal line.

5. The switching circuit of claim 3, wherein the second signal line of the first set of signal lines and the second signal line of the second set of signal lines are different signal lines.

6. The switching circuit of claim 1, wherein:
the first pixel mux block is associated with a respective group identification,
the second pixel mux block is associated with a respective group identification,
the scan type control signal further indicates a target group identification,
the first switch of the first set of switches is configured to selectively couple the first touch electrode to the first signal line of the first set of signal lines based further on the target group identification indicated in the scan type control signal, and
the first switch of the second set of switches is configured to selectively couple the second touch electrode to the first signal line of the second set of signal lines based further on the target group identification indicated in the scan type control signal.

7. The switching circuit of claim 6, wherein:
the first switch of the first set of switches is configured to:
in accordance with a determination that the target group identification corresponds to the respective group identification of the first pixel mux block, couple the first touch electrode corresponding to the first pixel mux block to the first signal line of the first set of signal lines, and
in accordance with a determination that the target group identification does not correspond to the respective group identification of the first pixel mux block, decouple the first touch electrode corresponding to the first pixel mux block from the first signal line of the first set of signal lines, and
the first switch of the second set of switches is configured to:
in accordance with a determination that the target group identification corresponds to the respective group identification of the second pixel mux block, couple the second touch electrode corresponding to the second pixel mux block to the first signal line of the second set of signal lines, and
in accordance with a determination that the target group identification does not correspond to the respective group identification of the second pixel mux block, decouple the second touch electrode corresponding to the second pixel mux block from the first signal line of the second set of signal lines.

8. The switching circuit of claim 7, wherein the first scan type comprises a pen detection scan type.

9. The switching circuit of claim 1, wherein:
the first set of signal lines includes a first signal line of the plurality of signal lines and a second signal line of the plurality of signal lines; and
the second set of signal lines includes the second signal line of the plurality of signal lines and does not include the first signal line of the plurality of signal lines.

10. The switching circuit of claim 1, wherein:
the first set of switches is hard coded to selectively couple the first touch electrode to the first set of signal lines; and
the second set of switches is hard coded to selectively couple the second touch electrode to the second set of signal lines.

11. The switching circuit of claim 1, wherein two or more switches of the first set of switches are coupled to a same signal line of the first set of signal lines.

12. The switching circuit of claim 1, wherein a total number of the one or more switches in a given pixel mux block is less than a total number of signal lines in the plurality of signal lines.

13. A method of operating a switching circuit that includes a plurality of signal lines configured to be coupled to sense circuitry, at least one of the signal lines configured to transmit a touch signal from one or more touch electrodes on a touch sensor panel to the sense circuitry, the method comprising:
receiving, at a first pixel mux block configured to be coupled to a first touch electrode on the touch sensor panel, a scan type control signal that indicates a scan type according to which the touch sensor panel is operating, wherein the first pixel mux block includes a first set of switches configured to selectively couple the first touch electrode to a first set of signal lines, and the first set of switches includes a first switch corresponding to a first scan type and a second switch corresponding to a second scan type, the second scan type different than the first scan type;
selectively coupling, with the first switch of the first set of switches, the first touch electrode to a first signal line of the first set of signal lines based on the scan type control signal indicating that the touch sensor panel is operating according to the first scan type;
receiving, at a second pixel mux block configured to be coupled to a second touch electrode on the touch sensor panel, the scan type control signal, wherein the second pixel mux block includes a second set of switches configured to selectively couple the second touch electrode to a second set of signal lines, different from the first set of signal lines, and the second set of switches includes a first switch corresponding to the first scan type, and a second switch corresponding to the second scan type; and
selectively coupling, with the first switch of the second set of switches, the second touch electrode to a first signal line of the second set of signal lines, different than the first signal line of the first set of signal lines, based on the scan type control signal indicating that the touch sensor panel is operating according to the first scan type.

14. The method of claim 13, further comprising:
in accordance with the scan type control signal indicating that the touch sensor panel is operating according to the first scan type:
coupling, with the first switch of the first set of switches, the first touch electrode to the first signal line of the first set of signal lines; and
coupling, with the first switch of the second set of switches, the second touch electrode to the first signal line of the second set of signal lines; and
in accordance with the scan type control signal indicating that the touch sensor panel is not operating according to the first scan type:
decoupling, with the first switch of the first set of switches, the first touch electrode from the first signal line of the first set of signal lines; and decoupling, with the first switch of the second set of switches, the second touch electrode from the first signal line of the second set of signal lines.

15. The method of claim 14, further comprising:
in accordance with the scan type control signal indicating that the touch sensor panel is operating according to a second scan type, different than the first scan type:
coupling, with the second switch of the first set of switches, the first touch electrode to a second signal line of the first set of signal lines; and
coupling, with the second switch of the second set of switches, the second touch electrode to a second signal line of the second set of signal lines.

16. The method of claim 15, wherein the second signal line of the first set of signal lines and the second signal line of the second set of signal lines are a same signal line.

17. The method of claim 13, further comprising:
selectively coupling, using the first switch of the first set of switches, the first touch electrode to the first signal line of the first set of signal lines based further on a target group identification indicated in the scan type control signal, wherein the first pixel mux block is associated with a respective group identification; and
selectively coupling, using the first switch of the second set of switches, the second touch electrode to the first signal line of the second set of signal lines based further on the target group identification indicated in the scan type control signal, wherein the second pixel mux block is associated with a respective group identification.

18. The method of claim 17, further comprising:
in accordance with a determination that the target group identification corresponds to the respective group identification of the first pixel mux block, coupling, with the first switch of the first set of switches, the first touch electrode corresponding to the first pixel mux block to the first signal line of the first set of signal lines;
in accordance with a determination that the target group identification does not correspond to the respective group identification of the first pixel mux block, decoupling, with the first switch of the first set of switches, the first touch electrode corresponding to the first pixel mux block from the first signal line of the first set of signal lines;
in accordance with a determination that the target group identification corresponds to the respective group identification of the second pixel mux block, coupling, with the first switch of the second set of switches, the second touch electrode corresponding to the second pixel mux block to the first signal line of the second set of signal lines; and
in accordance with a determination that the target group identification does not correspond to the respective group identification of the second pixel mux block, decoupling, with the first switch of the second set of switches, the second touch electrode corresponding to the second pixel mux block from the first signal line of the second set of signal lines.

19. The method of claim 13, wherein:
the first set of signal lines includes a first signal line of the plurality of signal lines and a second signal line of the plurality of signal lines; and
the second set of signal lines includes the second signal line of the plurality of signal lines and does not include the first signal line of the plurality of signal lines.

20. The method of claim 13, wherein:
the first set of switches is hard coded to selectively couple the first touch electrode to the first set of signal lines; and
the second set of switches is hard coded to selectively couple the second touch electrode to the second set of signal lines.

21. A computer-readable storage medium including instructions, which when executed by a processor of a touch sensor panel, cause the touch sensor panel to perform a method comprising:
receiving, at a first pixel mux block configured to be coupled to a first touch electrode on the touch sensor panel, a scan type control signal that indicates a scan type according to which the touch sensor panel is operating, wherein the first pixel mux block includes a first set of switches configured to selectively couple the first touch electrode to a first set of signal lines, and the first set of switches includes a first switch corresponding to a first scan type and a second switch corresponding to a second scan type, the second scan type different than the first scan type;
selectively coupling, with the first switch of the first set of switches, the first touch electrode to a first signal line of the first set of signal lines based on the scan type control signal indicating that the touch sensor panel is operating according to the first scan type;
receiving, at a second pixel mux block configured to be coupled to a second touch electrode on the touch sensor panel, the scan type control signal, wherein the second pixel mux block includes a second set of switches configured to selectively couple the second touch electrode to a second set of signal lines, different from the first set of signal lines, and the second set of switches includes a first switch corresponding to the first scan type, and a second switch corresponding to the second scan type; and
selectively coupling, with the first switch of the second set of switches, the second touch electrode to a first signal line of the second set of signal lines, different than the first signal line of the first set of signal lines, based on the scan type control signal indicating that the touch sensor panel is operating according to the first scan type.

* * * * *